(12) United States Patent
Krasnoff

(10) Patent No.: US 12,110,092 B2
(45) Date of Patent: Oct. 8, 2024

(54) DRONE SYSTEMS AND METHODS

(71) Applicant: Duplicent, LLC, Santa Monica, CA (US)

(72) Inventor: Curren Krasnoff, Pacific Palisades, CA (US)

(73) Assignee: Duplicent, LLC, Santa Monica, CA (US)

( * ) Notice: Subject to any disclaimer, the term of this patent is extended or adjusted under 35 U.S.C. 154(b) by 8 days.

(21) Appl. No.: 18/310,971

(22) Filed: May 2, 2023

(65) Prior Publication Data

US 2024/0092475 A1 Mar. 21, 2024

Related U.S. Application Data

(63) Continuation of application No. 16/932,105, filed on Jul. 17, 2020, now Pat. No. 11,667,372, which is a
(Continued)

(51) Int. Cl.

| | |
|---|---|
| *B64C 27/52* | (2006.01) |
| *B64C 29/00* | (2006.01) |
| *B64C 37/00* | (2006.01) |
| *B64U 30/16* | (2023.01) |
| *B64U 30/26* | (2023.01) |

(Continued)

(52) U.S. Cl.
CPC .......... *B64C 27/52* (2013.01); *B64C 29/0033* (2013.01); *B64C 37/00* (2013.01); *B64U 30/16* (2023.01); *B64U 30/26* (2023.01); *B64U 50/31* (2023.01); *B64D 27/353* (2024.01); *B64U 10/13* (2023.01); *B64U 50/19* (2023.01)

(58) Field of Classification Search
CPC ....... B64C 3/56; B64C 27/52; B64C 29/0033; B64C 37/00; B64C 39/024; B64D 27/353; B64U 30/12; B64U 50/19; B64U 50/34
See application file for complete search history.

(56) References Cited

U.S. PATENT DOCUMENTS 3,794,273 A * 2/1974 Girard .................. B64C 27/026
244/17.19
7,445,178 B2 * 11/2008 McCoskey ................ B64F 1/28
244/50

(Continued)

FOREIGN PATENT DOCUMENTS

CN 105314105 A * 2/2016
CN 105947191 A * 9/2016

(Continued)

*Primary Examiner* — Rodney A Bonnette
(74) *Attorney, Agent, or Firm* — GREENBERG TRAURIG, LLP

(57) ABSTRACT

An aircraft includes a body defining an interior compartment configured to hold at least one of a passenger and a payload, a battery system, a plurality of arms coupled to and extending from the body, and a plurality of propulsion devices configured to provide thrust to fly the aircraft. Each of the plurality of propulsion devices is coupled to a respective one of the plurality of arms. The plurality of propulsion devices are powered by the battery system. Each of the plurality of propulsion devices is selectively pivotable about at least one axis. The plurality of propulsion devices include at least one of (i) counter rotating ducted fans and (ii) ionizing electrode engines.

14 Claims, 34 Drawing Sheets

Related U.S. Application Data continuation of application No. PCT/US2019/014426, filed on Jan. 21, 2019.

(60) Provisional application No. 62/628,772, filed on Feb. 9, 2018, provisional application No. 62/620,320, filed on Jan. 22, 2018.

(51) Int. Cl.
*B64U 50/19* (2023.01)
*B64U 50/31* (2023.01)
*B64D 27/353* (2024.01)
*B64U 10/13* (2023.01)

(56) References Cited

U.S. PATENT DOCUMENTS

| | | | | |
|---|---|---|---|---|
| 10,351,234 | B1* | 7/2019 | Dennis | B64C 29/0033 |
| 2006/0016930 | A1* | 1/2006 | Pak | B64C 29/0033 |
| | | | | 244/12.4 |
| 2010/0301168 | A1* | 12/2010 | Raposo | B64C 27/82 |
| | | | | 244/171.2 |
| 2011/0277444 | A1* | 11/2011 | Leiter | F03H 1/0018 |
| | | | | 60/202 |
| 2012/0298789 | A1* | 11/2012 | Oz | B64C 15/12 |
| | | | | 244/12.4 |
| 2013/0068876 | A1* | 3/2013 | Radu | B60F 5/02 |
| | | | | 244/2 |
| 2015/0353192 | A1* | 12/2015 | Morrison | B64D 27/24 |
| | | | | 244/17.23 |
| 2016/0304193 | A1* | 10/2016 | Marcel | G05D 1/102 |
| 2017/0047790 | A1* | 2/2017 | Olsson | H02J 50/20 |
| 2017/0300051 | A1* | 10/2017 | Zhou | G08G 5/04 |
| 2018/0257772 | A1* | 9/2018 | Bernhardt | B64C 39/04 |
| 2018/0265222 | A1* | 9/2018 | Takagi | G05D 1/0676 |

FOREIGN PATENT DOCUMENTS

| | | | | |
|---|---|---|---|---|
| DE | 102008058212 A1 * | 5/2010 | | B64F 1/405 |
| DE | 102012020498 A1 * | 4/2014 | | B64C 29/0033 |
| WO | WO-2007052271 A2 * | 5/2007 | | B60V 3/08 |
| WO | WO-2016153580 A2 * | 9/2016 | | B64C 27/08 |
| WO | WO-2016202909 A1 * | 12/2016 | | B64C 25/24 |

* cited by examiner

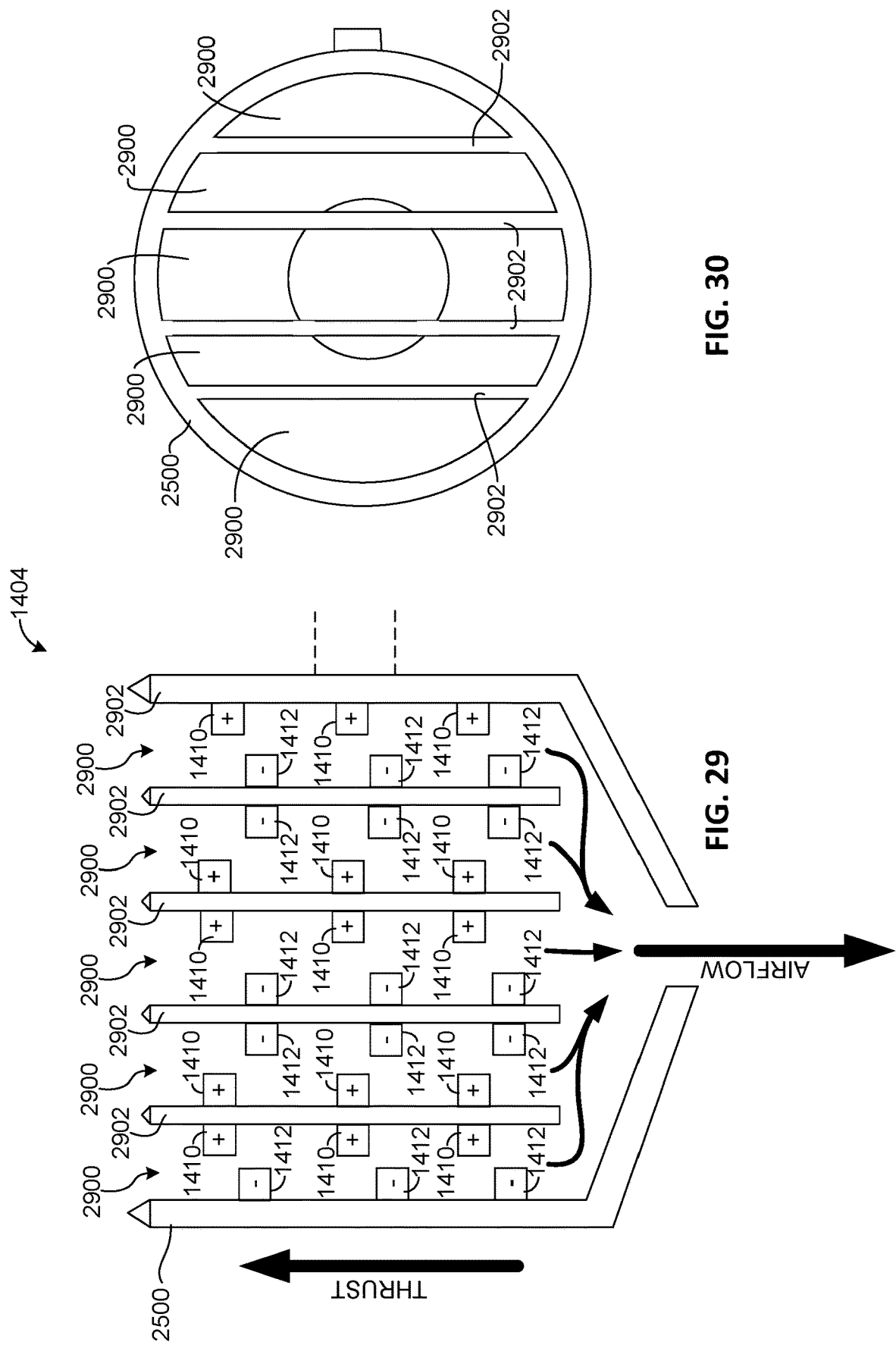

DRONE SYSTEMS AND METHODS

CROSS-REFERENCE TO RELATED PATENT APPLICATIONS

This application is a continuation of International Patent Application No. PCT/US2019/014426, filed Jan. 21, 2019, which claims the benefit of and priority to U.S. Provisional Patent Application No. 62/620,320, filed Jan. 22, 2018, and U.S. Provisional Patent Application No. 62/628,772, filed Feb. 9, 2018, all of which are incorporated herein by reference in their entireties.

BACKGROUND

Mechanisms for transporting items are utilized throughout modern society. For example, an item may be picked up by an operator of a manned ground vehicle (e.g., a truck, a train, etc.), transferred to a manned aerial vehicle (e.g., a cargo plane, etc.), and transferred to another manned ground vehicle for subsequent delivery. Costs associated with transporting items can be, in large part, attributed to the use of human operators for manned ground vehicles and manned aerial vehicles.

SUMMARY

One embodiment relates to an aircraft. The aircraft includes a body defining an interior compartment configured to hold at least one of a passenger and a payload, a battery system, a plurality of arms coupled to and extending from the body, and a plurality of propulsion devices configured to provide thrust to fly the aircraft. Each of the plurality of propulsion devices is coupled to a respective one of the plurality of arms. The plurality of propulsion devices are powered by the battery system. Each of the plurality of propulsion devices is selectively pivotable about at least one axis. The plurality of propulsion devices include at least one of (i) counter rotating ducted fans and (ii) ionizing electrode engines.

Another embodiment relates to an aircraft. The aircraft includes a frame, a plurality of propulsion devices coupled to the frame, a battery mat coupled to and extending along the frame, and a plurality of support arms extending from the frame. The plurality of propulsion devices are configured to provide thrust to fly the aircraft. The battery mat includes a plurality of battery cells configured to power the plurality of propulsion devices. The battery mat spans an area of at least one square foot. The plurality of support arms are configured to support a payload positioned beneath the frame and the battery mat.

Another embodiment relates to a propulsion device for an aircraft. The propulsion device includes a housing, a plurality of electrodes positioned in the housing, and a control system configured to control the plurality of electrodes to provide a desired amount of thrust. The plurality of electrodes include a first pair of electrodes and a second pair of electrodes. The first pair of electrodes include a first set of one or more ionizing electrodes paired with a first set of one or more attractive electrodes. The second pair of electrodes include a second set of one or more ionizing electrodes paired with a second set of one or more attractive electrodes. To provide the desired amount of thrust, the control system is configured to (i) selectively apply a first voltage differential across the first pair of electrodes and approximately zero voltage differential across the second pair of electrodes to provide a first amount of thrust, (ii) selectively apply a second voltage differential across the second pair of electrodes and approximately zero voltage differential across the first pair of electrodes to provide a second amount of thrust, and (iii) selectively apply the first voltage differential across the first pair of electrodes and the second voltage differential across the second pair of electrodes to provide a third amount of thrust.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

FIG. 29 is a cross-sectional view of the ionic engine of FIG. 25, according to another exemplary embodiment.

FIG. 30 is an end view of the ionic engine of FIG. 29, according to an exemplary embodiment.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
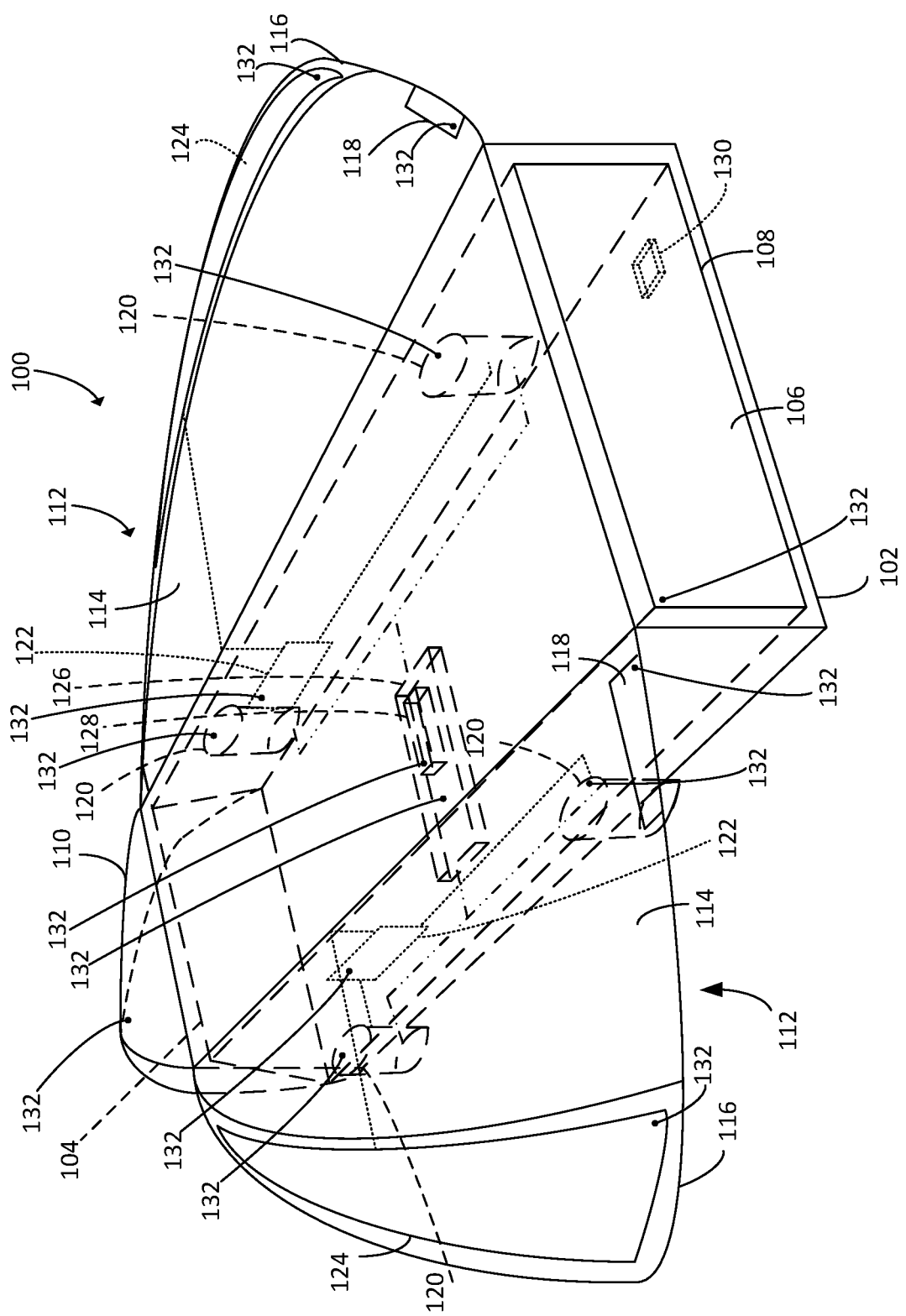
FIG. 1 is a top perspective view of a drone shipping system, according to an exemplary embodiment.

According to the exemplary embodiment shown in FIG. 1, a system, shown as drone shipping system 100, is configured to aerially transport a payload (e.g., items, goods, products, merchandise, people, cattle, agricultural goods, water, humans, military personnel, fuel, equipment, a thirty-thousand pound payload, a fifty thousand pound payload, etc.) without a human operator. The drone shipping system 100 may be autonomously or remotely controlled. In this way, a human operator may not by contained (e.g., included, present, etc.) in the drone shipping system 100. The drone shipping system 100 may be entirely self-flying. By way of example, the drone shipping system 100 may be autonomous and operate without a human operator. The drone shipping system 100 may thereby transport itself from a starting location to and ending location. Alternatively, the drone shipping system 100 may be partially autonomous, where a human operator operates and/or aids in operating the drone shipping system 100 during takeoff and landing. The drone shipping system 100 may be autonomous when fully airborne.

The drone shipping system 100 is operable between a first state (e.g., an unloaded state, etc.), in which the payload is not contained in or on the drone shipping system 100, and a second state (e.g., a loaded state, etc.), in which the payload is contained in or on the drone shipping system 100. The drone shipping system 100 operates by selectively alternating between the first state and the second state. For example, the drone shipping system 100 may be in the first state when the drone shipping system 100 is located on a ground surface (e.g., a surface of a shipping hub, a surface of an airport, etc.), in the second state after the drone shipping system 100 has picked up a payload or a payload has been deposited in or on the drone shipping system 100 (e.g., after being loaded with a payload at a shipping hub, after being loaded with a payload at an airport, etc.), and in the first state again after the drone shipping system 100 drops off the payload or the payload is unloaded from the drone shipping system 100. The drone shipping system 100 may be airborne (e.g., in flight, etc.) when in either or both of the first state and the second state.

As shown in FIG. 1, the drone shipping system 100 includes a body 102. The body 102 defines an area (e.g., volume, receptacle, container, etc.), shown as payload bay 104. The payload bay 104 is configured to receive a payload and store the payload during flight of the drone shipping system 100. The payload bay 104 may have an internal volume of, for example, between one cubic foot and one-thousand cubic feet.

As shown in FIG. 1, the body 102 includes a manually operated or electrically actuated door (e.g., sliding door, hatch, etc.), shown as door 106. The door 106 is coupled to the body 102. In some embodiments, the door 106 is coupled to the body 102 via a hinge. The hinge and/or another mechanism (e.g., a locking mechanism) keeps the door 106 closed during flight of the drone shipping system 100. The door 106 may have a programed latching and opening procedure during flight to release stored contents of the drone shipping system 100 during flight (e.g., smaller flying drones within body 102 may transport packages stored in payload bay 104 through door 106 during flight). The door 106 is selectively repositionable to selectively cover an opening (e.g., hole, aperture, etc.), shown as opening 108, defined by the body 102. The opening 108 provides access to the payload bay 104. In this way, the door 106 may be selectively repositioned to provide access to the payload bay 104 (e.g., for loading payload, for unloading a payload, etc.). The body 102 also includes a nose 110. The nose 110 extends (e.g., protrudes, etc.) from the body 102.

As shown in FIG. 1, the drone shipping system 100 includes a plurality of wings, shown as wings 112. The wings 112 extend from the body 102, generate lift, and facilitate aerial movement of the body 102. The wings 112 each include a first portion, shown as inner assembly 114, and a second portion, shown as outer assembly 116. The inner assembly 114 is coupled to the body 102, and the outer assembly 116 is coupled to the inner assembly 114. The wings 112 may include various subassemblies to extend and retract the wings 112 (e.g., from a starting retracted position to an extended position). The wings 112 may extend during flight after takeoff, allowing the drone shipping system 100 to take off vertically. Alternatively, the drone shipping system 100 may not include the wings 112 but only rely on propulsion devices to generate lift.

As shown in FIG. 1, each of the inner assemblies 114 includes a rudder 118. Each of the rudders 118 is selectively repositionable relative to the associated inner assembly 114. Selectively repositioning of the rudders 118 may facilitate steering (e.g., changes in pitch, changes in yaw, changes in roll, etc.) and/or ensuring stabilization of the drone shipping system 100. In various embodiments, the rudders 118 are configured to be selectively repositioned over a range of one hundred and eighty degrees in a first direction (e.g., clockwise, counterclockwise, etc.) and over a range of three hundred and sixty degrees in a second direction (e.g., counterclockwise, clockwise, etc.). In other embodiments, the rudder 118 is another device (e.g., a flap, etc.).

The drone shipping system 100 may include a propulsion system. As shown in FIG. 1, the propulsion system includes a plurality of propulsion devices 120. The propulsion devices 120 are configured to facilitate movement of the drone shipping system 100. The propulsion devices 120 facilitate take off, landing, and flight of the drone shipping system 100. The propulsion devices 120 are coupled (e.g., welded, bolted, etc.) to the body 102. In other embodiments, the propulsion devices 120 are coupled to a movable attachment member that is itself attached to the body 102. The movable attachment member allows the propulsion device 120 to rotate in two orthogonal axes, such that the propulsion systems can change position during flight to change the pitch or yaw of the drone shipping system 100. Specifically, each of the propulsion devices 120 and/or movable attachment members is coupled proximate a respective corner of the body 102. Propulsion devices 120 may be coupled along a bottom surface of the body 102. The propulsion devices 120 may be otherwise provided as part of the drone shipping system 100, according to various embodiments (e.g., coupled to the wings 112, etc.). The propulsion devices 120 may be ducted fans, counter rotating ducted fans, propellers, thrusters, jets, engines, boosters, etc. The propulsion devices 120 may be or include combustion engines (e.g., a jet fuel engine, etc.), an electrical engine (e.g., a fuel cell engine, etc.), an ionic engine (e.g., ionic engine 1404, etc.).

One or more (e.g., each, etc.) of the propulsion devices 120 is selectively rotatable relative to the body 102 about two orthogonal axes. The orthogonal axes of rotation are centered on the propulsion device 120 such that the propulsion device 120 can rotate approximately one hundred and eighty degrees about one of the axes and approximately ninety degrees about the other of the axes.

As shown in FIG. 1, the drone shipping system 100 includes batteries 122. The batteries 122 are configured to selectively be charged with, and discharge, electrical energy (e.g., electricity, direct current electricity, alternating current electricity, etc.). The batteries 122 may be electrically coupled to at least one of the propulsion devices 120 and provide electrical energy for consumption by the propulsion devices 120 (e.g., by the electrical engines, ionic engines, etc. of the propulsion devices 120). The batteries 122 are each positioned on a side wall of the body 102. In other embodiments, the batteries 122 are positioned within each of the propulsion devices 120, within the nose 110, and/or within a bottom surface of the body 102 (e.g., a floor of the payload bay 104, etc.). In other embodiments, the drone shipping system 100 includes another type of energy source (e.g., capacitors, fuel cells, etc.).

As shown in FIG. 1, the drone shipping system 100 includes a plurality of solar panels 124. The solar panels 124 are positioned on the outer assemblies 116 of the wings 112. In other embodiments, the solar panels 124 are positioned on another external surface of the drone shipping system 100 (e.g., the inner assemblies 114 of the wings 112, on top of the body 102, etc.). In other embodiments, the drone shipping system 100 includes another type of energy supply (e.g., a generator, etc.). The solar panels 124 may harvest light energy from the sun to charge the batteries 122 (e.g., during flight, while on the ground, etc.).

As shown in FIG. 1, the drone shipping system 100 includes a fuel tank 126. The fuel tank 126 is configured to store fuel (e.g., jet fuel, octane, hexane, propane, liquid natural gas, gasoline, petrol, diesel, etc.). The fuel tank 126 is fluidly coupled to each of the propulsion devices 120 and is configured to selectively provide the fuel for consumption by the propulsion devices 120 (e.g., by the internal combustion engines of the propulsion devices 120, etc.). As shown in FIG. 1, the drone shipping system 100 includes a fuel pump 128. The fuel pump 128 is configured to provide fuel from the fuel tank 126 to any of the propulsion devices 120. By using the fuel pump 128, the propulsion devices 120 may be provided the fuel substantially on demand. In one embodiment, the fuel pump 128 is a positive displacement rotary pump. In some embodiments, the drone shipping system 100 does not include the fuel tank 126 and/or the fuel pump 128 (e.g., in embodiments where the propulsion devices 120 are electrically driven, etc.).

In some embodiments, the drone shipping system 100 is a hybrid system having at least one of the propulsion devices 120 providing a mechanical power output using an electrical energy input and at least one of the propulsion devices 120 providing a mechanical power output by consuming fuel. Aerial travel of the drone shipping system 100 is limited to a defined range. The range may be a maximum distance of aerial travel that the drone shipping system 100 can complete without recharging the battery 122 or refueling the fuel tank 126. As an example, the range of the drone shipping system 100 operating on power from the battery 122 alone (e.g., the propulsion devices 120 do not consume any fuel, etc.) may be approximately one hundred miles, and the range of the drone shipping system 100 operating on fuel alone (e.g., the propulsion devices 120 do not consume any electrical energy, etc.) may be approximately one hundred miles. In such an example, the range of the drone shipping system 100 on both the battery 122 and the fuel tank 126 may be, for example, two hundred or more miles.

As shown in FIG. 1, the drone shipping system 100 includes a control system (e.g., computer, etc.), shown as controller 130. In an exemplary embodiment, the controller 130 is positioned in the floor of the body 102. In other embodiments, the controller 130 is otherwise positioned on the drone shipping system 100. The controller 130 may be electrically communicable with the door 106 (e.g., to selectively reposition the door 106, etc.), the wings 112, the rudders 118 (e.g., to selectively reposition the rudders 118, etc.), the propulsion devices 120 (e.g., to control operation of propulsion devices 120, to determine a temperature of the propulsion devices 120, to determine an operational state of the propulsion devices 120, etc.), the batteries 122 (e.g., to determine a charge level of the batteries 122, to determine an amount of electrical energy contained within the batteries 122, etc.), the solar panels 124 (e.g., to determine an amount of electrical energy generated by the solar panels 124, to determine a temperature of the solar panels 124, etc.), the fuel tank 126 (e.g., to determine an amount of fuel remaining in the fuel tank 126, etc.), altimeter gauges (e.g., to determine the altitude of the drone shipping system 100), GPS systems (e.g., to determine the location of the drone shipping system 100), video cameras on various exterior locations of the drone shipping system 100 (e.g., so an operator can monitor drone movements remotely), the fuel pump 128 (e.g., to control an amount of fuel provided to any of the propulsion devices 120, etc.), movement members or tracking elements (e.g., wheels, tracks, rollers, etc.) to retract and extend the movement members during take-off and landing, sensors, and/or still other systems.

As shown in FIG. 1, the drone shipping system 100 includes a plurality of sensors 132. One of the sensors 132 may be coupled to the door 106. The sensor 132 that is coupled to the door 106 is used to determine the position of the door 106. One or more of the sensors 132 may be coupled to each of the wings 112, each of the rudders 118, each of the propulsion devices 120, each of the batteries 122, each of the solar panels 124, the fuel tank 126, and/or the fuel pump 128. Additional sensors 132 may be positioned within the nose 110. The sensors 132 in the nose 110 may be used to determine an air speed and/or an altitude of the drone shipping system 100, to obtain radar information in an area proximate the drone shipping system 100, to obtain location information (e.g., global positioning system coordinates, radio frequency identification, etc.) of the drone shipping system 100, etc. The sensors may be pressure sensors, temperature sensors, altitude sensors, radar sensors, air flow sensors, voltage sensors, current sensors, magnetic field sensors, Hall effect sensors, etc.

Figure 2:
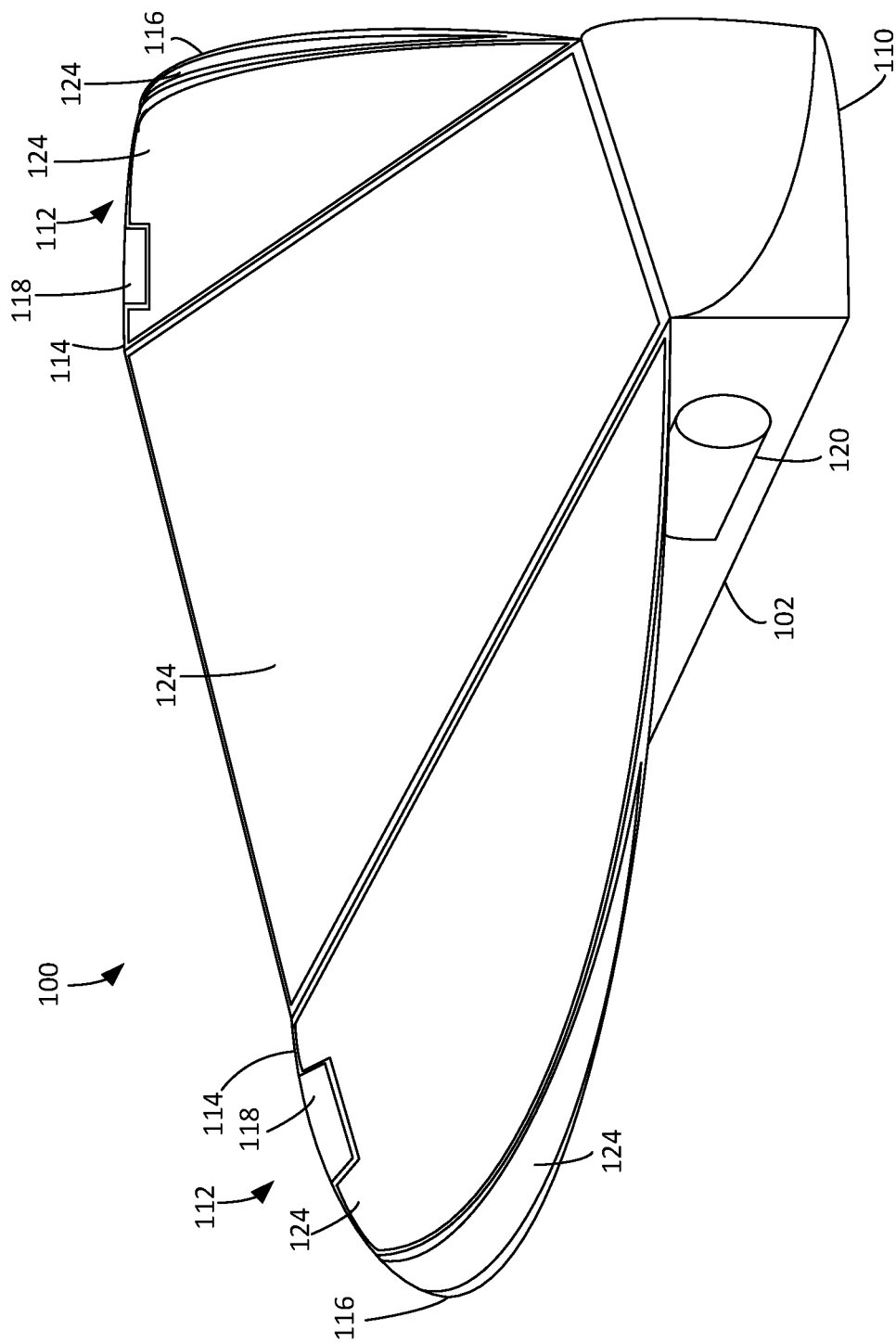
FIG. 2 is a top perspective view of a drone shipping system, according to another exemplary embodiment.
Figure 3:
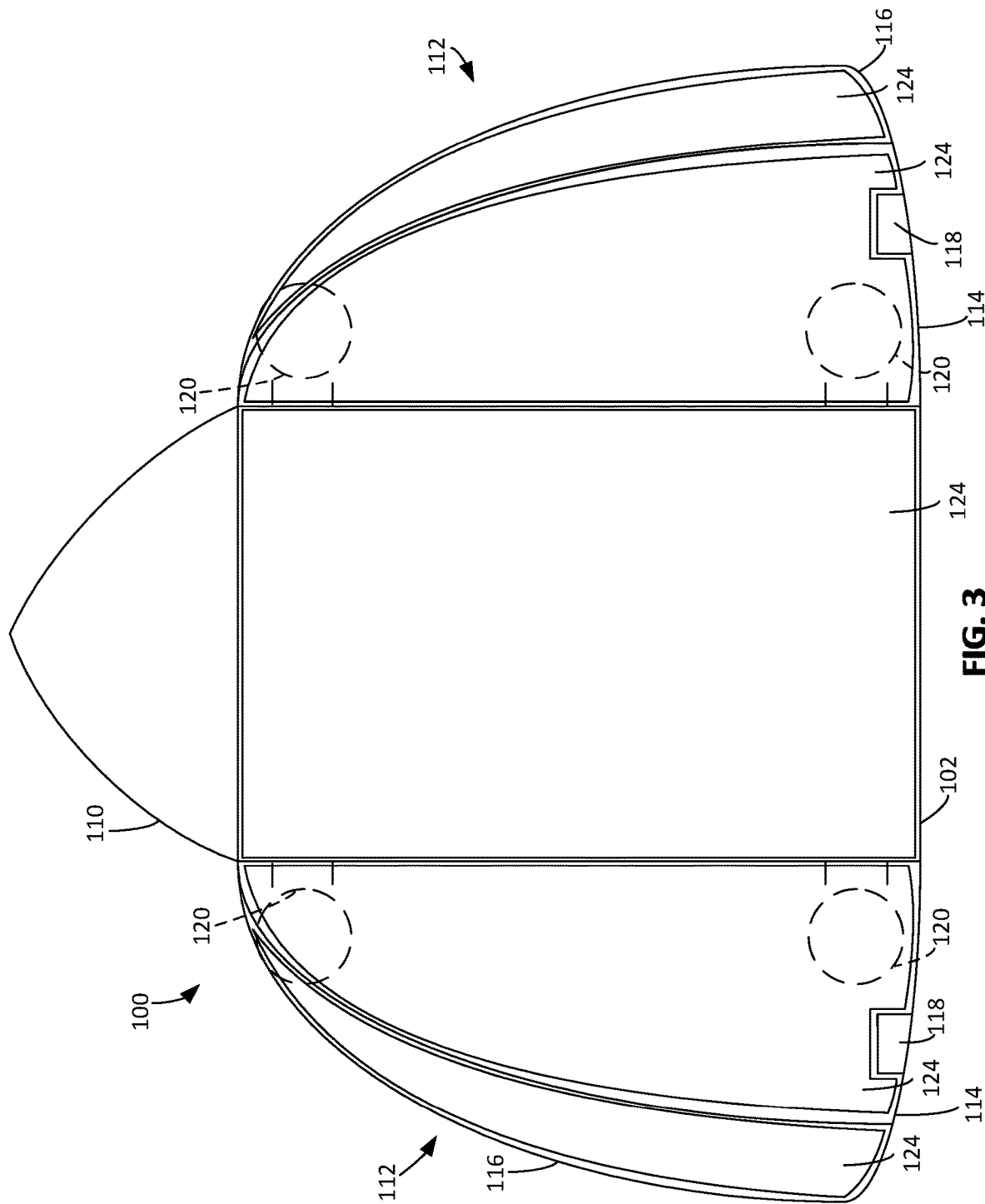
FIG. 3 is a top view of the drone shipping system of FIG. 2 in a first configuration, according to an exemplary embodiment.
Figure 4:
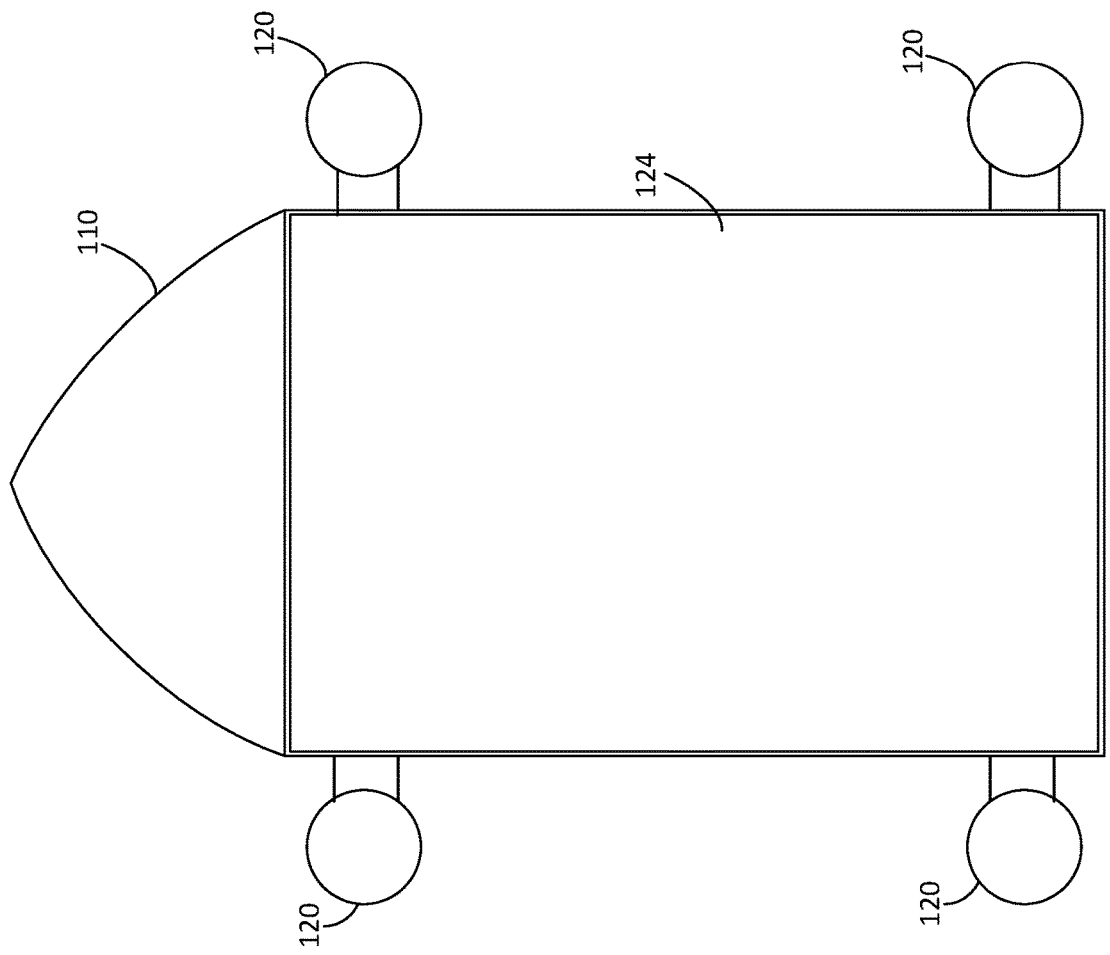
FIG. 4 is a top view of the drone shipping system of FIG. 2 in a second configuration, according to an exemplary embodiment.

FIGS. 2-4 illustrate the drone shipping system 100 according to another embodiment. In this embodiment, the solar panels 124 are provided along the outer assembly 116 and the inner assembly 114 of each of the wings 112, as well as along a top surface of the body 102. Additionally, FIG. 2 illustrates one of the propulsion devices 120 oriented horizontally. Such an orientation of the propulsion devices 120 may be utilized when, for example, the drone shipping system 100 is flying (e.g., once the drone shipping system 100 has reached a cruising altitude, etc.).

According to various embodiments, the wings 112 are operable between an extended state, as shown in FIG. 3, and a retracted state, as shown in FIG. 4. In one embodiment, the wings 112 are retracted by the outer assembly 116 sliding within the inner assembly 114, and the inner assembly 114 sliding within the body 102. In other embodiments, the wings 112 fold up. The wings 112 are in the extended state during operation of the drone shipping system 100 (e.g., during aerial movement of the drone shipping system 100, etc.) and in the retracted state while the drone shipping system 100 is stationary. For example, the wings 112 may be in the retracted state when the drone shipping system 100 is in storage, being loaded, refueling, and/or recharging.

Figure 5:
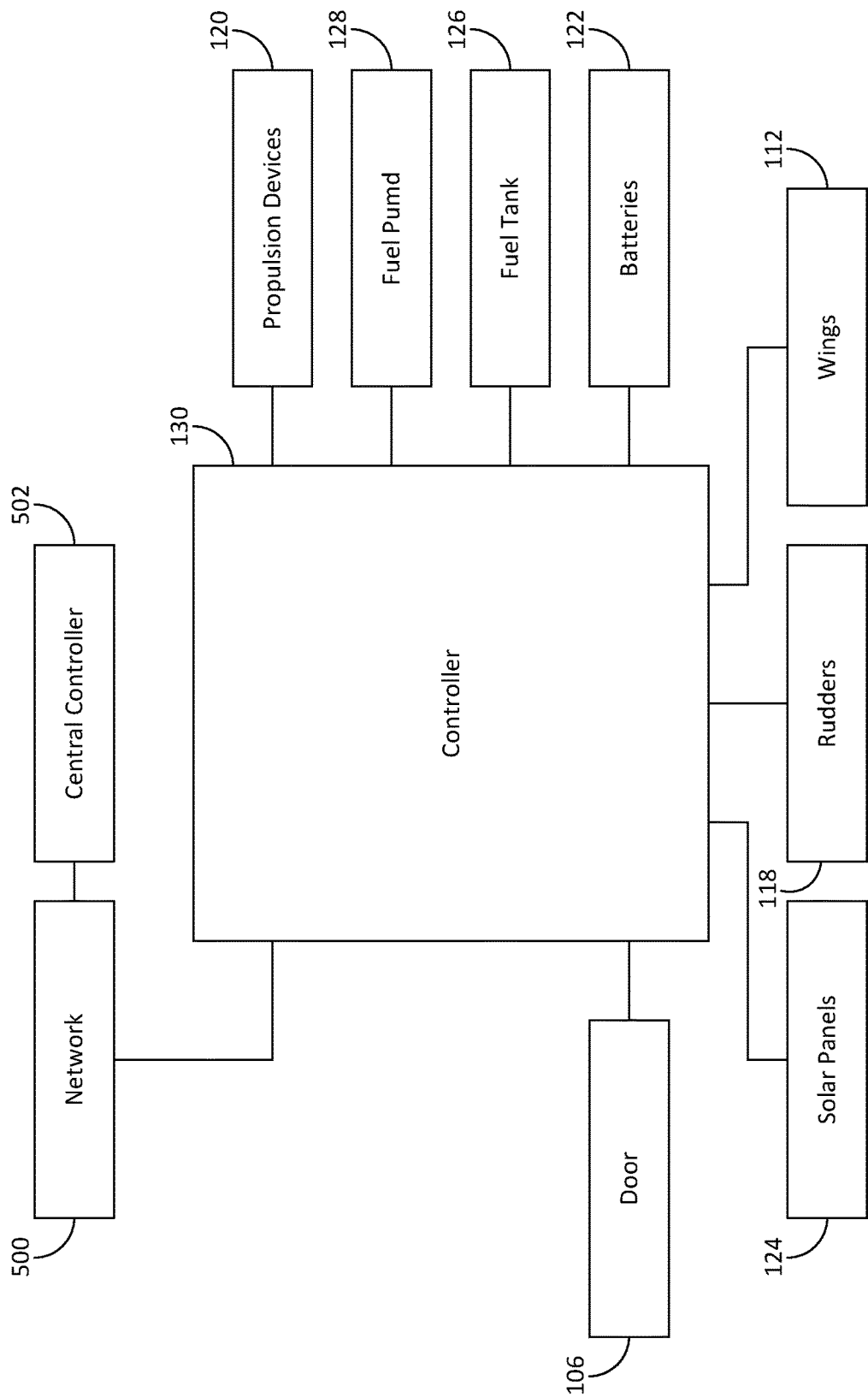
FIG. 5 is a block diagram for a controller for a drone shipping system, according to an exemplary embodiment.

As shown in FIG. 5, the controller 130 is communicable (e.g., over short range communication, over long range communication, etc.) with a network (e.g., satellite network, global network, cellular network, etc.), shown as network 500. The network 500 is communicable (e.g., over short range communication, over long range communication, etc.) with a controller, shown as central controller 505. In various embodiments, the communication between the controller 130 and the network 500, and the communication between the network 500 and the central controller 505, is facilitated over Bluetooth®, radio frequency identification, near field communication, Wi-Fi, cellular, radio, satellite, and other similar networks and communications protocols. For example, the controller 130 may include a Bluetooth® transceiver, a Bluetooth® beacon, a radio frequency identification transceiver, and other similar components.

In some embodiments, the central controller 505 is configured to communicate with and control the controller 130 onboard the drone shipping system 100. In such embodiments, the central controller 505 may thereby be configured to communicate with and control the drone shipping system 100. The controller 130 is configured to transmit information from the sensors 132 to the central controller 505. The central controller 505 provides instructions (e.g., coordinates, routes, delivery instructions, etc.) to the controller 130 for controlling operation of the drone shipping system 100. The central controller 505 provides these instructions based on the information from the sensors 132 provided by the controller 130 to the central controller 505.

Figure 6:
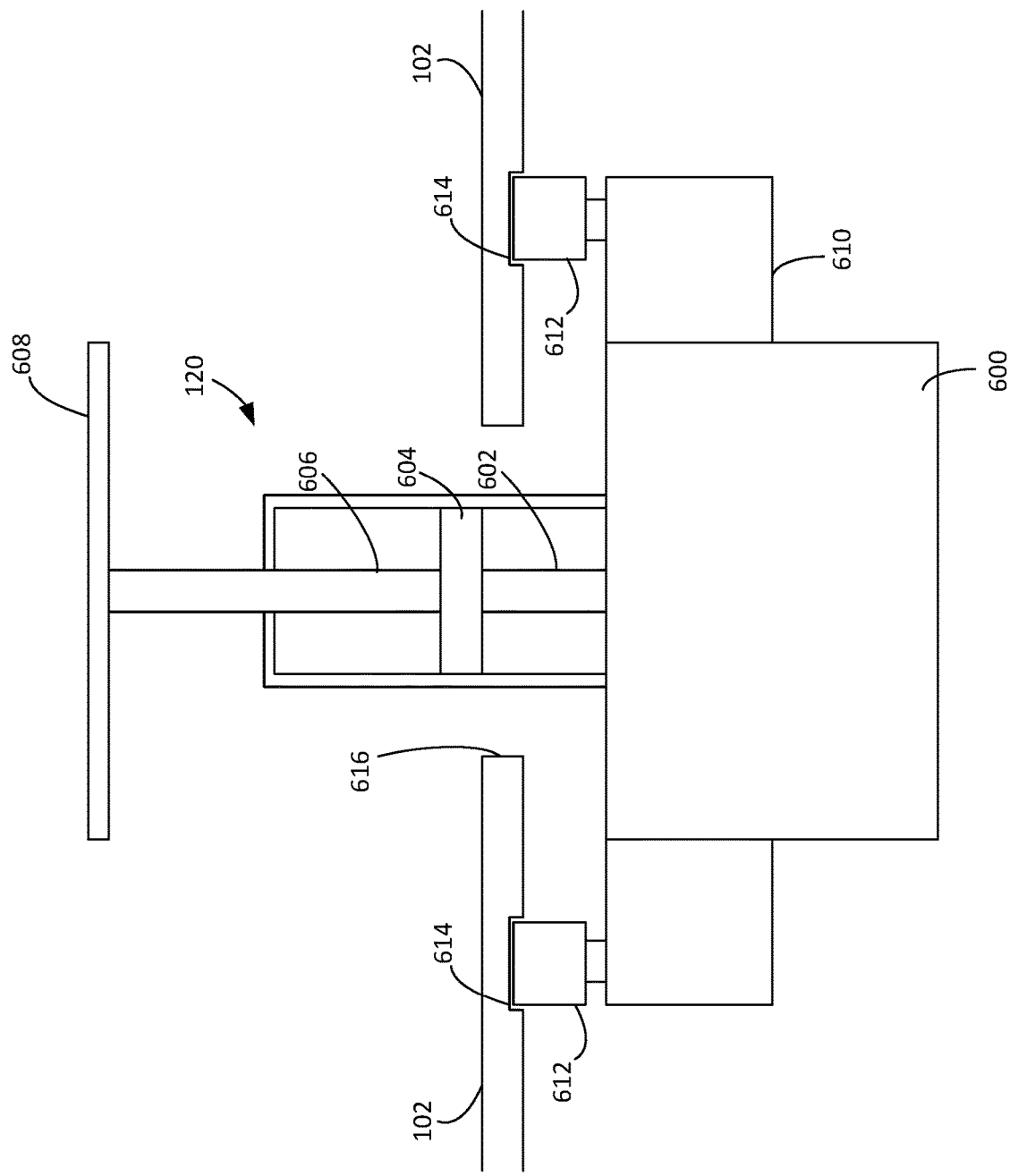
FIG. 6 is a detailed view of a portion of a drone shipping system, according to an exemplary embodiment.
Figure 7:
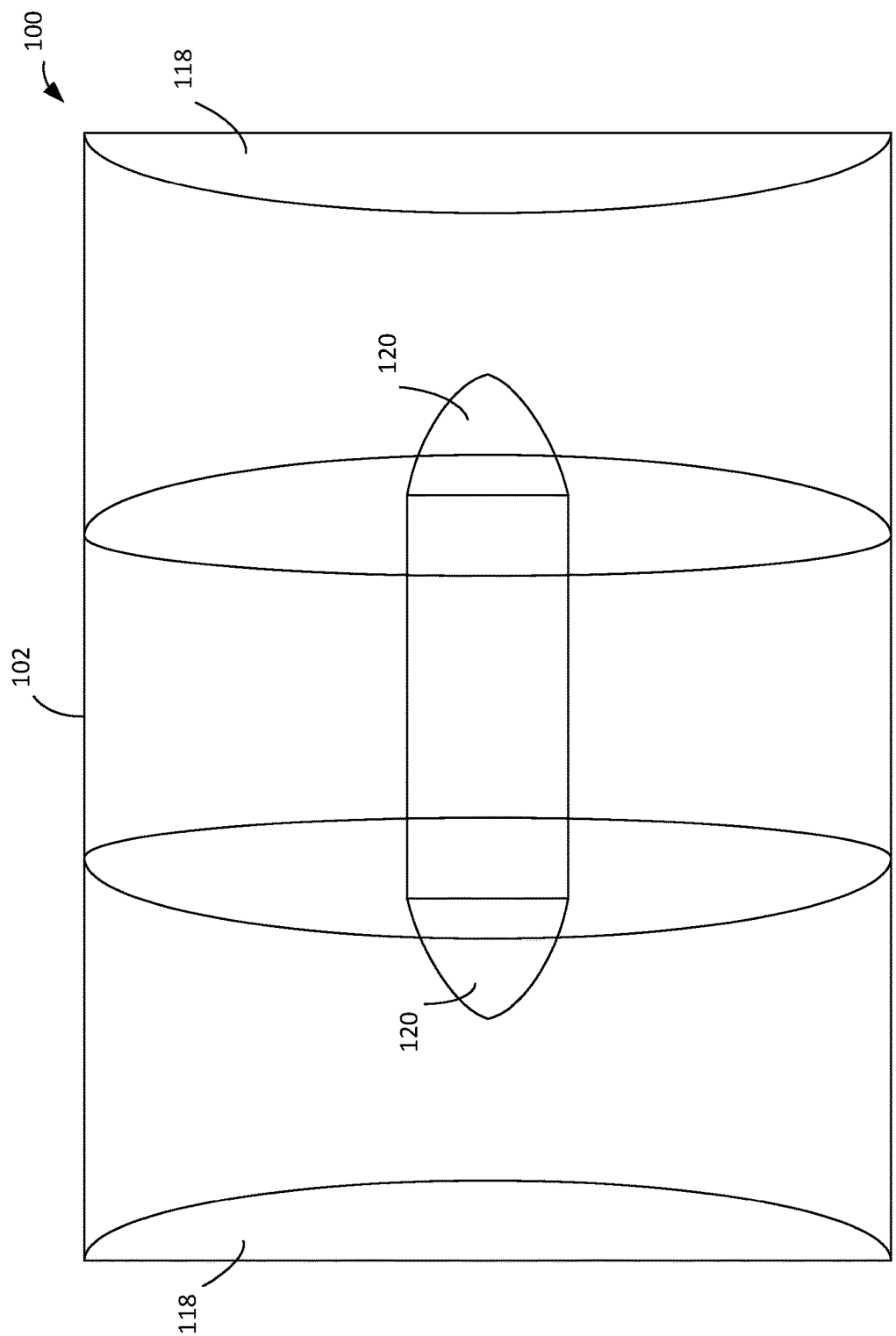
FIG. 7 is a bottom view of a drone shipping system, according to an exemplary embodiment.
Figure 8:
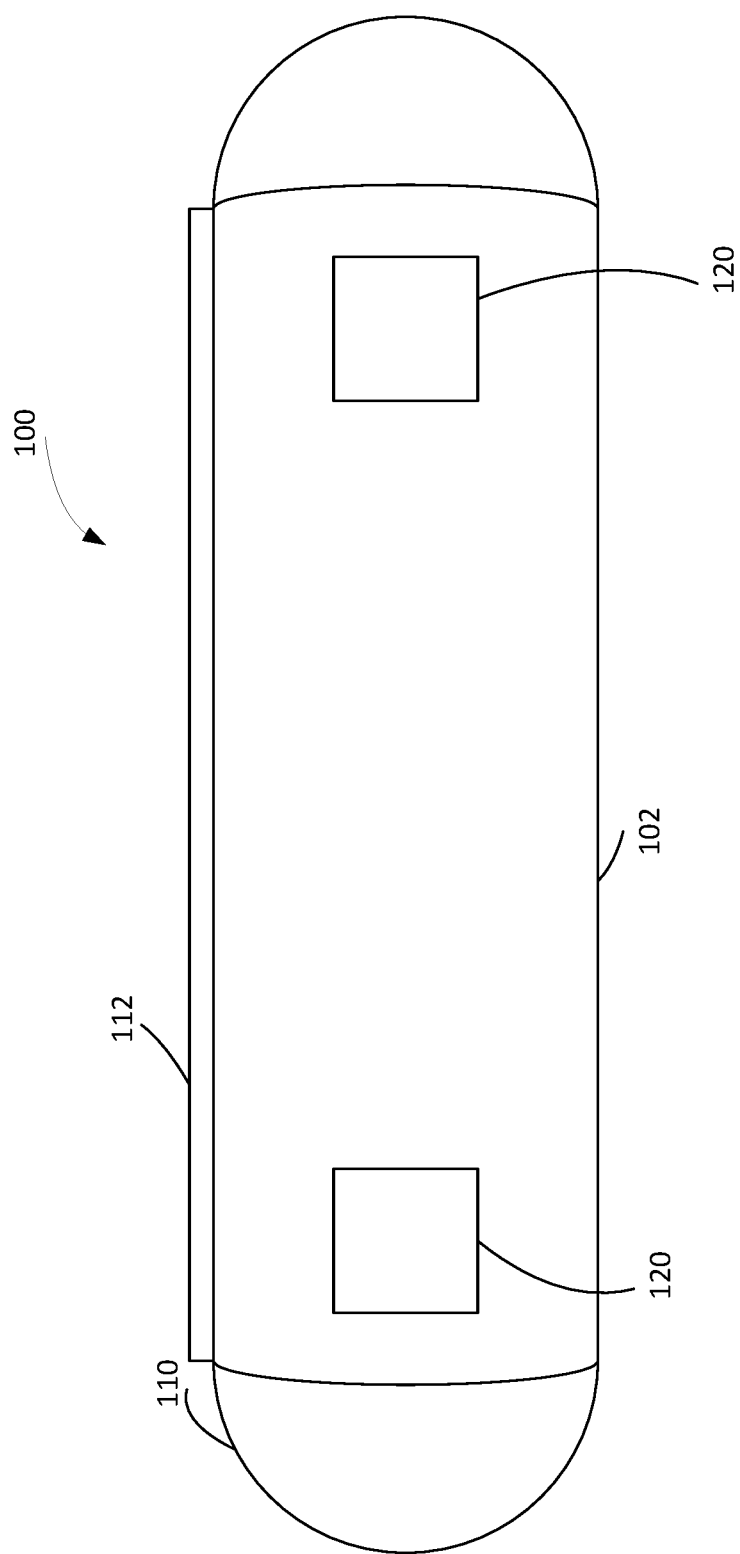
FIG. 8 is a side view of a drone shipping system, according to an exemplary embodiment.
Figure 9:
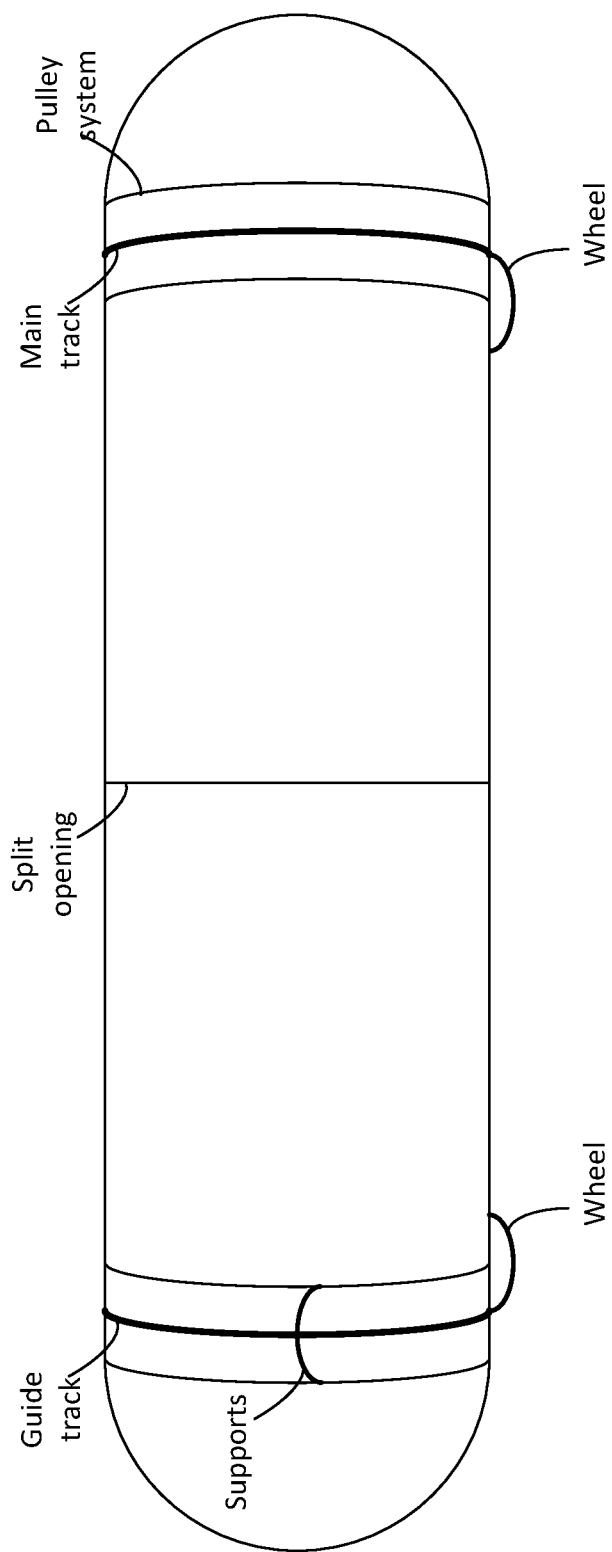
FIG. 9 is a side view of a drone shipping system, according to an exemplary embodiment.

FIG. 6 illustrates one of the propulsion devices 120 in greater detail, according to one embodiment. The propulsion device 120 includes an engine 600. The engine 600 may be an internal combustion engine and/or an electrical motor as previously described. The engine 600 may alternatively be an ionic engine as described in greater detail herein (e.g., ionic engine 1404, etc.). As shown in FIG. 6, the engine 600 is coupled to a crank 602 (e.g., driveshaft, etc.). The engine 600 is configured to selectively rotate the crank 602 according to commands received from the controller 130. The crank 602 is coupled to a hinge (e.g., a four-way hinge, etc.), shown as hinge 604. The hinge 604 is configured to transfer rotation of the crank 602 to a shaft 606. The hinge 604 facilitates rotation of the shaft 606 relative to the crank 602. The hinge 604 may be, for example, a U-joint. The shaft 606 transfers rotation of the crank 602 to an output (e.g., propeller, blade, turbine, etc.), shown as output 608.

As shown in FIG. 6, the engine 600 has a housing (e.g., a mount, etc.), shown as housing 610. The housing 610 contains the engine 600 and supports the engine 600 on the body 102. The housing 610 includes arms, shown as guides 612. The guides 612 are received in a track 614 of the body 102. Through the use of the guides 612 and the track 614, the engine 600 is track mounted to the body 102 such that the propulsion device 120 may be selectively repositioned along the track 614. The track 614 closely follows an opening, shown as channel 616, in the body 102. The crank 602 and/or the shaft 606 pass through the channel 616 such that the propulsion device 120 may be selectively repositioned along the body 102. Once the propulsion device 120 is at a target location on the track 614, the propulsion device 120 may be locked to the track 614 such that the propulsion device 120 does not move relative to the body 102. The propulsion device 120 may be locked in position using a latch, a catch, etc.

In various embodiments, the propulsion device 120 is positioned outside of the body 102. In these embodiments, the track 614 is on the exterior of the body 102. In other embodiments, the propulsion device 120 is mounted within an interior of the body 102. As a result of this arrangement, at least a portion of the propulsion device 120 is concealed within the body 102, thereby providing a decrease in air resistance of the drone shipping system 100.

The track 614 defines possible positions of the propulsion devices 120. Accordingly, the track 614 is configurable such that the propulsion devices 120 are mounted at target locations relative to the body 102. For example, the track 614 may partially or completely encircle the payload bay 104. In various embodiments, the body 102 includes multiple tracks 614 thereby facilitating additional repositioning of the propulsion devices 120 on the body 102. In an exemplary embodiment, the track 614 starts at a base of the body 102 and ends before the midpoint of a top of the body 102, opposite the base, where the track 614 on one side of the body 102 is mirrored and aligned with a track 614 on the opposing side of the body 102 (i.e., where the tracks 614 create the shape of two rings located close to the nose 110).

Each of the tracks 614 may have its own movement system (e.g., pulley system, motor system, etc.) that moves the propulsion device 120 along the track. For example, the tracks 614 and/or the guides 612 may include servo motors that are configured to be controlled by the controller 130 to cause movement of the propulsion devices 120 along the track 614.

In some embodiments, the body 102 has four tracks 614, using one of the configurations described above. One of the tracks 614 may encircle the body 102 along two fixed lines, near the front of the body 102 and near the back of the body 102. These tracks 614 may be split near a top midpoint of the body 102, and each of the tracks 614 may begin near a portion of the side of the body 102 that begins moving up at an angle of between seventy-five to one hundred and seventy degrees (the angle of the exterior panel in relation to ground), inclusive.

Each of the tracks 614 may include additional tracks 614 (e.g., guide tracks, etc.) located on either the interior or exterior of the body 102. If the propulsion devices 120 are mounted on the exterior of the body 102, there may be a total of four tracks 614 within which the propulsion device 120 moves, two on either side of the motor (i.e., an auxiliary track 614 spaced a small distance from a main track 614 (e.g., one foot, two feet, three feet, etc.) that are substantially parallel to the main track 614.

In some embodiments, the tracks 614 include a collapsible hydraulic system that is attached to the motor or propeller shaft of the propulsion device 120. The collapsible hydraulic arms may be located on either side of motor and may move with the motor in parallel along their individual tracks as the motor moves along its track. The hydraulic the motor may be mounted on an angular direction changing device where a four-way hinge allows the motor to move in four directions. The hinge may comprise two sections along the outward vertical axis of the hydraulic system. In some embodiments, the hydraulic system has a first hinge, which allows it to move in a first direction, and a second hinge above or below the first hinge, which allows it to move in a second direction that is substantially opposite the first direction. Joints at each hinge may have unique gear heads to allow power to be sent through the crank rod as the crank changes directions at each hinge point. The combination of the two hinges allows for a wide range of possible directions for the directional orientation of the propulsion device. In some embodiments, the hydraulic system has only one hinge that moves in in two opposing directions (i.e., up and down) along the track.

In alternative embodiments, the hydraulic system includes guide arms located at the base of the guide track that rotate one hundred and eighty degrees or three hundred and sixty degrees. In this way, the entire hydraulic system would not need to move along the track; only the guide arms would move to mirror the movements of the propulsion device. In some embodiments, the guides collapse (e.g., fold, etc.) in the direction of the main track to further support a change in direction of the propulsion device and body 102. In embodiments where the propulsion device is mounted to the exterior of the body 102, collapsible guides reduce drag and potential damage to the propulsion device as they are able to withstand the extreme forces that may occur during flight.

In alternative embodiments, the guide tracks are mounted the interior of the body 102. In these embodiments, the guide tracks may or may not include the collapsible hydraulic guides and track on the exterior of the body 102.

In an example embodiment, the engine 600 of the propulsion device may transfer, via the hinge system, power to the propeller of the propulsion device. The engine 600 may include a series of gears, where the bottom piece of the gear stays vertical and a top second gear head moves in three hundred and sixty degrees in one direction and one hundred and eighty degrees in a second direction along the first gear head. The unit outside of the gear head powers a change in direction at the hinge (e.g., via hydraulics, etc.); the gear transfers power to the propeller. The propeller may be mounted on a similar direction-changing gear head to allow the propeller to rotate at the end of the propulsion device.

In embodiments where the engine 600 is mounted on the exterior of the body 102, the propulsion device may transfer power via a flexible crank, where the unit that transfers power is bendable as it rotates and there are no gear heads. In embodiments where the engine 600 is mounted on the interior of the body 102, there may be further internal tack guides to anchor the engine 600 in the interior of the container.

In an alternative embodiment, the power transferring device does not have a hinge, flexible crank, or gear head that changes direction; the power transferring device has an internal rotating unit, including a crank that changes direction at the base of the crank on the interior of the body 102. The crank rotates one hundred and eighty degrees in one direction and three hundred and sixty degrees in a second direction, and the opening for the crank is wider to allow for the change of direction of the crank. The internal rotating unit may further be mounted on a track, which moves along the side of the body 102.

In some embodiments, the propeller of the propulsion device is a turbo prop with two propellers per unit. The propeller may spin forwards and reverse and may be able to change directions quickly. When changing directions, the propellers from one side may be locked in an upper most vertical positions to keep the body 102 suspended. The main track may have an enclosure lining (e.g., metal or any other sturdy material) on the interior of the body 102 to protect the engine 600 and tracks from the contents of the body 102. The pulley system, which allows the engine 600 to move along the main track, may be located at the bottom of the track, top of the track, or both the bottom and top.

In some embodiments, a parachute is fitted to the body 102 and can be deployed at various locations on the body 102 (e.g., nose, through the middle, its own compartment, etc.). The parachute may be deployed automatically or manually. By way of example, the parachute may be automatically deployed in situations where (i) passengers become unconscious, (ii) power is lost to one or more of the propulsion devices 120 and cannot be restored, (iii) the drone shipping system 100 is descending above a threshold speed, and/or (iv) the controller 130 detects loss of controls and/or critical sensor failure. A parachute deployment sequence may include first powering down the propulsion devices 120 and then deploying the parachute. By way of another example, the drone shipping system 100 may include a manual deployment input device (e.g., a button, a lever, etc.) for the parachute within a cabin of the drone shipping system 100 (e.g., near the rear upper portion of the cabin, other locations, etc.). Manual deployment may utilize compressed air.

In alternative embodiments, there is no track. Instead, arms extend to hold the propulsion device at a distance from the body of the body 102. The arms may comprise end portions, which are able to rotate three hundred and sixty degrees. The portion of the arms that is connected to the propulsion device may be able to tilt in two directions in order to push and pull the propulsion device, while allowing the unit to spin in three hundred and sixty degrees.

In some embodiments, the body 102 includes two wings which extend from the sides of the body 102. In some embodiments, the wings are flush with the top of the body 102. The wings may be the full width of the drone (i.e., the wing span is three times that of the starting width of the roof of the body 102). The wings reduce the amount of power and/or fuel needed for flight once the body 102 is airborne. According to various embodiments, the wings are collapsible (e.g., foldable) and lay flush with the sides of the body 102 when collapsed. The wings may comprise flaps at the rear edge to change pitch of the drone and allow for turning at high speed.

In some embodiments, split wings may swing out from a starting position (i.e., flush with the sides of the body 102) then become further secured to the body 102. When the wings are extended, the body 102 may have a further bolting mechanism that locks the extended wing in its extended position. In some embodiments, the bolts are coupled (e.g., welded) to the wings and attach to the side of the body 102 when extended. In alternative embodiments, the bolts are coupled (e.g., welded) to the sides of the body 102 and attach to the bottom of the wings when extended. In some embodiments, the wings move along a track.

In some embodiments, the wings have solar panels. According to some embodiments, the solar panels are exposed when the wings are collapsed. As the wings extend, additional solar panels are exposed. The wings may extend while on the ground for maximum charging. In some embodiments an exposed portion (e.g., the upper exposed portion, etc.) of body 102 has solar panels.

The body 102 may be of various shapes, sizes, and configurations such that the drone shipping system 100 is tailored for a target application. The body 102 may be generally shaped as a rectangular prism. In other embodiments, the body 102 may be generally shaped as a rectangular prism with rounded or coned corners. These rounded or coned corners may provide decreased air resistance.

In one embodiment, the body 102 is constructed from aluminum (e.g., aluminum alloy, etc.), composite metals, other metals, composite materials, etc. The body 102 may be treated or otherwise configured to increase strength, durability, and/or efficient operation of the drone shipping system 100. For example, the body 102 may be corrugated. The body 102 may be configured such that a weight of the payload bay 104 is distributed evenly to the body 102.

In some embodiments, the body 102 is configured such that the payload bay 104 is configured to receive liquids and/or gases therein, and configured such that these liquids and/or gases may be pressurized therein. For example, the payload bay 104 may be configured to store pressurized liquids (e.g., petroleum, liquid natural gas, water, liquid nitrogen, etc.) and/or gases (e.g., nitrogen, helium, etc.).

In other embodiments, the body 102 is configured such that the payload bay 104 is insulated (e.g., sound insulated, thermally insulated, vibrational insulated, etc.). For example, in one embodiment, the body 102 is configured such that the payload bay 104 is insulated from sound produced by the propulsion devices 120.

The body 102 may include various openings, holes, and/or doors. The door 106 may be split into multiple individual doors. For example, the door 106 may be split in half (e.g., vertically, diagonally, horizontally, etc.). In one embodiment, the door 106 is positioned on a front side of the body 102. In various applications, the door 106 may be mechanically, electrically, hydraulically, or otherwise selectively repositioned between a first position, where the payload may be loaded into, and unloaded from, the payload bay 104, and a second position, where the payload is contained within the payload bay 104. In one embodiment, the door 106 automatically locks in the second position once the payload has been loaded into the payload bay. The door 106 and the opening 108 may be sealed (e.g., form an airtight seal, for a watertight seal, etc.) when the door 106 is in the second position to prevent the payload from undesirable exposure to a fluid (e.g., water, etc.) or gas (e.g., air, etc.)

The nose 110 may be selectively repositionable relative to the body 102. In some embodiments, the nose 110 is coupled to the body 102 via a hinge such that the nose 110 can be selectively repositioned to provide access to the payload bay 104 (e.g., for loading or unloading a payload, etc.). In other embodiments, the nose 110 is configured to be selectively raised and/or lowered relative to the body 102 to provide access to the payload bay 104. In some embodiments, the drone shipping system 100 includes a nose 110 on both ends of body 102. One or both of the noses 110 may open such that the payload may move through each nose 110.

In some embodiments, the drone shipping system 100 includes a plurality of movement members (e.g., wheels, tracks, rollers, etc.) configured to facilitate movement of the drone shipping system 100 along a surface (e.g., a ground surface, a landing pad, a tarmac, etc.). The movement members may be selectively retracted into, and selectively extended from, the body 102. For example, the movement members may be retracted into the body 102 during flight of the drone shipping system 100, thereby facilitating maximum aerodynamic properties of the drone shipping system 100, and extended from the body 102 just prior to the drone shipping system 100 landing on a surface (e.g., during a landing operation, etc.). In one embodiment, the drone shipping system 100 includes four retractable wheels. The movement members may be selectively extended to facilitate vertical landing and takeoff of the drone shipping system 100. For example, the movement members may elevate the drone shipping system 100 from a surface by a distance (e.g., ten feet, five feet, three feet, etc.) that facilitates use of the propulsion devices 120 to enable the drone shipping system 100 to take off and land vertically. This distance may be selected such that the propulsion devices 120 do not substantially affect (e.g., burn, scorch, melt, heat, etc.) the surface.

In various embodiments, the wings 112 are air foil shaped. The rudders 118 are defined by a surface area. In various embodiments, the surface area of the rudders 118 may be, for example, four square feet, eight square feet, and other similar areas. The rudders 118 are defined by a thickness. The thickness of the rudders 118 is selected such that the rudders 118 are capable of operating desirable during aerial travel of the drone shipping system 100. The rudders 118 may each include a plurality of actuators and sensors. The actuators may function to cause selective repositioning of the rudders 118. The actuators may be, for example, electronic, pneumatic, and/or hydraulic actuators.

In one embodiment, each of the propulsion devices 120 includes two electric engines with counter rotating duct fans. In this embodiment, there are two fans within the duct, each spinning in an opposite direction as the other within the duct. In this embodiment, each fan includes between, for example, five and ten blades. Each blade may have a diameter of between one foot and five feet, inclusive. Furthermore, the fans may be separated by a distance of, for example, two inches to one foot, inclusive, between the fans within the duct and the duct may be, for example, between two and four feet long, inclusive. This arrangement generates a large amount of force within a small area, thereby facilitating the use of relatively smaller propulsion devices 120. Changing the number of blades, changing the shape of the blades, and/or changing the angle of the blades of each fan may increase or decrease the thrust of propulsion device 120. Changing the distance between each fan may increase or decrease the thrust of propulsion device 120. Additionally, this arrangement facilitates rapid changes in the position of the drone shipping system 100, increases the stability of the drone shipping system 100, and is efficient, thereby increasing the range of the drone shipping system 100. Each fan may be powered by its own electric engine. The electric engine may be positioned directly below or above the fan within the duct. There may be two individual electric engines in each ducted propulsion device 120. One engine may be positioned below one fan while the other engine for the opposing rotating fan may be positioned above or vice versa. Alternatively, one may be below and the other may be above or one may be above and the other below. An engine configuration where the top fan is unobstructed (i.e. where the engine for the top fan is below the top fan) may provide higher thrust. Each engine within the duct may have an aerodynamic shape and may be centered within the duct to decrease drag within the duct and improve power output of propulsion device 120 (e.g., the engine may be in the shape of a cylinder, cone, etc.). Additionally, the counter rotating duct fan propulsion system uses energy efficiently to extend the power of the batteries 122 and/or the range of the drone shipping system 100. The propulsion devices 120 may include pitching blades located at the bottom of the duct that facilitates further increased stability.

In alternative embodiments, the counter rotating fans are fixed within the body of the propulsion device 120, where a portion of the body 102 of the drone shipping system 100 allows air to flow through from one side to the other. The counter rotating fans may be within the body 102, near the nose 110, or at the four corners of the body 102.

In some embodiments, each of the propulsion devices 120 is selectively repositionable between a first position, where the propulsion devices 120 are oriented generally vertically, and a second position, where the propulsion devices 120 are oriented generally horizontally. The drone shipping system 100 may operate with the propulsion devices 120 in the first position during vertical take-off and landing and may operate with the propulsion devices 120 in the second position during aerial movement of the drone shipping system 100. The first position and the second position may be, for example, ninety degrees, one-hundred and eighty degrees, three-hundred and sixty degrees, forty-five degrees, or sixty degrees apart.

The propulsion devices 120 may be coupled to the body 102 at various locations. For example, the propulsion devices 120 may be coupled to a top surface of the frame, to the sides of the body 102 (e.g., underneath the wings 112, etc.), and other similar locations. In some embodiments, at least one propulsion device 120 is coupled to at least one of the wings 112. For example, the drone shipping system 100 may be configured with one propulsion device 120 coupled to each of the wings 112. The propulsion devices 120 may be partially concealed within the body 102.

In some embodiments, the propulsion devices 120 are propellers. For example, the propulsion devices 120 may be fixed pitched propellers, controllable pitch propellers, highly skewed propellers, self-pitching propellers, tip vortex free ("TVF") propellers, and/or balance thrust ("BTL") propellers. In these embodiments, the drone shipping system 100 may include a plurality of cages coupled to the body 102 such that each of the propulsion devices is encapsulated in a cage. The cages may prevent interference with the propulsion devices (e.g., due to birds, etc.).

In some embodiments, the body 102 includes only one propulsion device 120. The single propulsion device 120 may be centered on the body 102 and may be relatively powerful (e.g., compared to other embodiments of the drone shipping system 100 that include multiple propulsion devices 120, etc.).

The propulsion devices 120 may be removably coupled to the body 102. For example, the propulsion devices 120 may be coupled to the body 102 using removable fasteners. In this way, the propulsion devices 120 may be removed from the drone shipping system 100 and utilized by another drone shipping system 100. Similarly, this may allow the propulsion devices 120 may be easily upgraded, serviced, and/or replaced. In some applications, the propulsion devices 120 include chemical engines and other similar engines rather than, or in addition to, the combustion engine, the electric engine, or the ionic engine discussed above.

In some embodiments, at least some of the propulsion devices 120 only consume one of electrical energy and fuel. For example, the drone shipping system 100 may be configured so that all of the propulsion devices 120 only consume electrical energy. In this example, the drone shipping system 100 may not include the fuel tank 126 and the fuel pump 128. In another example, the drone shipping system 100 may be configured so that all of the propulsion devices 120 only consume fuel. In this example, the drone shipping system 100 may not include the batteries 122.

The batteries 122 may be, for example, lithium polymer batteries, lithium ion batteries, cadmium batteries, high capacity batteries, light weight batteries, other similar batteries, other batteries, etc. The batteries 122 may be coupled together such that one of the batteries 122 may provide electrical energy to another of the batteries 122. Additionally, the batteries 122 may be shared amongst multiple propulsion devices 120 (e.g., such that the multiple propulsion devices 120 are provided electrical energy from the shared battery 122, etc.). The drone shipping system 100 may be powered by a hybrid system including a battery-powered motor and a gas-powered or other fuel powered engine that is used to charge batteries 122 when the batteries 122 have a low level of electricity.

While not shown in FIG. 1, it is understood that the batteries 122 may be electrically coupled to various components of the drone shipping system 100 other than the propulsion devices 120. For example, the batteries 122 may be electrically coupled to each of the wings 112 (e.g., to facilitate movement of the outer assemblies 116 with respect to the inner assemblies 114, etc.), each of the rudders 118 (e.g., to facilitate movement of the rudders 118, etc.), to the controller 130, to various lights on and within the body 102 and/or the wings 112, and/or to various instrumentation of the drone shipping system 100 (e.g., sensors, radar systems, communications systems, etc.).

Instead of, or in addition to, the solar panels 124, the drone shipping system 100 may incorporate other electrical energy supplies. For example, the drone shipping system 100 may incorporate a nuclear reactor (e.g., a compact nuclear fusion reactor, etc.) and/or a hydrogen fuel cell configured to produce electrical energy for supplying to the propulsion devices 120.

The drone shipping system 100 may be configured with one of the sensors 132 positioned within the payload bay 104. This sensor 132 may monitor conditions (e.g., temperature, pressure, humidity, etc.) within the payload bay 104. Additionally, this sensor 132 may be configured to read radio frequency identification ("RFID") tags placed on items located within the payload bay 104. In this way, the controller 130 can provide information to the central controller 505 that the items are located in the payload bay 104. This may allow the external system to provide, for example, estimated delivery times and tracking updates for the items.

The controller 130 may include various modules dedicated to performing functions of the controller 130. For example, the controller 130 may include a first module for communicating with, controlling, and interpreting the sensor data from the wings 112, a second module for communicating with, controlling, and interpreting the sensor data from the rudders 118, a third module for communicating with, controlling, and interpreting the sensor data from the propulsion devices 120, a fourth module for communicating with, controlling, and interpreting the sensor data from the batteries 122, a fifth module for communicating with, controlling, and interpreting the sensor data from each of the solar panels 124, a sixth module for communicating with, controlling, and interpreting the sensor data from the fuel tank 126, and a seventh module for communicating with, controlling, and interpreting the sensor data from the fuel pump 128.

The drone shipping system 100 may be cooperatively controlled with other drone shipping systems 100. Through the network 500, the controller 130 may communication with other drone shipping systems 100 either through the central controller 505 or through the network 500 directly. In this way, operations involving multiple drone shipping systems 100 may be coordinated and/or synchronized. For example, if an item is being delivered by a drone shipping system 100 to a location, the progress of the drone shipping system to that location could be transmitted to another drone shipping system 100 tasked with picking up the item from the location.

While the propulsion device 120 has been described as being coupled to the frame using the guides 612 and the track 614, it is understood that the propulsion device 120 may be permanently coupled to the body 102. For example, the housing 610 may be welded or fastened to the body 102.

Figure 10:
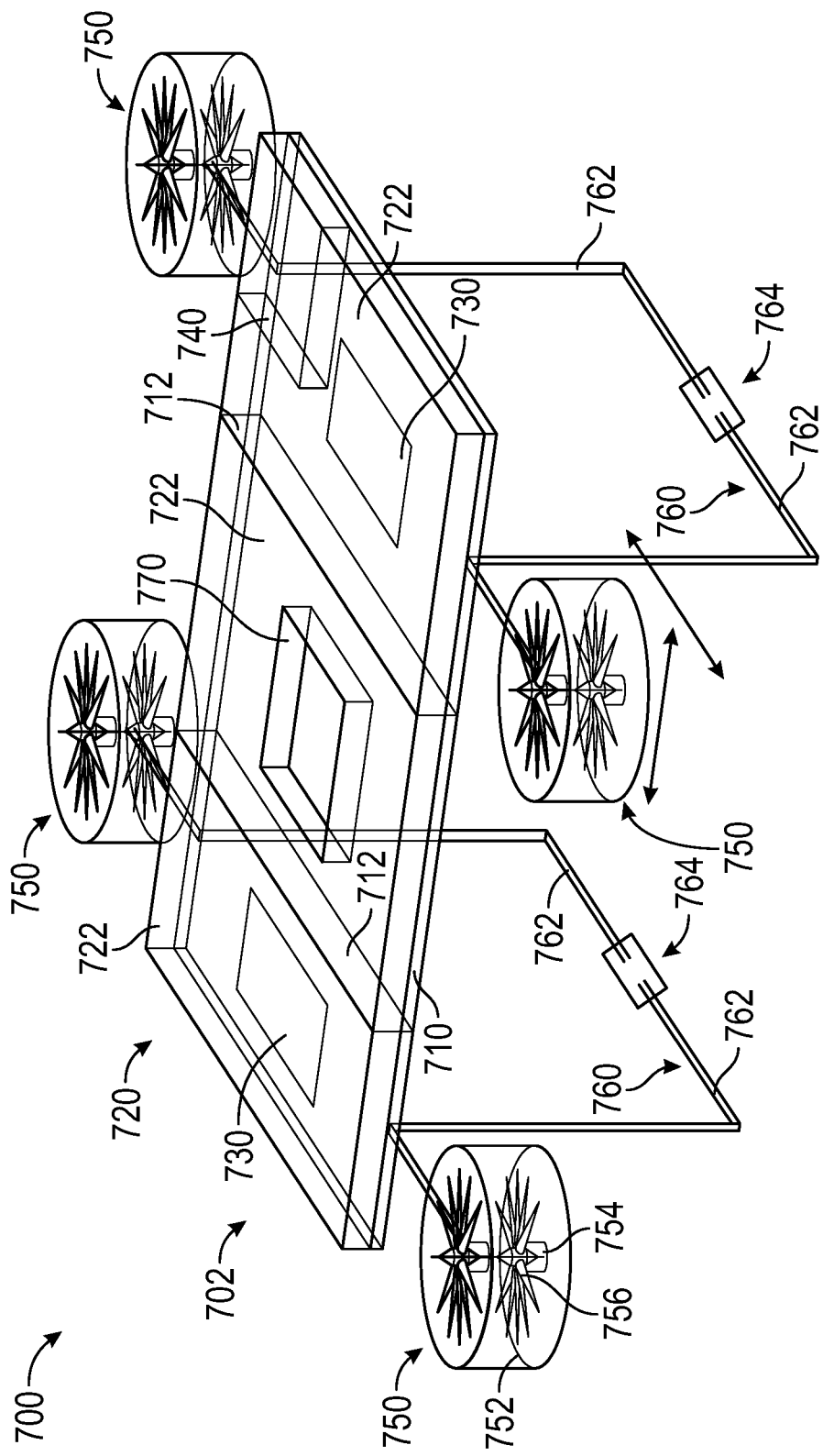
FIG. 10 is a perspective view of a drone shipping system in a first configuration, according to an exemplary embodiment.
Figure 11:
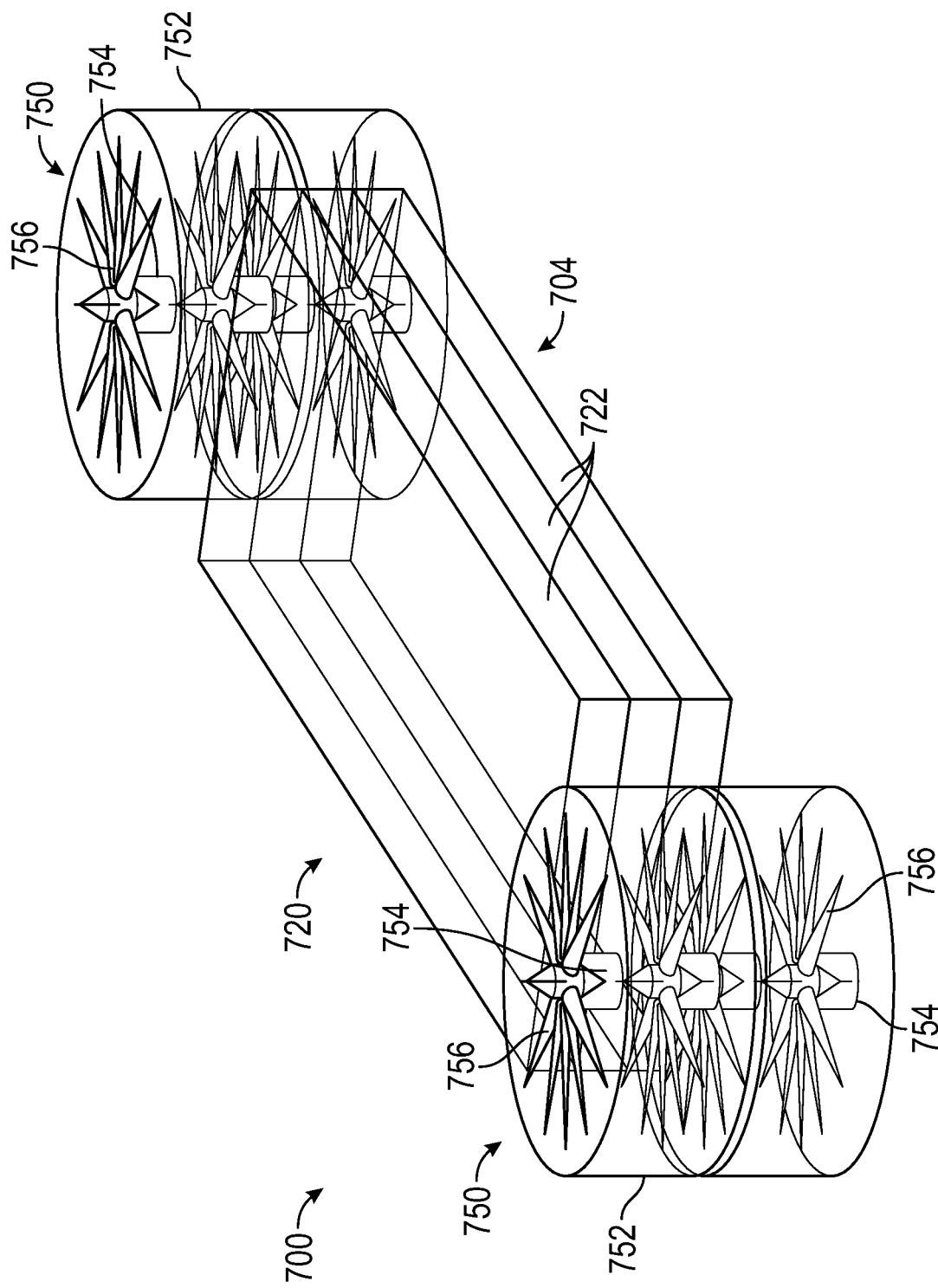
FIG. 11 is a perspective view of the drone shipping system of FIG. 10 in a second configuration, according to an exemplary embodiment.

According to the exemplary embodiment shown in FIGS. 10-13, engines, batteries, and/or other flight systems are combined together to form a flight unit system or portable drone system, shown as drone system 700, that is configured to transport objects (e.g., a shipping container, ISO container, a car, a package, passengers, a payload, etc.) through the air from a starting location (e.g., a pickup location, etc.) to a final destination (e.g., a delivery location, a drop zone, etc.). As shown in FIGS. 10 and 11, the drone system 700 includes a chassis, shown as support frame 710; a battery system, shown as battery mat 720, that is coupled to the support frame 710; one or more solar panels, shown as solar panels 730, that are electrically coupled to the battery mat 720; a control system, shown as flight control system 740; a plurality of propulsion devices, shown as propulsion devices 750; and a plurality of support assemblies, shown as support assemblies 760. In some embodiments, the drone system 700 does not include the solar panels 730.

As shown in FIG. 10, the battery mat 720 of the drone system 700 includes one or more batteries, shown as battery cells 722, that are coupled to (e.g., fixed to, detachably coupled to, etc.) the support frame 710. According to an exemplary embodiment, the battery cells 722 of the battery mat 720 are rechargeable. Various types of rechargeable batteries may be used (e.g., lithium ion, etc.). The battery mat 720 may have a capacity that facilitates extended flight times (e.g., flight times exceeding 1, 3, 5, 10, 24, etc. hours). The battery mat 720 may be variously sized based on the intended use (e.g., flight distance, payload capacity, etc.) of the drone system 700. By way of example, the battery cells 722 of the battery mat 720 may span an area of 1 square foot (e.g., 1'×1', 2'×0.5', etc.), 2 square feet (e.g., 1'×2', 4'×0.5', etc.), 4 square feet (e.g., 2'×2', 1'×4', etc.), 8 square feet (e.g., 2'×4', 1'×8', etc.), 16 square feet (e.g., 2'×8', 4'×4', etc.), 64 square feet (e.g., 8'×8', 16'×4', etc.), 160 square feet (e.g., 8'×20', etc.), 320 square feet (e.g., 8'×40', etc.), and/or other larger or smaller areas. The battery cells 722 may have a thickness between 0.25 inches and 36 inches. The battery cells 722 may be positioned closely together in or separated in a series electrical arrangement and/or a parallel electrical arrangement.

As shown in FIG. 10, the solar panels 730 are positioned on top of the battery mat 720. In some embodiments, each battery cell 722 is electrically coupled to an associated solar panel 730. In other embodiments, a respective solar panel 730 is electrically coupled to two or more battery cells 722. According to an exemplary embodiment, the solar panels 730 are configured to generate electrical energy (e.g., from light, the sun, etc.) to power various systems of the drone system 700 (e.g., the flight control system 740, the propulsion devices 750, etc.) and/or charge the battery cells 722. The solar panels 730 may facilitate extending the flight duration of the drone system 700 and/or facilitate substantially continuous flight (e.g., days, months, etc.) without having to charge the battery mat 720 using mains power.

The battery mat 720 may be covered by a protective weathering layer such that the battery cells 722 and other flights electronics are shielded from weathering and the elements. Wiring and engine components may be protected by weather resistant coatings. In some embodiments, portions of the bottom and/or sides of the battery mat 720 are manufactured from a metal sheet or other rigid material to provide the support frame 710. In other embodiments, the support frame 710 is an independent component that receives the battery mat 720. The support frame 710 is configured to provide support to the battery mat 720 and the drone system 700 (e.g., to maintain the integrity of drone system 700 during flight, etc.).

In some embodiments, the support frame 710 and the battery mat 720 are configured to fold or roll such that portions of the battery mat 720, the support frame 710, and/or the propulsion devices 750 may stack on top of each other during transport such that the battery mat 720 and the support frame 710 may be stored and/or transported more easily. As shown in FIG. 10, the support frame 710 includes one or more hinges, shown as hinges 712, variously spaced along the length thereof (e.g., spaced based on the size of each battery cell 722, etc.). As shown in FIGS. 10 and 11, the hinges 712 facilitate selectively collapsing or folding the drone system 700 between a first configuration, shown as flight configuration 702, and a second configuration, shown as compact configuration 704. The compact configuration 704 may make it easier to store and/or transport the drone system 700 (i.e., when not in flight).

The flight control system 740 may be located within or in close proximity to the battery mat 720 (e.g., enclosed within a portion of the battery mat 720, above the battery mat 720, in between respective battery cells 722, below the battery mat 720, to the side of the battery mat 720, etc.). The flight control system 740 may include one or more onboard computers that facilitate providing at least one of autonomous flight control, partial autonomous flight control, and manual flight control of the drone system 700. By way of example, the flight control system 740 may include software that autonomously operates the drone system 700. By way of another example, the flight control system 740 may allow an operator to remotely take over control of flight operations during a portion of the flight (e.g., during take-off, during landing, when an operator requests to take control during any portion of the flight, etc.).

In some embodiments, the flight control system 740 includes flight measurement devices or sensors (e.g., an altimeter, GPS, airspeed sensors, temperature sensors, pressure sensors, cameras, proximity sensors, radar, LIDAR, ultrasound, etc.) that assist in the autonomous flight control and/or manual flight control. In some embodiments, the flight control system 740 includes a wireless transceiver that facilitates wirelessly communicating to a remote location, a remote controller, a nearby object, etc. (e.g., for data transmission, flight control, etc.). The wireless transceiver may utilize any suitable long range communication means including radio, cellular (e.g., 3G, 4G, 5G, etc.), etc. to facilitate long range communication with a remote device (e.g., a remote computer, a remote controller, a server, etc.). The wireless transceiver may additionally or alternatively utilize any suitable short range communication means including Bluetooth, near field communication ("NFC"), RFID, etc. to facilitate short range communication with nearby drones while in flight so that the drone system 700 is aware of the location of the nearby drones when making flight decisions. The flight software of the flight control system 740 may adjust the flight path of the drone system 700 while in flight based on the location of other drones and/or the measurements made by the flight measurement devices.

In some embodiments, at least a portion of the operations of the flight control system 740 is performed by a remote flight control system or the flight control system 740 is a remote flight control system (e.g., a master remote shipping server, etc.). The remote control system may be configured to set a flight path for the drone system 750 or for multiple drone systems 700 simultaneously. The remote control system may process flight and geographic information (e.g., longitude, latitude, altitude, flight speed, temperature, vision controls, battery usage, etc.) from one or more drone systems 700. The remote control system may communicate flight path information (e.g., coordinates, flight directions, flight control sequences, etc.) to each individual drone. Each of the drone systems 700 may then take appropriate measures on the drone flight systems or the remote control system may determine the appropriate measures on the systems and communicate instructions directly to the flight systems without onboard software being needed on the drones to analyze instructions. The remote control system may change the flight path of one or more drones during flight, in real time (e.g., if a cancellation order for a shipment is received through an online purchase system, etc.). The flight control system 740 on the drones or the remote control system may determine when a destination or loading warehouse has been reached though GPS on the drone. The flight control system 740 on the drones and/or the remote control system may perform operations upon arrival such as opening a door or unlocking latch on a door to an interior drone compartment for manual or autonomous loading/unloading at the loading location or the delivery location.

The remote control system may receive information from third party systems such as an order fulfillment system or online ordering system. The remote control system may be configured to determine an appropriate drone system located at a drone storage warehouse and/or goods storage warehouse for an order based on the order information (e.g., size, weight, destination, etc.). The remote control system may interface with systems in a warehouse that may autonomously find and identify goods and relay weight information to the remote control system. The remote control system may interface with ground movement systems (e.g., autonomous forklifts, etc.) in the warehouse to move goods to load selected drones or the drones may be loaded manually. The remote control system may be configured to estimate flight time of drones based on weather patterns and calculated distance of travel, which may be synchronized with warehouse systems to determine available drones, maintenance timing, etc. for coordination of available drones for future trips from a fleet of drones. The remote control system may be configured to calculate, load, and dispatch drones autonomously and may relay expected delivery information (e.g., time, shipping costs, etc.) through the online ordering systems to a third party (e.g., end consumer, etc.). The remote control system may calculate loading times from the warehouse to the drone, as a factor of the delivery time, which may then be relayed to a third party (e.g., the end consumer, etc.).

The remote control system can perform the above mentioned procedcures for a plurality of drones simultaneously. The remote control system may include servers that are localized for a specific fleet in a specific territory. Information of the localized servers may be shared with national servers and shared with other jurisdictions, air flight controls, military, etc.

Figure 12:
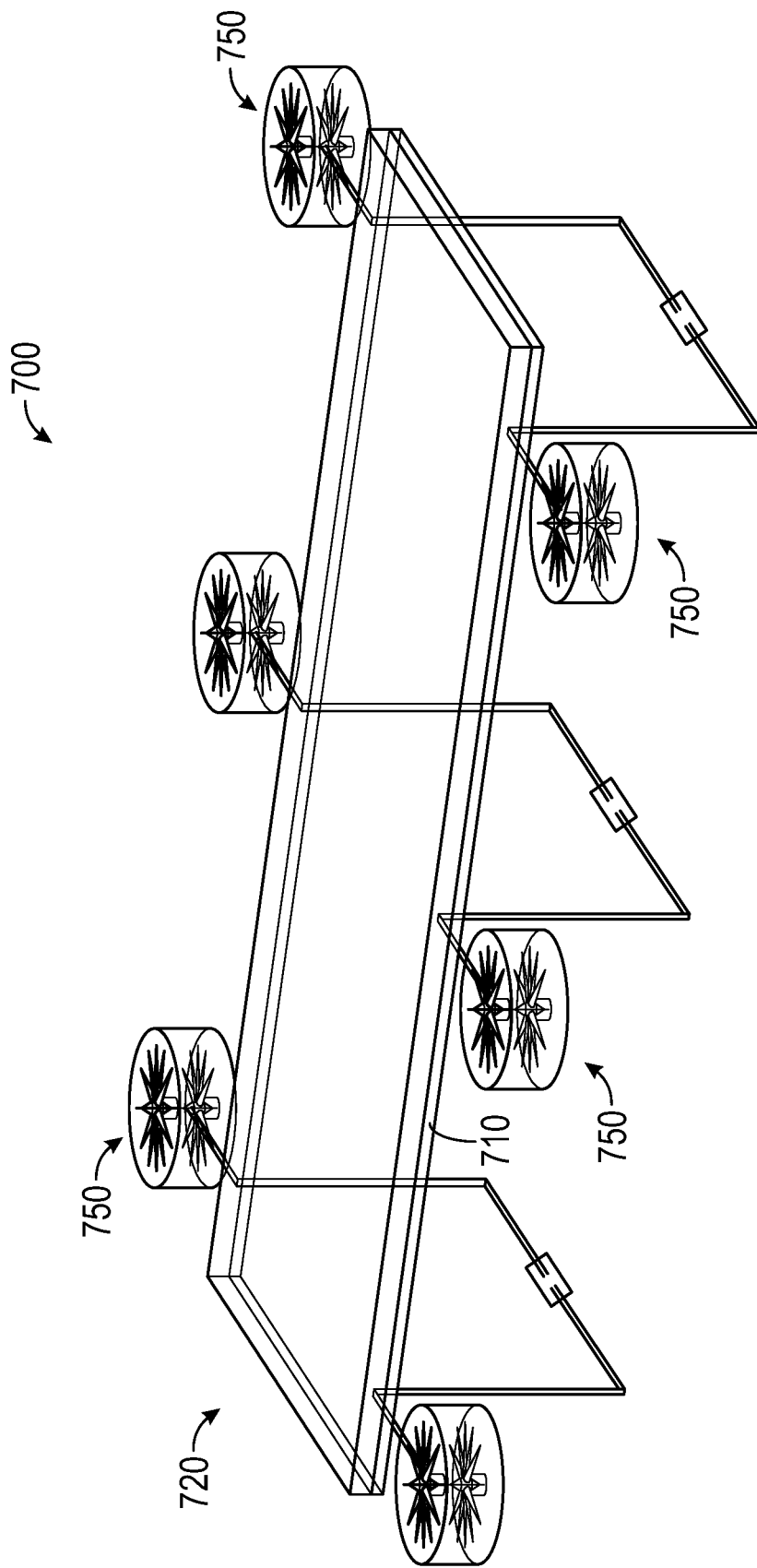
FIG. 12 is a perspective view of the drone shipping system of FIG. 10 having an increased payload capacity, according to an exemplary embodiment.

As shown in FIGS. 10 and 12, the propulsion devices 750 are coupled to the support frame 710 variously around the periphery of the battery mat 720 (e.g., such that the bottom of the propulsion devices 750 is not obstructed by an object being transported by the drone system 700, the propulsion devices 750 are positioned outward a distance from the sides of the object being transported, at the corners of the battery mat 720, etc.). In some embodiments, the propulsion devices 750 are permanently coupled to the support frame 710. In other embodiments, the propulsion devices 750 are detachably coupled to the support frame 710 (e.g., removed when arranged in the compact configuration 704, attached when arranged in the flight configuration 702, etc.). As shown in FIG. 10, the drone system 700 includes four propulsion devices 750. As shown in FIG. 12, the drone system 700 includes six propulsion devices 750 for increased payload capacity. In other embodiments, the drone system 700 includes a different number of propulsion device 750 (e.g., 3, 4, 5, 7, 8, 10, 16, etc.) based on payload capacity requirements. In some embodiments, the drone system 700 is modular such that additional battery cells 722 and/or propulsion devices 750 may be added or removed to selectively vary the payload capacity and/or flight capabilities of the drone system 700.

As shown in FIGS. 10 and 11, the propulsion devices 750 include housings, shown as ducts 752. Ducts 752 have actuators, shown as motors 754, disposed therein. Each duct 752 may have two motors 754 disposed therein. Each motor 754 may have an associated fan element, shown as propeller 756, coupled thereto within the duct 752. According to an exemplary embodiment, the motors 754 are powered by the battery cells 722 and/or the solar panels 730. A first motor 754 within a respective duct 752 may be oriented in a first direction (e.g., upward, etc.) and drive the propeller 756 associated therewith in a first direction (e.g., clockwise, counterclockwise, etc.). A second motor 754 within the respective duct 752 may be oriented in an opposing second direction (e.g., downward, etc.) and drive the propeller 756 associated therewith in an opposing second direction (e.g., counterclockwise, clockwise, etc.). Propulsion devices 750 may thereby each have two counter rotating propellers 756 to produce efficient and powerful thrust. In other embodiments, one or more propulsion devices 750 includes a single motor 754 and/or propeller 756. The propellers 756 may have a various number of extensions (e.g., fins, blades, etc.) on each and various spacing between adjacent extensions. For example, each propeller 756 may have 2, 3, 4, 5, 6, 7, 8, 9, 10, 11, 12, etc. extensions and each extension may have a curved shape to maximize trust of the propulsion devices 750.

In other embodiments, the propulsion devices 750 includes a different number of motors 754 and/or propellers 756 (e.g., one, three, four, five, etc.). Each propeller 756 in series may be counter rotating to the propeller 756 directly above and below. Each propeller may each be powered by its own respective motor 754 fan, or multiple propellers 756 may be powered by one motor 754 (e.g., using power splitting devices to power multiple propellers 756 with a respective motor 754, etc.).

In other embodiments, the propulsion devices 750 are otherwise powered or structured. By way of example the propulsion devices 750 may operate using fuels such as gasoline, natural gas, propane, hydrogen, jet fuel, etc. By way of another example, the propulsion devices 750 may be structured as turbine engines, fuel powered engine propeller devices, ionic engines (e.g., ionic engine 1404, etc.), etc.

As shown in FIGS. 10 and 11, the ducts 752 are cylindrical in shape. In other embodiments, the ducts 752 are differently shaped (e.g., conical, ellipsoidal, etc.). The ducts 752 may be tapered at the bottom edge and along the body of the bottom portion of the duct 752 such that an opening at the bottom of the duct 752 is smaller than an opening at a top of the duct 752. The duct 752 may have various diameters at the top opening (e.g., 0.5, 1, 1.5, 2, 2.5, 3, 4, 5, etc. feet) and the bottom opening thereof (e.g., 0.25, 0.5, 1, 1.5, 2, 2.5, 3, 4, 5, etc. feet). The duct 752 may have various heights (e.g., 0.5, 1, 2, 3, 4, 5, etc. feet). In one embodiment, the motors 754 and the propellers 756 are positioned in the top two-thirds portion of the duct 752 such that there is empty space below the bottommost motor 754 and propeller 756 within the ducts 752. The propellers 756 may be separated by a target distance (e.g., approximately equal to 1/8, 1/4, 1/5, 1/10, etc. of the diameter of the propellers 756) to maximize thrust from the counter-rotating action of the propellers 756.

The motors 754 may be placed above or below their respective propeller 756 in the duct 752. In one embodiment, the motor 754 driving the top propeller 756 is positioned below the top propeller 756 while the motor 754 driving the bottom propeller 756 is positioned above the bottom propeller 756, or vice versa. In another embodiment, the motors 754 are positioned above the propellers 756 that they drive or positioned below the propellers 756 that they drive. The motors 754 (e.g., outer portions thereof, etc.) may be aerodynamically shaped to reduce air resistance within the duct 752. The motors 754 may be centered at the midpoint of the diameter of the duct 752 to reduce air resistance. The motors 754 may have various rotational speed capacities and prestored settings for various rotational speed settings. The motors 754 may operate at different rotational speeds to change drone system 700 direction and/or altitude during flight. The motors 754 may be operable in both a clockwise and counterclockwise direction. Each propulsion device 750 may be independently repositionable along two axes—a pitch axis and a roll axis. The propulsion devices 750 may be repositionable by the flight control system 740 through commands sent to one or more actuators (e.g., mechanical linkages, gears, electromechanical actuators, pneumatic actuators, electric actuators, hydraulic actuators, etc.).

Figure 13:
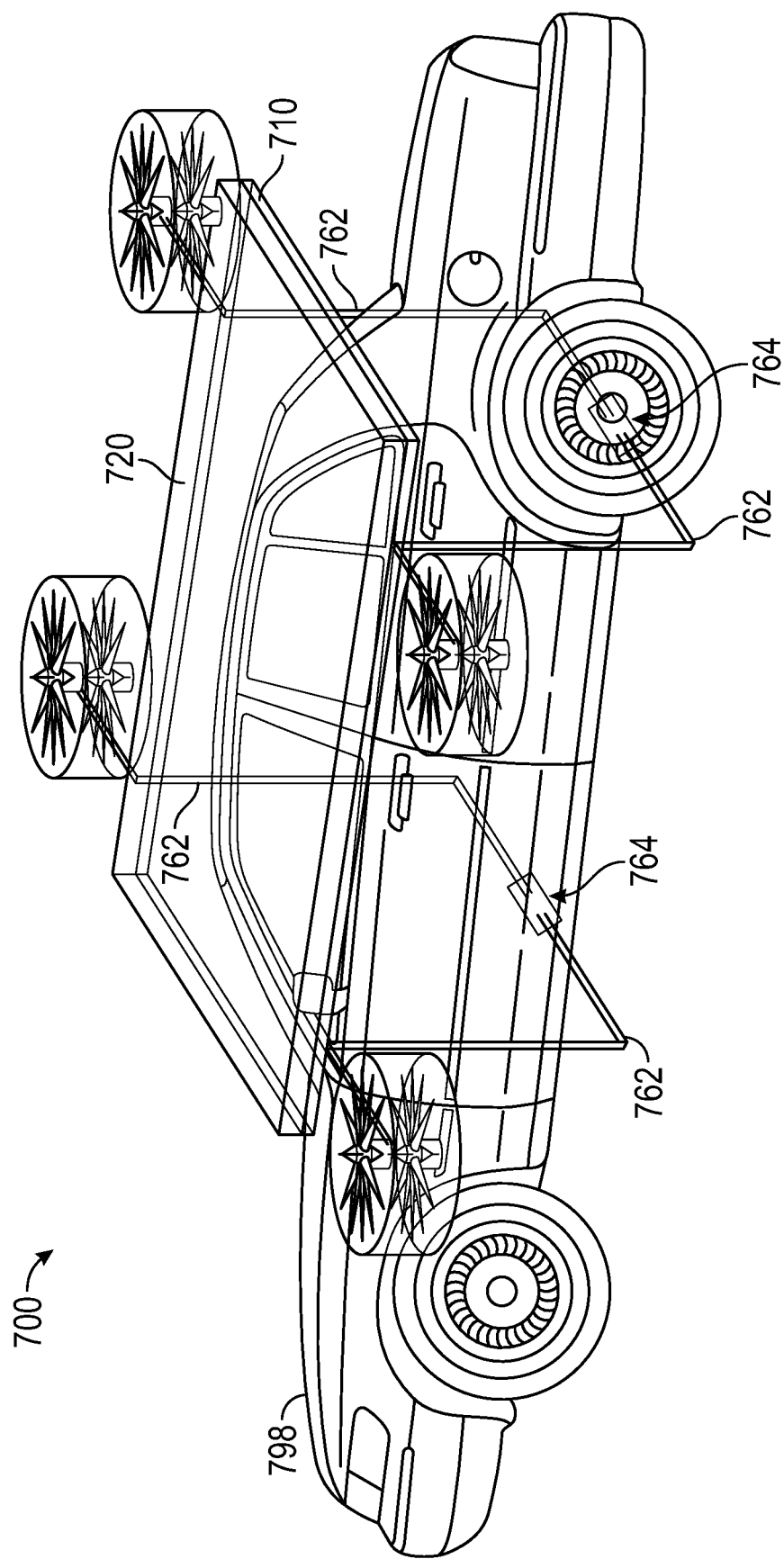
FIG. 13 is a perspective view of the drone shipping system of FIG. 10 transporting a payload, according to an exemplary embodiment.

As shown in FIGS. 10 and 13, the support assemblies 760 include arms, shown as support arms 762, that are coupled to the support frame 710. The support arms 762 may be manually powered, mechanically powered, hydraulically powered, pneumatically powered, and/or electrically powered. As shown in FIGS. 10 and 13, the support arms 762 include attachment mechanisms at the distal ends thereof, shown as connectors 764. The connectors 764 may be configured to clasp and/or lock together to join support arms 762 on opposing sides of the drone system 700 together. As shown in FIG. 13, the support arms 762 reach around an object (e.g., a car, an ISO container, a passenger capsule, a package, cargo, etc.), shown as payload 798, and interlock using the connectors 764 to secure the payload 798 to the drone system 700 underneath the support frame 710. In other embodiments, the connectors 764 couple directly to corresponding attachments or connectors on the payload 798 (e.g., hooks, clasps, rings, etc.). In other embodiments, the support assemblies 760 additionally or alternatively includes netting, bungie rope, chains, etc. The connectors 764 may be released (e.g., manually, automatically, etc.) in response to the drone system 700 arriving at a drop zone (e.g., while on the ground, released while still airborne, etc.). As shown in FIG. 10, the drone system 700 includes a parachute 770. The parachute 770 may be deployed in an emergency situation or during descent.

In an alternative embodiment, a passenger capsule is integrally formed with or detachably coupled to the support frame 710. The passenger capsule may be configured to facilitate transporting a number of passengers (e.g., 1, 2, 3, 10, 20, etc. passengers) with the drone system 700. Such a drone system 700 may be autonomously operated, semiautonomously operated (e.g., autonomously operated when an autopilot mode is engaged, etc.), remotely operated, and/or manually operated by a passenger within the passenger capsule. The passenger capsule may be pressurized and may use recycled air and temperature controls. The passenger capsule may have large transparent portions to improve flight visibility. The passenger capsule may include flight systems to allow an operator to take off and land the drone system 700. The flight systems may allow the operator to steer the drone system 700 in flight (e.g., altitude, pitch, yaw, roll, speed, etc.). The flight systems may present flight information to the operator (e.g., altitude, engine function, GPS information, airspeed, temperature, etc.). The flight systems may allow the operator to communicate with ground controllers and/or other pilots.

According to the exemplary embodiment shown in FIGS. 14-22, an aerial device/system (e.g., aircraft, etc.), shown as drone system 800, is configured to facilitate transporting objects and/or passengers (e.g., packages, cargo, passengers, a payload, etc.) through the air from a starting location (e.g., a pickup location, etc.) to a final destination (e.g., a delivery location, a drop zone, etc.). As shown in FIGS. 14-22, the drone system 800 includes a body (e.g., a passenger capsule, a cargo hold, a cabin, a chassis, etc.), shown as fuselage 810; tractive assemblies, shown as wheel and tire assemblies 830, coupled to the fuselage 810; a rear propulsion device, shown as rear engine 840, coupled at a rear of the fuselage 810; a plurality of side propulsion devices, shown as propulsion devices 850, coupled along sides of the fuselage 810; a pair of wings assemblies, shown as wing assemblies 860, coupled to opposing sides of the fuselage 810; on-board energy storage, shown as battery system 870, disposed within the fuselage 810 and/or the wing assemblies 860; various sensors, shown as sensors 880, positioned variously about the drone system 800 (e.g., in or about the fuselage 810, on the wheel and tire assemblies 830, on the rear engine 840, on the propulsion devices 850, on the wing assemblies 860, coupled to the battery system 870, etc.); and a flight control system, shown as controller 900. In some embodiments, the drone system 800 does not include the wing assemblies 860 and/or the battery system 870.

Figure 14:
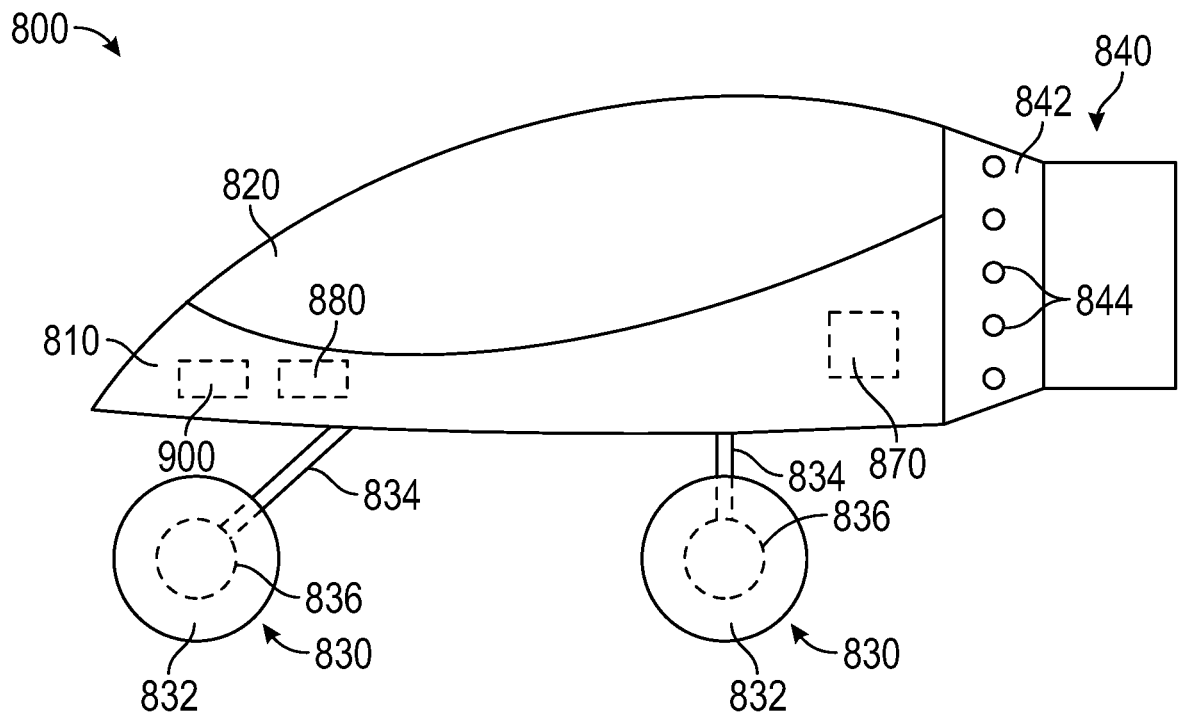
FIG. 14 is a side view of a drone system in a first configuration, according to an exemplary embodiment.
Figure 15:
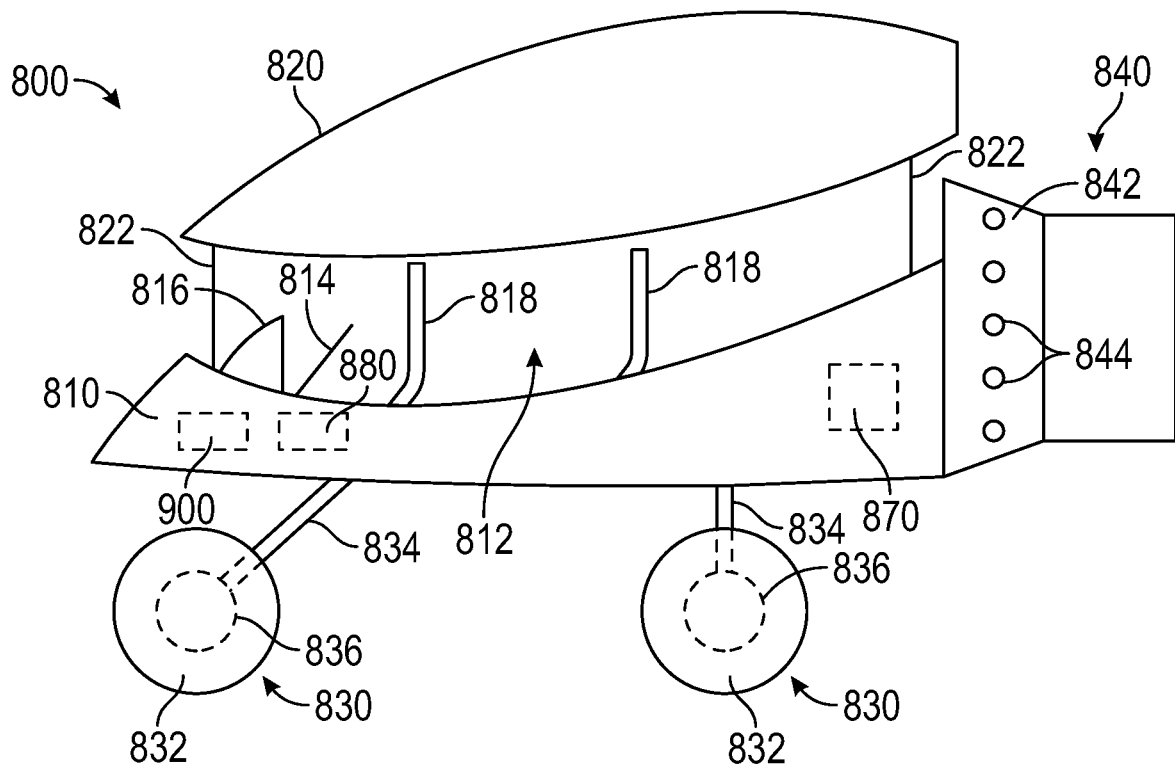
FIG. 15 is a side view of the drone system of FIG. 14 in a second configuration, according to an exemplary embodiment.

As shown in FIGS. 14-21, the fuselage 810 includes a transparent panel (e.g., glass, etc.), shown as cabin panel 820. As shown in FIG. 15, the drone system 800 includes first actuators (e.g., hydraulic actuators, pneumatic actuators, electric actuators, etc.), shown as cabin panel actuators 822, positioned to facilitate selectively repositioning the cabin panel 820 relative to the fuselage 810 to expose an interior cavity, shown as passenger cabin 812. According to the exemplary embodiment shown in FIG. 15, the cabin panel actuators 822 are configured to lift the cabin panel 820 upward relative to the fuselage 810. In another embodiment, the cabin panel actuators 822 are configured to pivot the cabin panel 820 relative to the fuselage 810 (e.g., forward about the front end of the cabin panel 820, rearward about the rear end of the cabin panel 820, sideways about a side of the cabin panel 820, etc.). In some embodiments, the cabin panel 820 includes two or more separate panels. In such embodiments, the cabin panel actuators 822 may be configured to separate the two or more panels of the cabin panel 820 in such that at least one of the panels extends or pivots away from the other panel(s) (e.g., butterfly and pivot outward; extend up and move laterally outward; one pivots forward and the other pivots rearward; one remains stationary and the other lifts up, pivots, and/or extends outward; etc.).

According to an exemplary embodiment, the passenger cabin 812 is configured to accommodate a plurality of passengers. In some embodiments, the passenger cabin 812 is pressurized and/or temperature controlled. In other embodiments, the passenger cabin 812 is not pressurized or temperature controlled. As shown in FIG. 15, the passenger cabin 812 includes a plurality of rows of seating, shown as seating 818. While the seating 818 is shown to include two rows, in some embodiments, the seating 818 may include one row or more than two rows (e.g., three, four, five, ten, fifteen, etc. rows). According to an exemplary embodiment, each of the rows of the seating 818 includes a plurality of seats (e.g., two, three, four, five, etc. seats). In another embodiment, the rows of the seating 818 include one seat each. In some embodiments, one or more of the seats are bucket seats that provide support around the sides of the passengers (e.g., to the passengers' shoulders, waist, legs, etc.). In some embodiments, one or more of the seats are bench seats. The seats may include seat belts (e.g., three-point harnesses, five-point harnesses, etc.). The seats may have adjustable positioning controls (e.g., forward, backward, up, down, lumbar adjustment, bolster adjustment, etc.). In some embodiments, the seats are selectively pivotable such that seats may face one another. In some embodiments, the passenger cabin 812 includes storage for passenger cargo (e.g., positioned behind the seating 818 before the rear wall of the passenger cabin 812, etc.).

Figure 22:
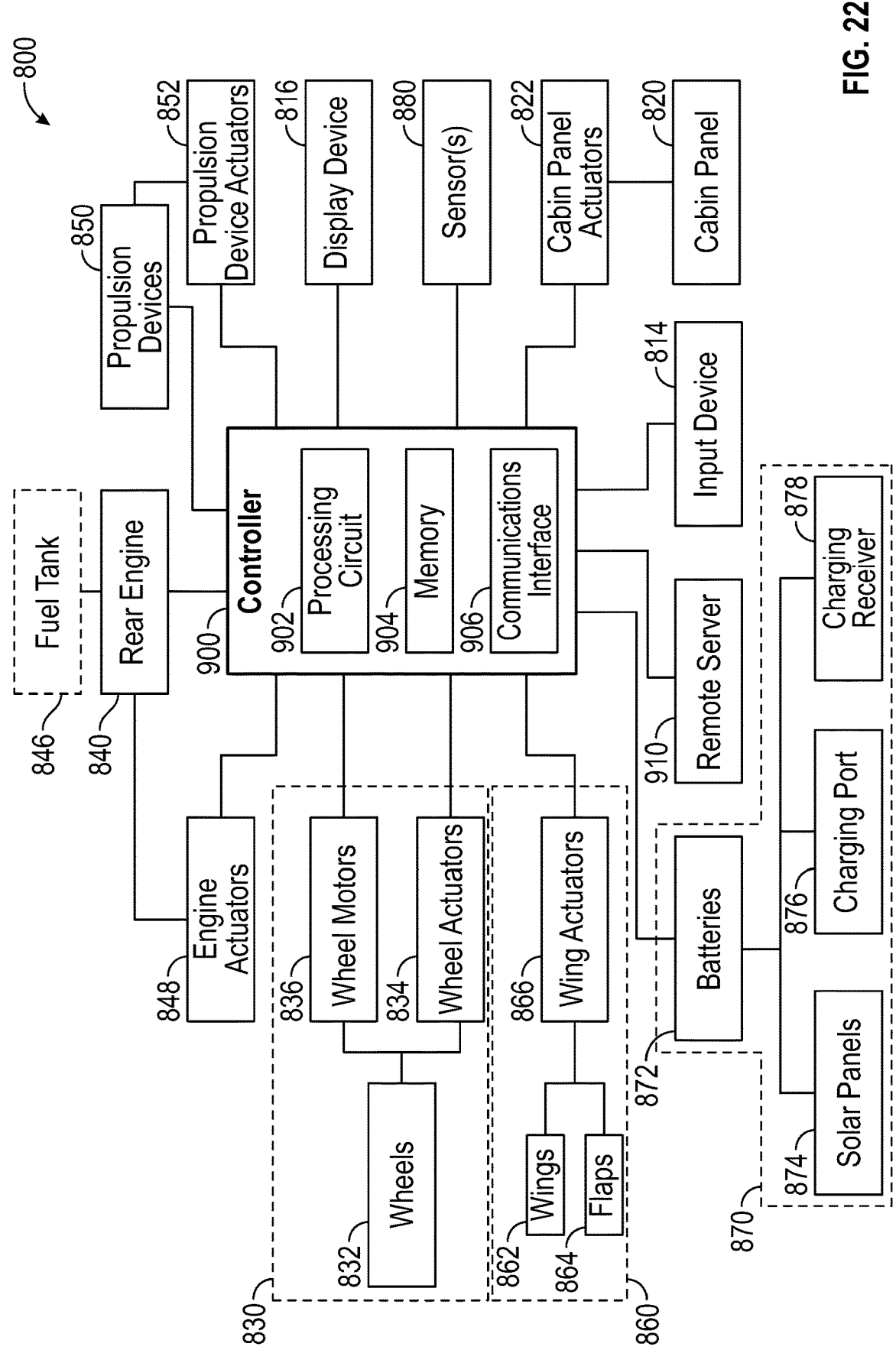
FIG. 22 is a schematic diagram of the drone system of FIG. 14, according to an exemplary embodiment.

As shown in FIGS. 15 and 22, the drone system 800 includes a user input, shown as input device 814, and a display, shown as display device 816. As shown in FIG. 15, the input device 814 and the display device 816 are disposed within the passenger cabin 812. According to an exemplary embodiment, the input device 814 is configured to facilitate an operator in controlling operation (e.g., flight, speed, direction, altitude, etc.) of the drone system 800. The input device 814 may include a joystick, a steering wheel, foot pedals, buttons, switched, knobs, dials, a throttle, etc. to facilitate controlling operation of the drone system 800.

According to an exemplary embodiment, the display device 816 is configured to display various information about operation of the drone system 800 to the operator. Such information may include external environment characteristics (e.g., temperature, pressure, humidity, weather conditions, topography characteristics, etc.), operating characteristics of the drone system 800 (e.g., airspeed, altitude, heading, bearing, pitch, yaw, roll, engine temperature, fuel levels, battery levels, etc.), navigational information, flight instrumentation, hazard indicators, flight path instructions, etc. The display device 816 may include a display screen, a heads-up-display ("HUD") (e.g., projected onto the cabin panel 820, etc.), augmented reality glasses, an augmented reality helmet device, and/or still another type of display device. The display device 816 may provide a two-dimensional display, provide a three-dimensional display, and/or provide augmented reality. The augmented reality display configuration may be customizable by the passenger. In some embodiments, at least a portion of the cabin panel 820 functions as display device (e.g., the majority of the interior of the cabin panel 820 may function as a display device, etc.). By way of example, a display may be projected onto the cabin panel 820 and/or the cabin panel 820 may function as an augmented reality display. The cabin panel 820 may (i) display live television, recorded television, movies, flight information, etc. and/or (ii) facilitate internet browsing (through onboard computer), going through emails, gaming, etc., as well as provide other possible features. The display device 816 and/or the cabin panel 820 may be touch sensitive to receive user inputs through touch. In some embodiments, the display device 816 is or includes a holographic display.

The passenger cabin 812 may come equipped with entertainment options such as a satellite radio and speakers for playing music. The speakers may additionally or alternatively provide navigational instructions, provide flight path instructions, provide hazard warnings, and/or still provide other information. The passenger cabin 812 may additionally include a microphone that facilitates receiving input voice commands from a user. The voices commands may be used to set flight course, make music selections, adjust temperature, and/or other commands. The voice commands may be used to initiate an autopilot mode that controls the drone system 800 from a starting location to final location, calculating flightpath, operating flight controls, etc. such that the user does not need to operate the drone system 800 from the starting location to the final location. The user may also modify the destination setting during flight using a voice command.

As shown in FIGS. 14, 15, and 22, each of the wheel and tire assemblies 830 of the drone system 800 includes a wheel, shown as wheel 832, a second actuator (e.g., a hydraulic actuators, a pneumatic actuator, an electric actuator, etc.), shown as wheel actuator 834, and a third actuator, shown as wheel motor 836. According to an exemplary embodiment, the wheel 832 includes a tire filled with compressed gas. In other embodiments, the wheel and tire assemblies 830 include solid tires (e.g., made of rubber, a semi-elastic material, etc.) and/or non-pneumatic tires (e.g., a tire with compressible veins, etc.). In another embodiment, the wheel 832 is replaced with a landing skid or other non-rolling element. According to an exemplary embodiment, the wheel actuators 834 are configured to facilitate selectively (i) extending (e.g., during landing, takeoff, etc.) the wheel 832 from the fuselage 810 (e.g., an underbelly thereof, etc.), as shown in FIGS. 14 and 15, and (ii) retracting (e.g., during flight, etc.) the wheels 832 into the fuselage 810, as shown in FIGS. 16-21. In some embodiments, the wheel and tire assemblies 830 do not include the wheel actuators 834 such that the wheels 832 are fixed (e.g., a fixed landing gear, etc.). According to an exemplary embodiment, the wheel motors 836 are configured to facilitate driving the wheels 832 (e.g., for taxing, driving on the road, etc.) without having to use the rear engine 840 and/or the propulsion devices 850 to drive the drone system 800. In some embodiments, the wheel and tire assemblies 830 do not include the wheel motors 836, but rather the wheels 832 are driven by operating the rear engine 840 and/or the propulsion devices 850.

According to the exemplary embodiment shown in FIGS. 14-22, the rear engine 840 is configured as a turbine engine or jet engine configured to generate thrust by combusting fuel received from a reservoir, shown as fuel tank 846. In some embodiments, the fuel tank 846 is disposed within the engine housing 842. In some embodiments, the fuel tank 846 is additionally or alternatively disposed within the fuselage 810 and/or the wing assemblies 860. In some embodiments, the rear engine 840 does not operate using a fuel combustion process. In such embodiments, the rear engine 840 may be electrically driven (e.g., by the battery system 870, etc.) and/or the drone system 800 may not include the fuel tank 846. By way of example, the rear engine 840 may be configured as an electrically driven turbine. By way of another example, the rear engine 840 may be configured as an ionic engine (e.g., ionic engine 1404, etc.). In some embodiments, the drone system 800 includes a plurality of the rear engines 840 (e.g., two, three, etc.).

As shown in FIGS. 14-21, the rear engine 840 includes a housing, shown as engine housing 842, coupled at a rear end of the fuselage 810. The engine housing 842 defines a plurality of apertures, shown as air intakes 844, configured to receive and provide air to the rear engine 840. In some embodiments, the fuselage 810 additionally or alternatively defines the air intakes 844.

According to an exemplary embodiment, the fuselage 810 has an aerodynamic design to improve airflow to the rear engine 840. In some embodiments, the fuselage 810 and the cabin panel 820 are shaped such that the rear ends thereof slope or curve to allow air to pass over the fuselage 810 and direct the air into the rear engine 840 (i.e., through the air intakes 844) for improved airflow to the rear engine 840. While the air intakes 844 are shown as apertures, the air intakes 844 may alternatively be elongated, tapering channels or ducts defined by the rear of the fuselage 810 that direct air into the rear engine 840. In some embodiments, between 80% and 95% of the rear end of the fuselage 810 tappers or defines the channels or ducts to increase airflow. In some embodiments, the rear engine 840 is at least partially spaced from the rear end of the fuselage 810 (e.g., such that a gap is present, etc.) to facilitate better airflow into the rear engine 840.

In some embodiment, the nose of fuselage 810 is mechanically operated (e.g., via a nose actuator, etc.) to move the nose upwards and downwards to level with the drone system 800 based on the pitch of the drone system 800 such that the nose is at an optimal level to improve aerodynamics of the drone system 800. The fuselage 810 may have many layers of sheet material and/or have a thickness (e.g., 1, 2, 3, 4, 5, 6, etc. inches) to prevent a high decibel reading of noise within the passenger cabin 812. The cabin panel 820 may also have a thickness (e.g., 0.5, 1, 2, 3, 4, 5, etc. inches) to prevent a high decibel reading of noise within the passenger cabin 812.

Figure 18:
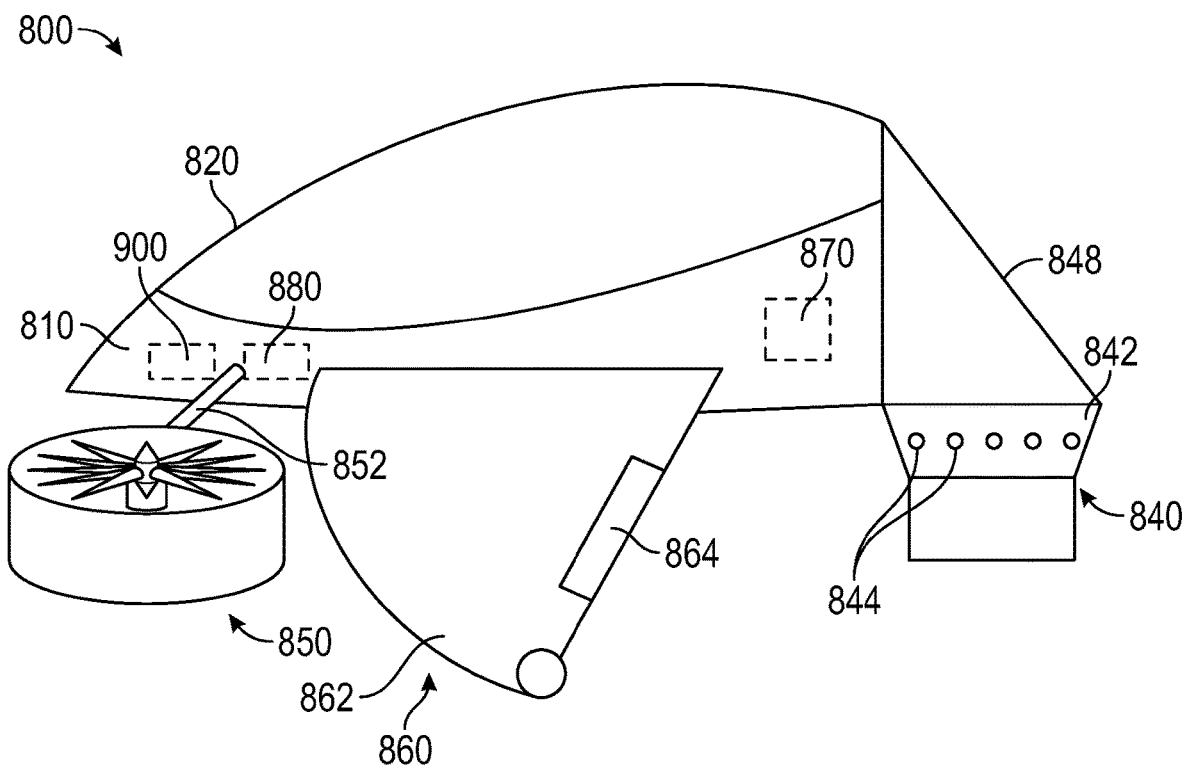
FIG. 18 is a side view of the drone system of FIG. 14 in a fifth configuration, according to an exemplary embodiment.
Figure 21:
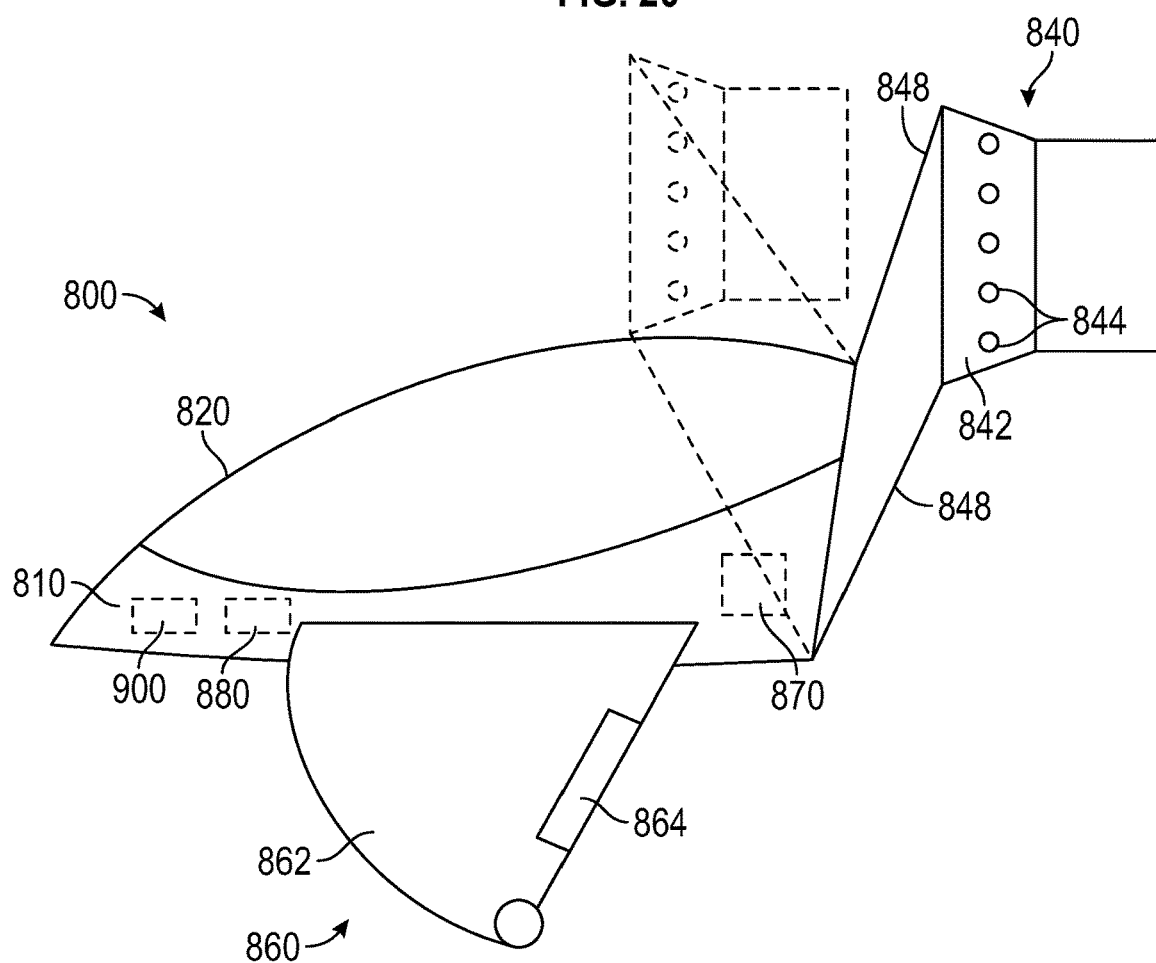
FIG. 21 is side view of the drone system of FIG. 14 in an eighth configuration, according to an exemplary embodiment.

As shown in FIGS. 18, 21, and 22, the drone system 800 includes fourth actuators (e.g., hydraulic actuators, pneumatic actuators, electric actuators, extendable/pivotable arms, etc.), shown as engine actuators 848. As shown in FIGS. 18, 21, and 46-52, the engine actuators 848 repositionably couple the engine housing 842 to the rear of the fuselage 810. According to an exemplary embodiment, the engine actuators 848 are configured to facilitate lifting, extending, rotating, and/or pivoting the rear engine 840. The engine actuators 848 may include arms (e.g., extendable arms, fixed arms, etc.). The drone system 800 may include two arms (e.g., one on each side of the rear engine 840, etc.), four arms (e.g., two on each side of the rear engine 840, etc.), etc. In some embodiments, the arms are pivotally coupled to the rear end of the fuselage 810 (e.g., like lift arms on a refuse truck, etc.). In some embodiments, the arms include one or more joints that allow a first portion of the arms to bend or pivot relative to other portions of the arms (e.g., articulating arms, etc.). In some embodiments, the arms rotate and/or translate on a track coupled to the rear of the fuselage 810. In other embodiments, the track is coupled to the engine housing 842. The track may facilitate rotating the engine up to 360 degrees about a lateral axis (e.g., 180 degrees, 90 degrees, 270 degrees, etc.) for flight controls and/or translating the rear engine 840 (e.g., forward, backward, etc.). One side of the rear engine 840 may translate along the track while the other side of the rear engine 840 may remain fixed along the track such that the rear engine 840 pivots side to side (e.g., to the left, to the right, etc.) (see, e.g., FIGS. 50 and 51). The engine actuators 848 may also rotate or pivot the rear engine 840 about other axes (e.g., a vertical axis, etc.) for flight control. For example, the engine actuators 848 may additionally or alternatively include powered hinges and/or powered rotating joints at the connection between the arms of the engine actuators 848 and the engine housing 842 (see, e.g., FIG. 52). Accordingly, the rear engine 840 may rotate along the track while simultaneously rotating via the hinges/joints, therefore, allowing the rear engine 840 to rotate about two axes (e.g., simultaneously, independently, etc.).

By way of example, as shown in FIG. 18, the engine actuators 848 may be controlled to rotate the rear engine 840 such that the rear engine 840 faces the ground to provide vertical thrust during takeoff and landing operations. By way of another example, as shown in FIG. 21, the engine actuators 848 may be controlled to lift the rear engine 840 above the fuselage 810 during a flight operation to increase the airflow to the rear engine 840 and increase thrust of the rear engine 840. In some implementations, the engine actuators 848 may be controlled to lift the rear engine 840 above and over the fuselage 810 during a flight operation. By way of yet another example, the engine actuators 848 may be controlled to selectively pivot the rear engine 840 (e.g., up, down, left, right, etc.) to assist in steering operations of the drone system 800. In some embodiments, the drone system 800 does not include the engine actuators 848 (e.g., the orientation of the rear engine 840 is substantially fixed, etc.).

Figure 16:
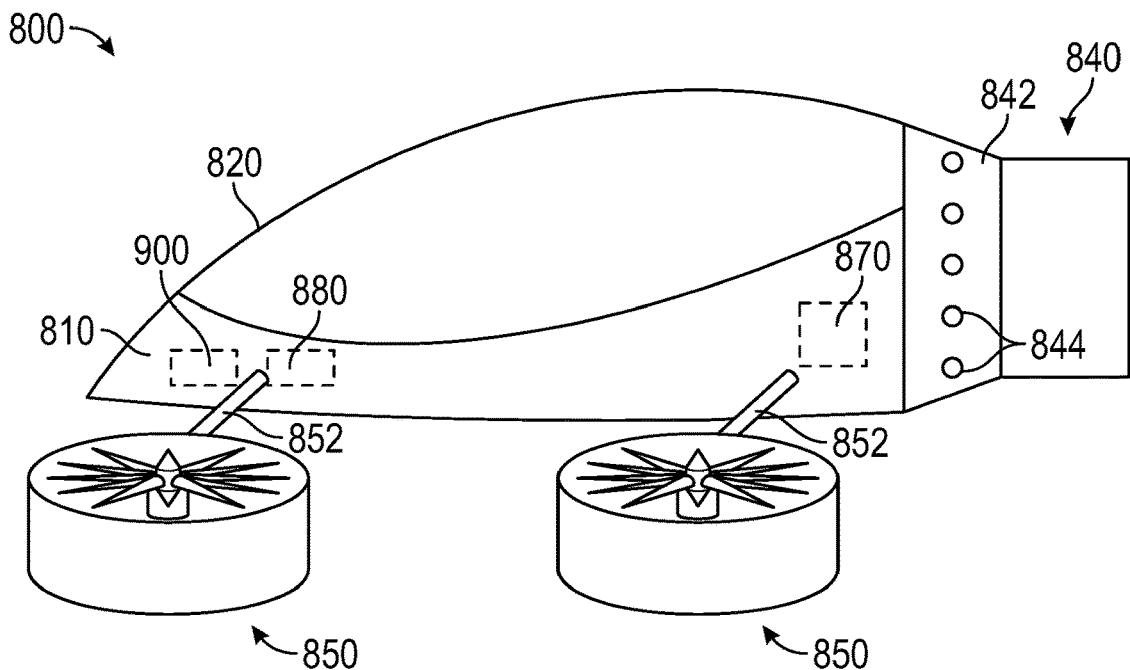
FIG. 16 is a side view of the drone system of FIG. 14 in a third configuration, according to an exemplary embodiment.
Figure 17:
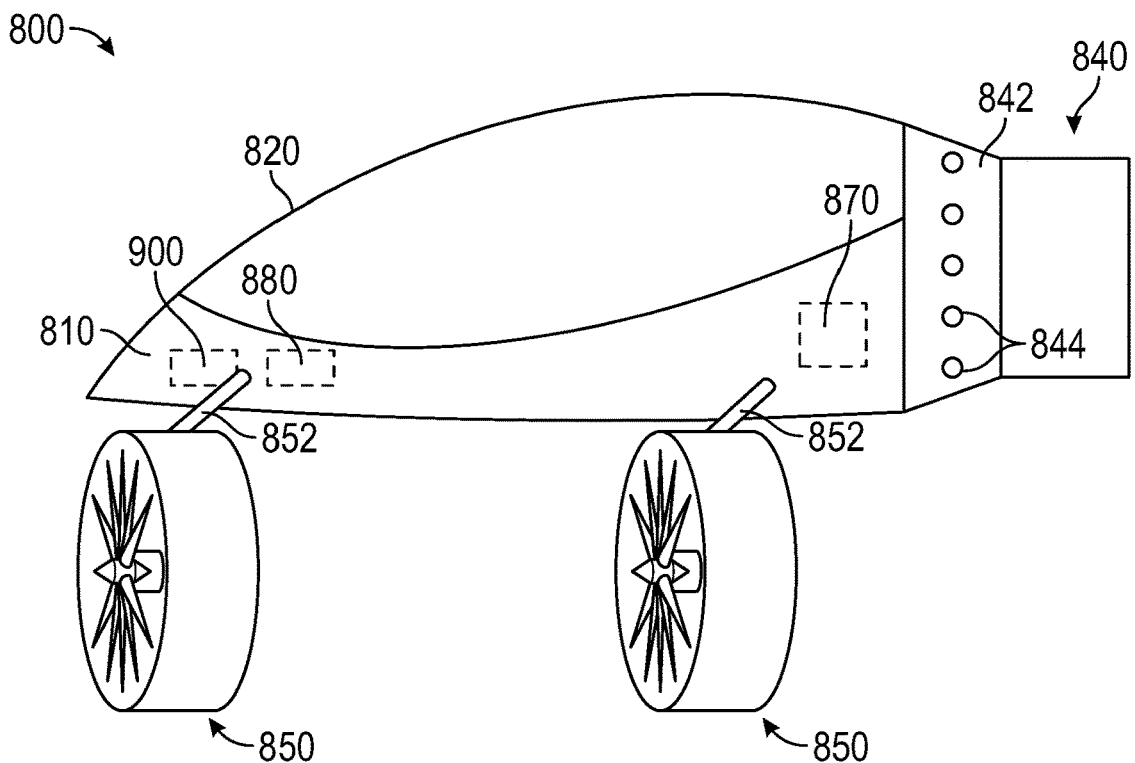
FIG. 17 is a side view of the drone system of FIG. 14 in a fourth configuration, according to an exemplary embodiment.
Figure 19:
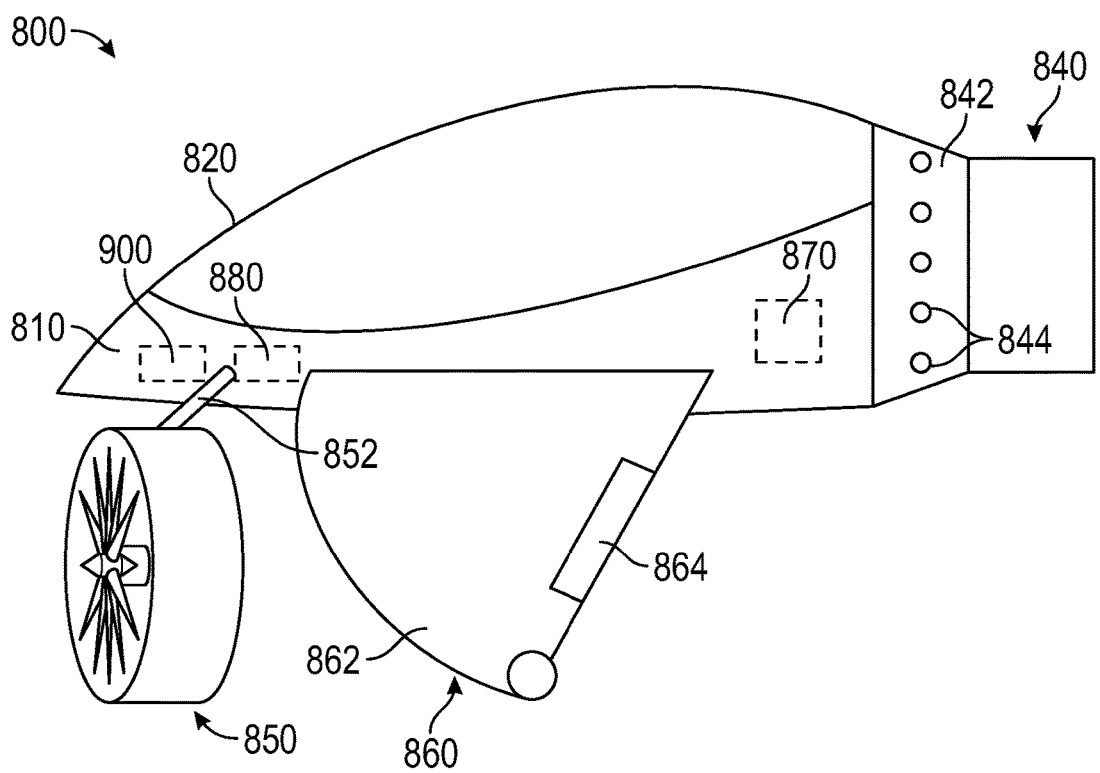
FIG. 19 is side view of the drone system of FIG. 14 in a sixth configuration, according to an exemplary embodiment.

According to the exemplary embodiment shown in FIGS. 16-19, the propulsion devices 850 are selectively positioned about the fuselage 810 and spaced therefrom by fifth actuators (e.g., a hydraulic actuators, a pneumatic actuator, an electric actuator, foldable extension arms, pivoting arms, etc.), shown as propulsion device actuators 852. As shown in FIGS. 18 and 19, the drone system 800 includes two of the propulsion devices 850 and the propulsion device actuators 852, one set positioned on each lateral side of the fuselage 810 (e.g., in front of the wing assemblies 860, etc.). As shown in FIGS. 16 and 17, the drone system 800 includes four of the propulsion devices 850 and the propulsion device actuators 852, two sets positioned on each lateral side of the fuselage 810. In other embodiments, the drone system 800 includes more than four of the propulsion devices 850 (e.g., five, six, seven, eight, etc.) to increase the payload capacity of the fuselage 810. In some embodiments, one or more of the propulsion devices 850 are similar to the propulsion devices 750. In some embodiments, one or more of the propulsion devices 850 are similar to the propulsion devices 120. In some embodiments, one or more of the propulsion devices 850 are or include the ionic engine 1404. Accordingly, the propulsion devices 850 may be or include ducted fans, counter rotating ducted fans, propellers, thrusters, jets, engines, boosters, turbines, combustion engines, electrical engines, ionic engines, and/or still other suitable devices for providing lift/thrust.

According to an exemplary embodiment, the propulsion device actuators 852 are configured to facilitate selectively (i) extending (e.g., during landing, takeoff, during flight, etc.) the propulsion devices 850 from the fuselage 810 (e.g., an underbelly thereof, etc.) or out from under the fuselage 810, as shown in FIGS. 16-19, (ii) retracting (e.g., during flight, while driving, while grounded, etc.) the propulsion devices 850 into or under the fuselage 810, as shown in FIGS. 14, 15, 20 and 21, and (iii) pivoting (e.g., during flight operations, etc.) the propulsion devices 850, as shown in FIGS. 16-19. By way of example, as shown in FIGS. 16 and 18, the propulsion device actuators 852 may be controlled to pivot the propulsion devices 850 such that the propulsion devices 850 provide vertical thrust during takeoff and landing operations. By way of another example, as shown in FIGS. 17 and 19, the propulsion device actuators 852 may be controlled to pivot the propulsion devices 850 to assist in steering operations of the drone system 800 and/or to provide forward, vertical, and/or rearward thrust (e.g., each propulsion device 850 may be independently repositionable along two axes—a pitch axis and a roll axis, etc.). By way of example, the propulsion device actuators 852 may include powered hinges or powered joints to facilitate pivoting the propulsion devices about at least one axis (e.g., one, two, etc. axes). By way of another example, the propulsion devices 850 may include a track that slides along the propulsion device actuators 852 (e.g., arms thereof, etc.) that allow the propulsion devices 850 to rotate. In some embodiment, the propulsion device actuators 852 facilitate lifting the propulsion devices 850 above the fuselage 810 (e.g., similar to the rear engine 840 in FIG. 21). In some embodiments, the propulsion device actuators 852 do not extend and retract the propulsion devices 850 such that propulsion devices 850 remain positioned external relative to the fuselage 810 (e.g., fixed extension arms, etc.). Further, it should be understood that any of the concepts disclosed herein in relation to the engine actuators 848 may similarly apply to the propulsion device actuators 852.

As shown in FIGS. 18-22, the wing assemblies 860 include wing elements (e.g., airfoils, etc.), shown as wings 862, having flight control devices, shown as flaps 864, positioned at the rear end of the wings 862. In some embodiments, the wings 862 do not include the flaps 864. As shown in FIGS. 18-21, the wings 862 are coupled to and extend outward from opposing lateral sides of the fuselage 810. In some embodiments, one or more of the propulsion devices 850 are coupled to the wings 862.

As shown in FIG. 22, the wing assemblies 860 include sixth actuators (e.g., a hydraulic actuators, a pneumatic actuator, an electric actuator, etc.), shown as wing actuators 866. In some embodiments, the wing actuators 866 are controllable to adjust the position of (i.e., pivot) the flaps 864 to assist in steering the drone system 800, to increase or decrease lift generated by the wings 862, and/or to reduce the speed of the drone system 800. In some embodiments, the wing actuators 866 are additionally or alternatively controllable to selectively extend the wings 862 outward, as shown in FIGS. 18-21, and selectively retract the wings 862 into, underneath, and/or proximate the fuselage 810, as shown in FIGS. 14 and 15. In some embodiments, the wings 862 are foldable (e.g., in half, in thirds, etc.) and may be stored within the fuselage 810, underneath the fuselage 810, and/or against the fuselage 810. In some embodiments, the wings 862 are slidable into the fuselage 810 and/or slidable underneath the fuselage 810. In some embodiments, a rear end of the wings 862 are pivotably coupled along the fuselage 810 and a front end of the wings 862 are selectively coupled along the fuselage 810 such that the wings 862 may be pivoted rearward along the fuselage 810 or underneath the fuselage 810. In other embodiments, the wings 862 are otherwise extendable and retractable relative to the fuselage 810. In still other embodiments, the wings 862 are fixed. In some embodiments, the wing actuators 866 are additionally or alternatively controllable to selectively pivot the wings 862 relative to the fuselage 810 such that the angle of the wings 862 relative to the direction of travel (i.e., a longitudinal axis of the fuselage 810) is adjustable. Accordingly, the angle at which the wings 862 extend from the fuselage 810 relative to a longitudinal axis of the fuselage 810 may be selectively controlled (e.g., independent of the angle of attack of the fuselage 810, etc.) to reduce (e.g., minimize, etc.) drag on and/or increase (e.g., maximize, etc.) lift generated by the wings 862. By way of example, the wing actuators 866 may be controlled to maintain the wings 862 horizontal or substantially horizontal (e.g., within plus or minus five degrees of horizontal, etc.) relative to gravity independent of the angle of the fuselage 810 relative to gravity.

As shown in FIG. 22, the battery system 870 includes a plurality of batteries, shown as batteries 872, one or more solar panels, shown as solar panels 874, a first charging input, shown as charging port 876, and a second charging input, shown as charging receiver 878. The batteries 872 may be variously positioned about the drone system 800, such as within the fuselage 810 (e.g., in the floor thereof, between the passenger cabin 812 and the rear engine 840, etc.), within the wings 862, and/or still otherwise positioned within the drone system 800. The batteries 872 may be or include lithium polymer batteries, lithium ion batteries, cadmium batteries, high capacity batteries, light weight batteries, and/or still other suitable battery technologies. According to an exemplary embodiment, the batteries 872 are rechargeable. The batteries 872 may be coupled to and configured to provide electrical power to operate various components of the drone system 800 including the input device 814, the display device 816, the cabin panel actuators 822, the wheel actuators 834, the wheel motors 836, the rear engine 840, the engine actuators 848, the propulsion devices 850, the propulsion device actuators 852, the wing actuators 866, and/or the sensors 880.

According to an exemplary embodiment, the solar panels 874 are configured to convert light energy (e.g., from the sun, etc.) into electrical energy to charge the batteries 872 and/or directly power the various electrically operated components of the drone system 800. The solar panels 874 may be variously positioned about the exterior of the fuselage 810 and/or the wings 862. In some embodiments, the solar panels 874 are selectively extendable and retractable from the fuselage 810. In some embodiments, the drone system 800 does not include the solar panels 874. According to an exemplary embodiment, the charging port 876 is configured to interface with a ground charging system to facilitate recharging the batteries 872. In some embodiments, the charging port 876 facilitates a "rapid charging" operation. In other embodiments, the charging port 876 is replaced with a charging cable configured to interface with a charging port of a ground charging system. According to an exemplary embodiment, the charging receiver 878 is configured to facilitate wirelessly charging the batteries 872 (e.g., during flight, while grounded, etc.). By way of example, the charging receiver 878 may be configured to receive and/or generate electrical energy through various wireless beaming technologies (e.g., provided from a remote wireless beaming system, etc.). For example, the charging receiver 878 may receive and convert a wireless signal received from a remote, wireless beaming system into electrical energy to be stored by the batteries 872. In some embodiments, the drone system 800 does not include the charging receiver 878. In some embodiments, the drone system 800 includes a gas-powered or other fuel powered generator that is used to charge batteries 872 and/or power electrically-operated components of the drone system 800.

In some embodiments, the drone system 800 includes a parachute. The parachute may be disposed within the fuselage 810, along the fuselage 810, within the wings 862, along the wings 862, and/or otherwise positioned. The parachute may be deployed automatically or manually. By way of example, the parachute may be automatically deployed in situations where (i) passengers become unconscious, (ii) power is lost to one or more of the propulsion devices 850 and cannot be restored, (iii) the drone system 800 is descending above a threshold speed, and/or (iv) the controller 900 detects loss of controls and/or critical sensor failure. A parachute deployment sequence may include first powering down the propulsion devices 850 and then deploying the parachute. By way of another example, the drone system 800 may include a manual deployment input device (e.g., a button, a lever, etc.) for the parachute within the passenger cabin 812 of the drone system 800 (e.g., near the rear upper portion of the passenger cabin 812, other locations, etc.). Manual deployment may utilize compressed air.

According to an exemplary embodiment, the sensors 880 are configured to facilitate monitoring various operating parameters of the components of the drone system 800, external characteristics around the drone system 800, etc. The sensors 880 may be variously positioned about the drone system 800 including within the passenger cabin 812, on the exterior of the fuselage 810, on the wheel and tire assemblies 830, on the rear engine 840, on the propulsion devices 850, on the wing assemblies 860, coupled to the battery system 870, and/or still otherwise positioned. The sensors 880 may include various flight measurement devices or sensors such as an altimeter, GPS, airspeed sensors, temperature sensors, pressure sensors, cameras, proximity sensors, radar, LIDAR, ultrasound, humidity sensors, weather sensors, etc. that assist in autonomous flight control (e.g., autopilot, provided by the controller 900, provided by the remote server 910, etc.) and/or manual flight control (e.g., provided by the controller 900 based on inputs received from the operator via the input device 814, based on inputs received from a remote operator, etc.).

According to an exemplary embodiment, the controller 900 is configured to selectively engage, selectively disengage, control, and/or otherwise communicate with the other components of the drone system 800 and/or external devices/systems. As shown in FIG. 22, the controller 900 includes a processing circuit 902, a memory 904, and a communications interface 906. According to an exemplary embodiment, the communications interface 906 is configured to couple the controller 400 to various components of the drone system 800 and a remote server 910. In other embodiments, the controller 900 is coupled to more or fewer components. By way of example, the controller 900 may send signals to and receive signals from the input device 814, the display device 816, the cabin panel actuators 822, the wheel actuators 834, the wheel motors 836, the rear engine 840, the engine actuators 848, the propulsion devices 850, the propulsion device actuators 852, the wing actuators 866, the sensors 880, other drone systems 800, and/or the remote server 910 via the communications interface 906. The communications interface 906 may utilize various wired communication protocols, short-range wireless communication protocols (e.g., Bluetooth, near field communication ("NFC"), RFID, ZigBee, etc.), and/or long-range wireless communication protocols (e.g., cellular, satellite, Internet, radio, etc.) to facilitate communication with the various devices/components.

The controller 900 may be implemented as a general-purpose processor, an application specific integrated circuit ("ASIC"), one or more field programmable gate arrays ("FPGAs"), a digital-signal-processor ("DSP"), circuits containing one or more processing components, circuitry for supporting a microprocessor, a group of processing components, or other suitable electronic processing components. The processing circuit 902 may include an ASIC, one or more FPGAs, a DSP, circuits containing one or more processing components, circuitry for supporting a microprocessor, a group of processing components, or other suitable electronic processing components. In some embodiments, the processing circuit 902 is configured to execute computer code stored in the memory 904 to facilitate the activities described herein. The memory 904 may be any volatile or non-volatile computer-readable storage medium capable of storing data or computer code relating to the activities described herein. According to an exemplary embodiment, the memory 904 includes computer code modules (e.g., executable code, object code, source code, script code, machine code, etc.) configured for execution by the processing circuit 902.

According to an exemplary embodiment, the controller 900 is configured to receive data from the sensors 880 and display such data to the operator to assist in the operator's control of the drone system 800 (e.g., in a manual flight control mode, etc.). The controller 900 is further configured to receive inputs from the operator via the input device 814 and control the components of the drone system 800 (e.g., the wheel and tire assemblies 830, the rear engine 840, the engine actuators 484, the propulsion devices 850, the propulsion device actuators 852, the wing assemblies 860, etc.) to provide an operation commanded by the operator (e.g., drive the wheels 832, extend/retract the wheels 832, extend/retract the wings 862, turn the drone system 800, increase/decrease altitude, increase/decrease speed, etc.) based on the inputs (i.e., manual flight control). In some embodiments, the controller 900 is configured to allow a range of acceptable manual inputs, but prevent or correct manual inputs that exceed the range of acceptable manual inputs. In some embodiments, the controller 900 is configured to provide feedback or alerts (e.g., haptic feedback, visual feedback, audible feedback, etc.) to inform an operator that they are approaching or reached the limits of the range of acceptable manual inputs.

According to an exemplary embodiment, the controller 900 is configured to facilitate autonomous flight control of the drone system 800. In one embodiment, the controller 900 receives and interprets data received from the sensors 880 (e.g., location relative to other objects or drones, current location, desired destination, weather conditions, etc.) to autonomously fly the drone system 800 to a desired destination. In some embodiment, the controller 900 additionally or alternatively transmits the data to the remote server 910, which interprets the data and then transmits flight controls to the controller 900 to implement to achieve the autonomous flight control.

The remote server 910 may be configured to control a plurality of the drone systems 800 based on their relative locations to one another and/or data received from each of the drone systems 800. The remote server 910 may additionally or alternatively be configured to assign flight paths for each of the drone systems 800 based on their relative location to one another (e.g., to be autonomously followed, to be manually followed, etc.). The remote server 910 may perform similar functionality as described herein in relation to the remote control system used with the drone system 700.

Figure 20:
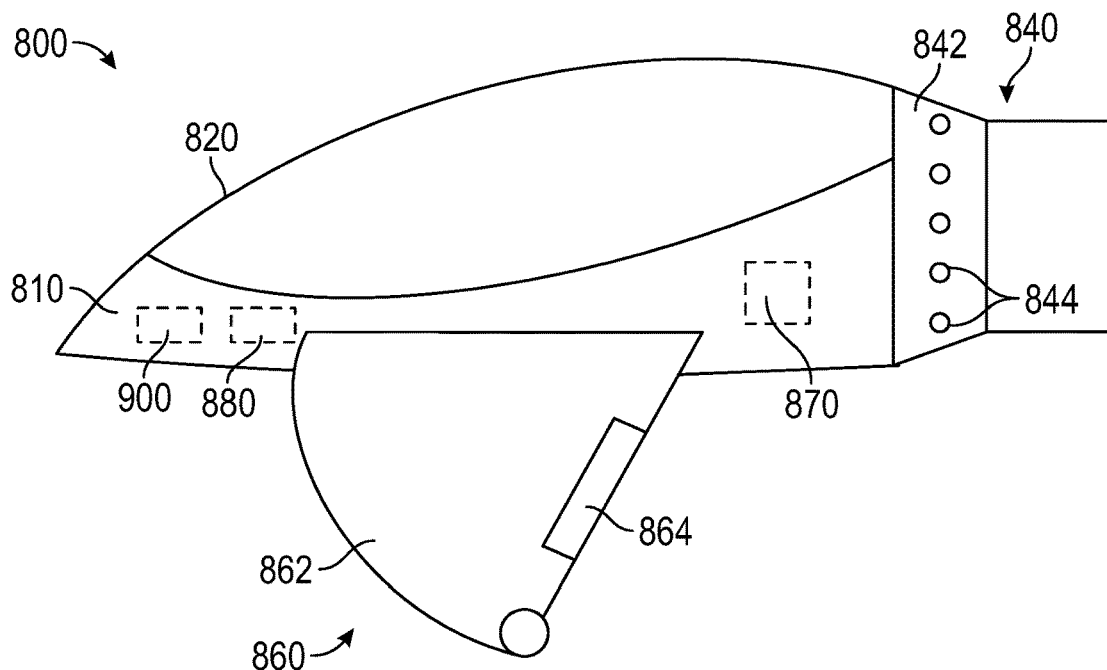
FIG. 20 is a side view of the drone system of FIG. 14 in a seventh configuration, according to an exemplary embodiment.

According to an exemplary embodiment, the controller 900 is configured to reconfigure and/or operate the drone system 800 is various configurations based on a desired operation to be performed by the drone system 800 (e.g., drive, takeoff, land, fly, etc.). In some embodiments, as shown in FIG. 14, the controller 900 is configured to retract the propulsion devices 850 and/or the wings 862 when the drone system 800 is operated in a driving mode of the drone system 800. In some embodiments, as shown in FIGS. 16 and 17, the controller 900 is configured to extend and selectively pivot the propulsion devices 850 during a takeoff mode, a landing mode, and/or a flying mode of the drone system 800. In some embodiments, as shown in FIG. 18, the controller 900 is configured to extend the propulsion devices 850 and pivot the rear engine 840 such that the rear engine 840 faces downward during a takeoff mode and/or landing mode of the drone system 800. In some embodiments, the controller 900 is configured to retract the wings 862 during the takeoff mode and/or the landing mode. In some embodiments, as shown in FIG. 19, the controller 900 is configured to extend and/or selectively pivot the propulsion devices 850 and the wings 862 during a flight mode of the drone system 800. In some embodiments, as shown in FIG. 20, the controller 900 is configured to retract the propulsion devices 850 and extend and selectively pivot the wings 862 during a flight mode of the drone system 800. In some embodiments, as shown in FIG. 21, the controller 900 is configured to retract the propulsion devices 850, extend and selectively pivot the wings 862, and selectively reposition the rear engine 840 (e.g., relative to a nominal, rearward facing direction as shown in FIGS. 14-20, etc.) during a flight mode of the drone system 800.

Figure 23:
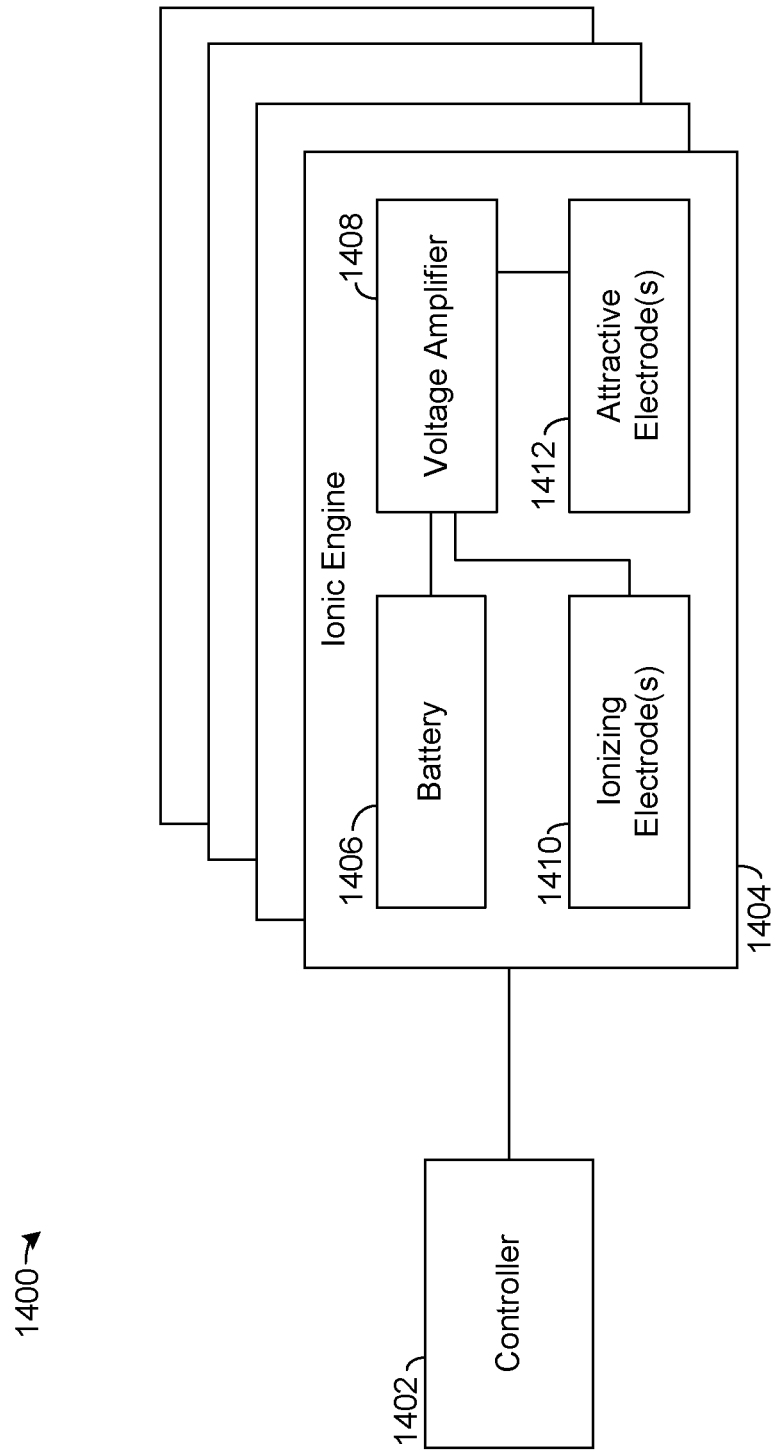
FIG. 23 is a block diagram of an ionic engine system, according to an exemplary embodiment.

Referring now to FIG. 23, a block diagram of an ionic engine system 1400 is shown. The ionic engine system 1400 includes a controller 1402 and one or more ionizing electrode engines, shown as ionic engines 1404. The controller 1402 may be included with the controller 130, the central controller 505, and/or the controller 900 described above. In some examples, the one or more ionic engines 1404 are embodiments of the propulsion devices 120, the propulsion devices 750, the rear engine 840, and/or the propulsion devices 850 described in detail above. Accordingly, the ionic engine system 1400 may be included with the drone shipping system 100, the drone system 700, and/or the drone system 800.

Each ionic engine 1404 is shown to include a battery 1406, a voltage amplifier 1408, one or more ionizing electrodes 1410, and one or more attractive electrodes 1412. The battery 1406 stores electrical energy that can be discharged and provided to the voltage amplifier 1408. In the embodiment shown, each ionic engine 1404 includes a dedicated battery 1406. In alternative embodiments, multiple ionic engines share a common battery 1406. For example, battery mat 720 may be used to provide electrical energy to the ionic engines 1404 in some embodiments. In some embodiments, the battery 1406 is rechargeable.

The voltage amplifier 1408 is configured to receive electrical energy from the battery 1406 and use the electrical energy to provide an amplified voltage across the ionizing electrode(s) 1410 and the attractive electrode(s) 1412. For example, the battery 1406 may provide a standard battery output voltage (e.g., ±12 volts, ±24 volts, etc.). The voltage amplifier 1408 is configured to amplify the voltage and output a significantly higher voltage (e.g., approximately ±20,000 volts). The voltage amplifier 1408 provides the high voltage across the ionizing electrode(s) and the attractive electrode(s) 1412. The voltage output by the voltage amplifier 1408 is high enough to cause ionization of atmospheric air (e.g., ionization of nitrogen molecules) proximate the ionizing electrode(s) 1410. In some embodiments, the voltage output is substantially constant (e.g., direct current), such that a static electric field is established around the ionizing electrode(s) 1410 and the attractive electrode(s) 1412. In other embodiments, the voltage output is time-variant, for example provided with alternating current or provided in pulses as controlled by the controller 1402.

The ionizing electrode(s) 1410 are configured to provide, at a surface of the ionizing electrode(s) 1410, an electrostatic charge. In various embodiments, the ionizing electrode(s) 1410 provide a positive charge, a negative charge, or a charge that alternates between positive and negative. The ionizing electrode(s) 1410 include a conductive material. In some embodiments, the ionizing electrode(s) 1410 are pointed, sharp, etc. to minimize drag on the ionizing electrode(s) 1410. As illustrated in FIGS. 31-42, the ionizing electrode(s) 1410 may be provided as a collection of point electrodes, as a collection of line electrodes, or some combination thereof, for example provided in a grid and in a variety of arrangements as described in detail below. Additionally, it should be understood that a wide range of numbers of ionizing electrode(s) 1410 may be included in an ionic engine 1404 in various embodiments (e.g., on the order of 1, 10, 100, 1000, 10,000, etc.). As described below with reference to FIG. 24, the ionizing electrode(s) 1410 are configured to cause the ionization of atmospheric air proximate the ionizing electrode(s) 1410.

The attractive electrodes 1412 are configured to provide, at a surface of the attractive electrodes 1412, an electrostatic charge. In various embodiments, the attractive electrode(s) 1412 provide a positive charge, a negative charge, or a charge that alternates between positive and negative, such that the attractive electrode(s) 1412 provide an opposite charge relative to the ionizing electrode(s) 1410. For example, in some embodiments the attractive electrode(s) 1412 provide a negative charge while the ionizing electrode(s) 1414 provide a positive charge, such that a high voltage electric field is created between the attractive electrode(s) 1412 and the ionizing electrode(s) 1416. In an embodiment that includes multiple attractive electrodes 1412 and multiple ionizing electrodes 1410, the electrodes may be arranged in one-to-one pairs (i.e., such that each attractive electrode 1412 corresponds to one ionizing electrode 1410 and vice versa) or may be distributed such that no such pairing is used. In alternative embodiments, the attracting electrodes are grounded, such that an electric field can be established between the ionizing electrode(s) 1410 and the grounded attractive electrodes 1412 without affirmatively providing electrostatic charge at the attractive electrodes 1412.

The attractive electrode(s) 1412 include a conductive material. In some cases, the attractive electrode(s) 1412 are shaped to resist a flow of air past the attractive electrode(s) 1412 (e.g., flat, fan-shaped, sail-shaped, etc.), thereby increasing a resistance to airflow which provides a reactionary thrust in the opposite direction as described below with reference to FIG. 24. In other cases, the attractive electrodes 1412 are shaped or pointed to reduce drag on the attractive electrodes 1412. As illustrated in FIGS. 31-42, the attractive electrode(s) 1412 may be provided as a collection of point electrodes, as a collection of line electrodes, or some combination thereof, for example provided in a grid and in a variety of arrangements as described in detail below.

Figure 24:
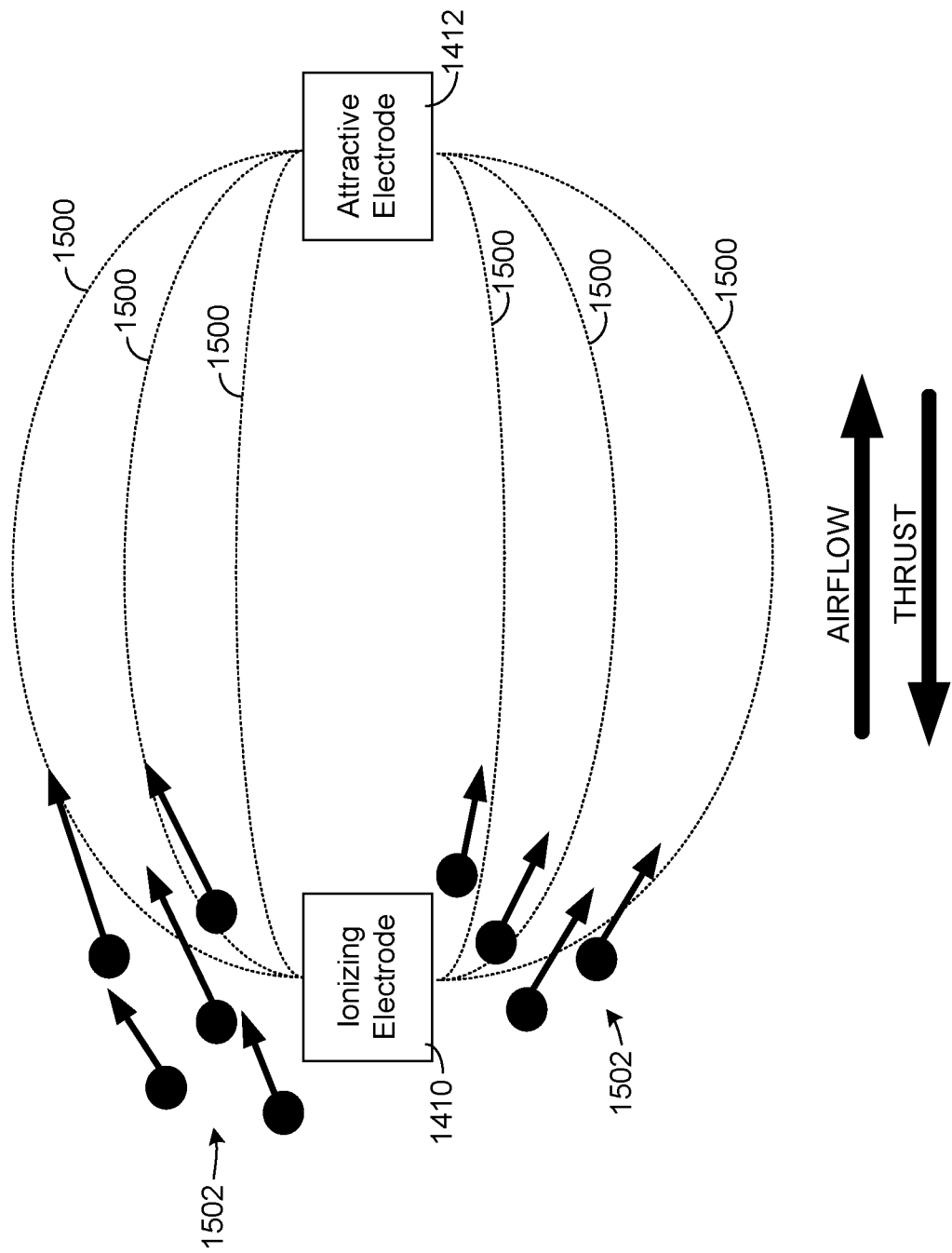
FIG. 24 is a schematic illustrating the operation of an ionic engine, according to an exemplary embodiment.

Referring now to FIG. 24, a schematic illustration of the principals governing operation of an ionic engine 1404 are shown, according to an exemplary embodiment. As shown in FIG. 24, The ionizing electrode 1410 and the attractive electrode 1412 are provided with opposite charges, such that an electric field is created therebetween. In FIG. 24, the electric field is indicated by field lines 1500. In the example shown, the ionizing electrode 1410 is provided with a substantially static positive electric charge, while the attractive electrode 1412 is provided with a substantially static negative electric charge. For example, in the example shown, a voltage differential of approximately 40,000 volts is provided across the ionizing electrode 1410 and the attractive electrode 1412.

The positive charge on the ionizing electrode 1410 (i.e., the associated electric field) causes the ionization of atmospheric air proximate the ionizing electrode 1410. For example, the ionizing electrode 1410 may cause an electron to be removed from each of multiple molecules 1502 (e.g., nitrogen/$N_2$) in the air surrounding the ionizing electrode 1410, thereby ionizing the molecules 1502. Ionization may be caused by collisions between the molecules 1502 and free electrons attracted towards the ionizing electrode 1410 by the positive charge on the ionizing electrode 1410. The resulting loss of an electron from each of the molecules 1502 transforms the molecules 1502 into positively-charged ions 1502 in a process known as corona discharge. Alternative ionization regimes, including dielectric battery discharges ("DBDs") and nanosecond repetitively pulsed discharge ("NRPD") are also possible with different voltage patterns and are described in detail below.

After being ionized, the ions 1502 are attracted towards the attractive electrode 1412 along the field lines 1500. That is, the positively-charged ions 1502 are pulled towards the negatively-charged attractive electrode 1412 by the Coulomb force (electric force). An equal and opposite force is exerted on the attractive electrode 1412 by the ions 1502.

Under this Coulomb force, the ions 1502 are accelerated towards the attractive electrode 1412 (i.e., to the right in FIG. 24). During the resulting motion through the space between the ionizing electrode 1410 and the attractive electrode 1412 (the "inter-electrode space"), the ions 1502 collide with other atoms, molecules, particles, etc., (the "air") in the inter-electrode space. The collisions cause the air to flow towards the attractive electrode 1412 (i.e., to the right in FIG. 24). These collisions also resist the motion of the ions 1502 towards the attractive electrode 1412, thereby increasing the work done on the ions 1502 to draw the ions 1502 across the inter-electrode space.

Under basic principles of Newtonian mechanics, equal and opposite forces are exerted on the attractive electrode 1412 as on the ions 1502. This reaction force pushes the attractive electrode 1412 in the opposite direction of the airflow (i.e., to the left in FIG. 24). In the ionic engine 1404, the attractive electrode 1412 and the ionizing electrode 1410 have substantially rigid relative positions, such that the separation therebetween is not substantially affected by the reaction force. Instead, the reaction force pushes the ionic engine 1404 in the opposite direction of the airflow. This force is referred to as the thrust of the ionic engine 1404. When the thrust generated by the ionic engine 1404 is greater than opposing forces on the ionic engine 1404 (e.g., gravity, drag), the thrust accelerates the ionic engine 1404 in the direction of the thrust (i.e., towards the left of FIG. 24).

In the example shown, an approximately constant thrust can be generated by providing a substantially constant voltage differential between the ionizing electrode 1410 and the attractive electrode 1412 while movement of air across the electrodes 1410, 1412 provides a consistent source of fresh air to be ionized by the electric field. The thrust may be controlled by varying the voltage differential and/or selectively applying voltage across various electrode pairs in an ionic engine 1404 with multiple electrode pairs.

As mentioned above, the approach illustrated in FIG. 24 corresponds to an ionization process known as corona discharge, which is a direct current ("DC") discharge associated with substantially electrostatic voltage applied across the ionizing electrode 1410 and the attractive electrode 1412. In alternative embodiments, DBDs are used. For DBDs, the electrodes 1410, 1412 are shielded in dielectric surfaces and an alternating current signal of frequency on the order of 1-100 kHz is applied. Charge builds up on the dielectric surfaces, reducing the electric field and thereby reducing gas heating, spark risks, etc. Because the signal alternates between positive and negative, the built-up charge is removed on each cycle. DBD may therefore be more stable than the direct current, corona discharge approach.

Another approach that may be used is pulsed discharges such as NRPD, in which voltage waveforms with fast rise times and short pulse durations (on the order of 10 nanoseconds) are provided at the electrodes 1410, 1412. The NRPD approach may reduce the risk of sparking and substantially prevent gas heating as compared to the corona discharge approach. It should be understood that the embodiments herein may be implemented using DBD, NRPD, other AC or pulsed discharge, corona discharge, or some combination thereof.

Although the example shown includes a single ionizing electrode 1410 and a single attractive electrode 1412, it should be understood that multiple ionizing electrodes 1410 and attractive electrodes 1412 can be included in an ionic engine 1404 to generate thrust using the principles outlined above. In some embodiments, the multiple electrodes 1410 and 1412 are arranged in pairs as shown in FIG. 24. In other embodiments, a group of ionizing electrodes 1410 is collectively paired with a group of attractive electrodes 1412 such that an electric field generated by the two groups of electrodes provides ionization, attraction, and thrust substantially as outlined above with reference to FIG. 24. In some embodiments, an ionizing electrode 1410 is paired with two or more attractive electrodes 1412, for example arranged in line with one another, such that an ion 1502 is first pulled towards a first attractive electrode 1412 and then pulled further towards a second attractive electrode 1412. Many arrangements of ionizing electrodes 1410 and attractive electrodes 1412 are possible, for example as shown in FIGS. 26-42 and described in detail below.

In some embodiments, by reversing the voltage differential across the electrodes 1410, 1412, the direction of thrust can be reversed. In such an embodiment, the ionic engine 1404 can be controlled by the controller 1402 to provide thrust in two opposite directions. The ionic engine 1404 can thereby provide multi-directional acceleration for an aircraft, drone, etc.

In the absence of electrically-isolating (non-conductive) materials, the influence of each ionizing electrode 1410 and each attractive electrode 1412 on the overall electric field of the ionic engine 1404 extends to a theoretically-infinite distance in all directions from the corresponding electrode. Multiple electrodes 1410, 1412 in an ionic engine 1404 must therefore be carefully arranged to account for the interactions therebetween. For example, placing two ionizing electrodes 1410 close together may diminish the strength of the electric field therebetween, thereby reducing the ability of the electric field to generate ions. Additionally, if pairs of electrodes 1410, 1412 are provide in series (i.e., such that air flows across a first pair and then flows across the second pair), the electric field associated with the ionizing electrode 1410 of the second pair may act to decelerate ions in the space between the electrode pairs.

In fact, it may be the case that infinite separation between any two electrode pairs provides the highest thrust-to-power ratio (i.e., such that the most thrust is generated for a given amount of electrical power from the battery 1406). However, keeping a large separation between electrode pairs may be unfeasible on a drone or other aircraft, where the thrust-to-area or thrust-to-volume ratio of the ionic engine 404 is also of importance. The various ingenious arrangements and designs for ionic engines shown in FIGS. 25-44 and described below provide various solutions to these technical problems.

Additionally, the embodiments shown in FIGS. 25-44 address a potential trade-off between the amount of drag on an ionic engine 1404 and the amount of thrust generated in reaction to the flow of air between electrodes 1410 and 1412. The work done on the attractive electrode 1412 by the Coulomb force is a function of the resistance (drag, forces from collisions) on the ions 1502 travelling across the inter-electrode space. Accordingly, an ionic engine 1404 may be designed to increase the resistance to such air flow in the inter-electrode space. However, features intended to increase such resistance may also increase the drag on the ionic engine 1404 as the ionic engine 1404 moves through the air. Such features, as for those described herein, should be carefully designed such that the increased thrust attributed thereto outweighs the effects of any increase in drag.

Figure 25:
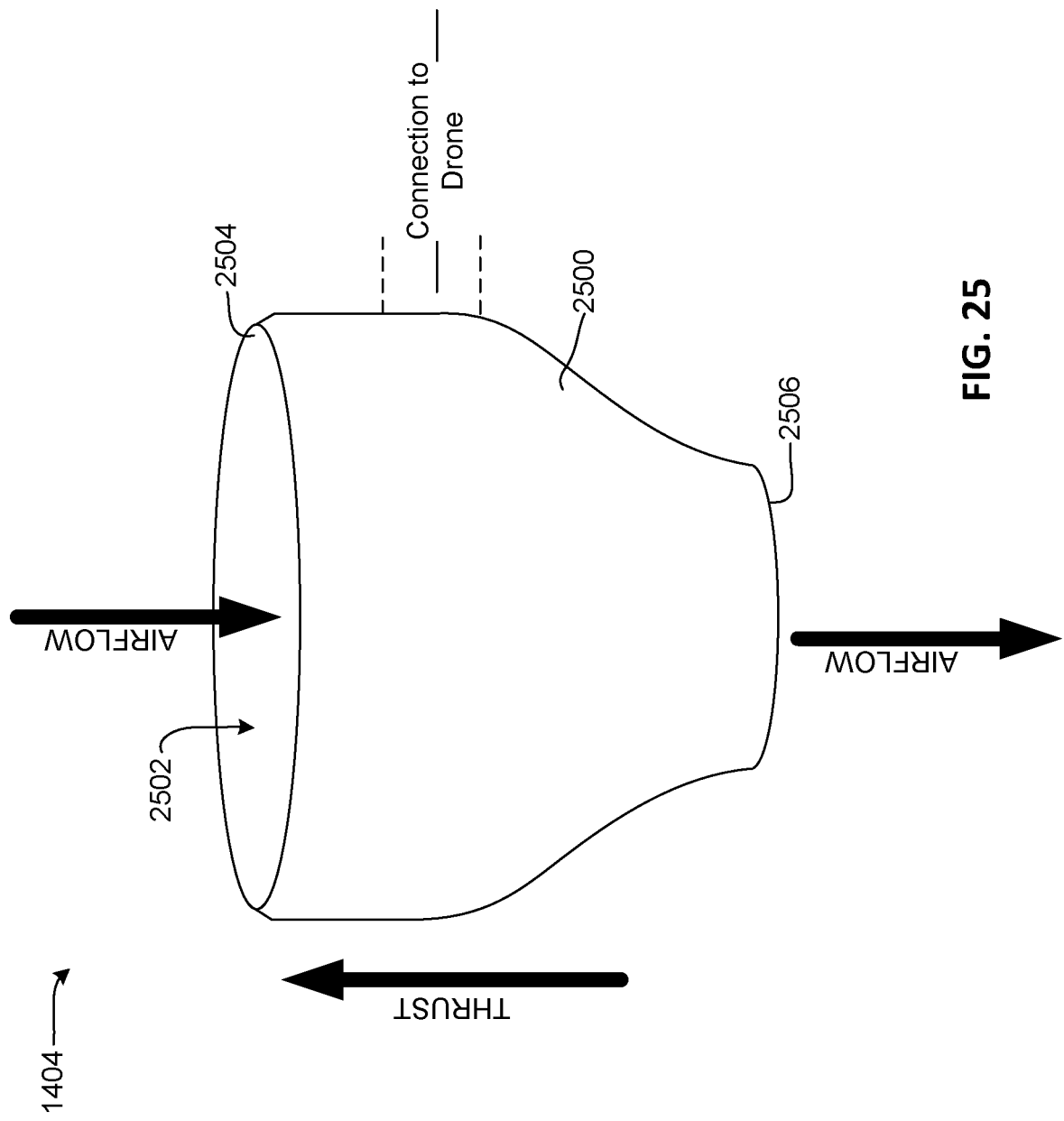
FIG. 25 is a perspective view of an ionic engine, according to an exemplary embodiment.

Referring now to FIG. 25, a perspective view of an ionic engine 1404 is shown, according to an exemplary embodiment. FIG. 25 shows a housing 2500 configured to be coupled to an aircraft, drone, etc., as shown for propulsion devices in FIGS. 1-22. For example, the housing 2500 may be fixedly mounted on an aircraft or may be configured to be rotated about one or more axes relative to the aircraft. More details of such mounting are described above with reference to FIGS. 1-22. Thrust created by the ionic engine 1404 results in a force on the aircraft, drone, etc. coupled to the ionic engine 1404.

As illustrated in FIG. 25, the housing 2500 is substantially cylindrical and has an airway 2502 extending therethrough from an inlet 2504 to an outlet 2506. Air can flow through the housing 2500 from the inlet 2504 to the outlet 2506 via the airway 2502. As shown for various embodiments in FIGS. 26-42, ionizing electrodes 1410 and attractive electrodes 1412 are positioned along the airway 2502 and are operable as discussed above to generate thrust in a direction opposite the airflow. In various embodiments, the battery 1406, voltage amplifier 1408, and controller 1402 are mounted in a wall of the housing 2500, are included with the drone/aircraft coupled to housing 2500, or some combination thereof.

In the embodiment shown, the inlet 2504 has a greater surface area than the outlet 2506. For example, the outlet 2506 may have an area equal to 20%, 40%, 60%, 80%, etc. of the area of the inlet 2504 in various embodiments. The reduction in cross-sectional area between the inlet 2504 and the outlet 2506 can create an increase in air pressure and density within the housing 2500 relative to the external air, thereby increasing the resistance of ionic flow in the inter-electrode space. Because of the reactive forces described above, this increased resistance increases the thrust created by the ionic engine 1404.

Additionally, the reduced size of the outlet 2506 relative to the inlet 2504 allows the housing 2500 to be formed in a highly aerodynamic, tapered shape (e.g., a tear drop shape, a cone shape, etc.). By optimizing the relative sizes of the outlet 2506 and the inlet 2504 and the shape of the housing 2500, the exterior shape of the housing 2500 may reduce the drag on the ionic engine 1404 by more than an increase in drag associated with the increased resistance to ionic flow within airway 2502 of the housing 2500. The housing 2500 is thereby configured to have a net benefit on the efficiency of the ionic engine 1404.

Figure 26A:
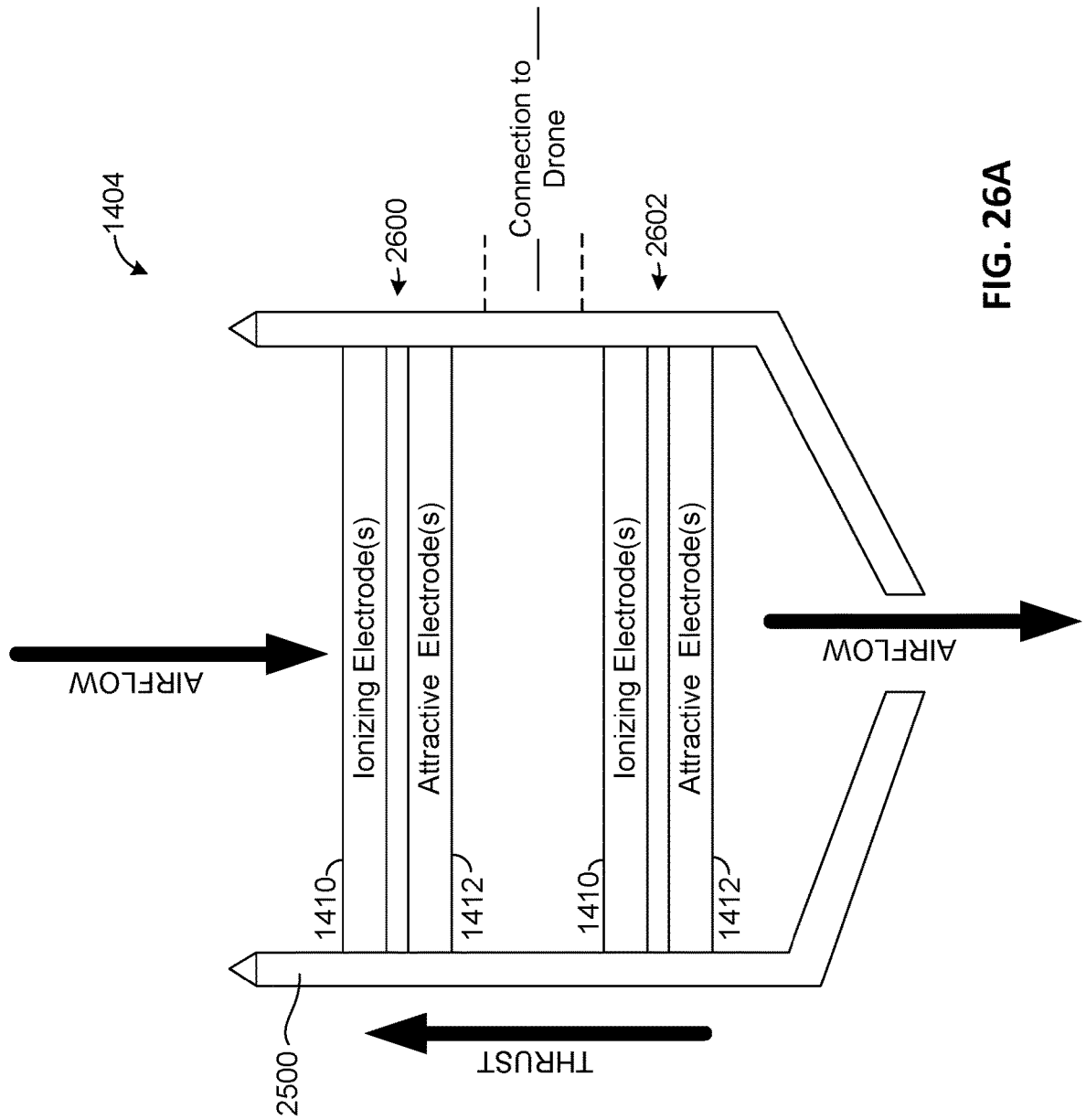
FIG. 26A is a cross-sectional view of the ionic engine of FIG. 25, according to an exemplary embodiment.
Figure 26B:
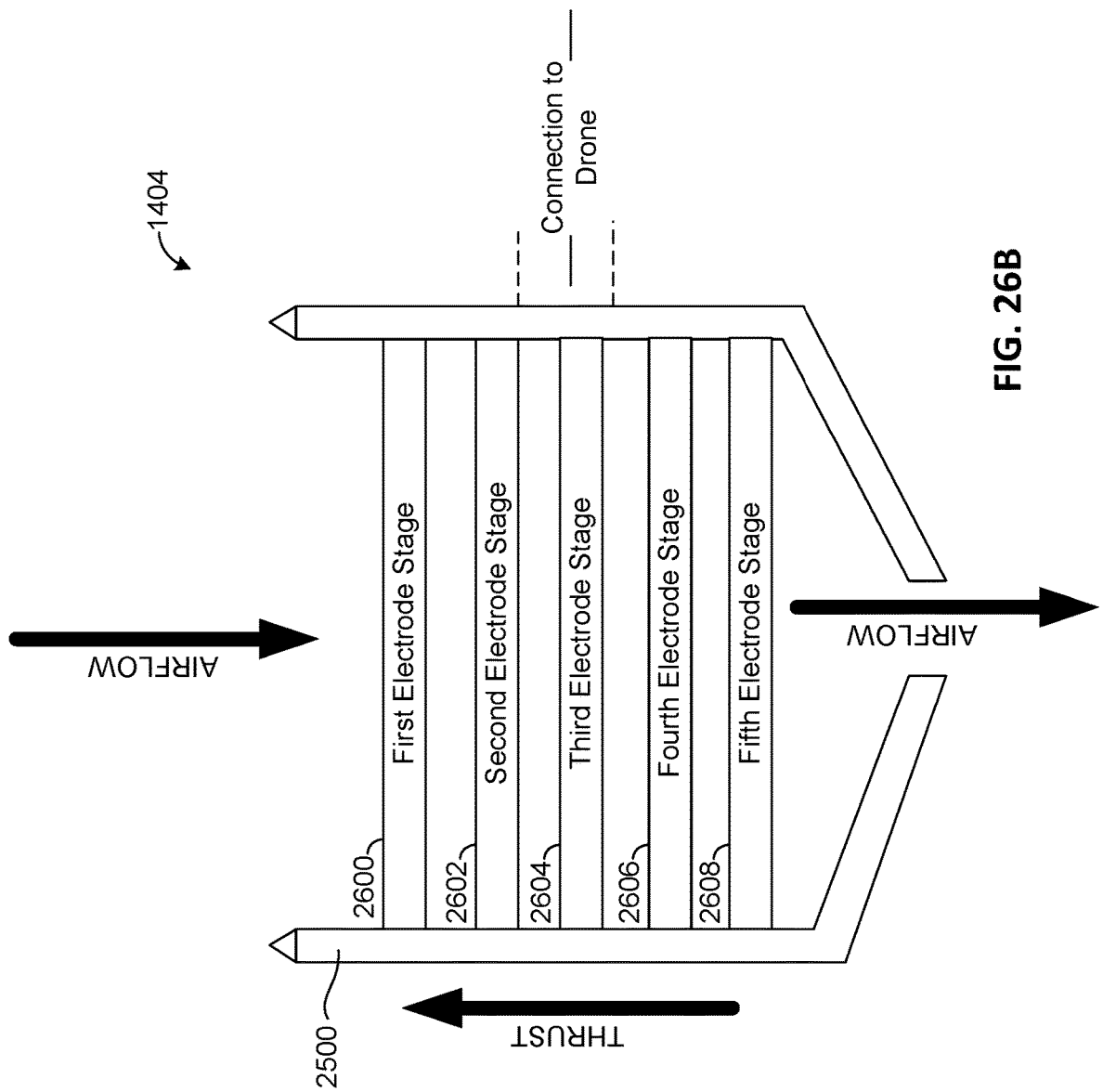
FIG. 26B is a cross-sectional view of the ionic engine of FIG. 26A, according to another exemplary embodiment.

Referring now to FIGS. 26A and 26B, a cross-sectional view of the ionic engine 1404 is shown, according to an exemplary embodiment. In the example of FIG. 26A, the ionic engine 1404 includes a first electrode stage 2600 positioned proximate the inlet 2504 and a second electrode stage 2602 positioned proximate the outlet 2506. Each electrode stage 2600, 2602 includes one or more ionizing electrodes 1410 positioned upstream from one or more attractive electrodes 1412. FIG. 26A shows each set of one or more ionizing electrode(s) 1410 or attractive electrode(s) 1412 arranged in a plane orthogonal to the housing 2500.

Accordingly, in the embodiment shown, air arrives at the first electrode stage 2600 and is ionized by the ionizing electrode(s) 1410 of the first electrode stage 2600 and accelerated towards the outlet 2506 by the attractive electrode(s) 1412 of the first electrode stage 2600. The air then continues towards the second electrode stage 2602, where the air is ionized by the ionizing electrode(s) 1410 of the second electrode stage 2602 and accelerated towards the outlet 2506 by the attractive electrode(s) 1412 of the second electrode stage 2602. Two stages of acceleration are thereby provided. In other embodiments, only one electrode stage is provided. In still other embodiments, three or more stages are provided (e.g., approximately ten stages, approximately one hundred stages, etc.). For example, FIG. 26B shows an ionic engine 1404 that includes a first electrode stage 2600, a second electrode stage 2602, a third electrode stage 2604, a fourth electrode stage 2606, and a fifth electrode stage 2608 arranged in series in the housing 2500.

As shown in FIG. 26A, the distance between the first electrode stage 2600 and the second electrode stage 2602 is significantly more than the separation of the electrodes 1410, 1412 in each stage 2600, 2602, thereby minimizing cross-effects or interference between the electric fields created by each stage 2600, 2602. In other embodiments, two or more electrode stages 2600 may be positioned closer together and controlled to pulse, provide alternating waveforms, or otherwise increase and decrease the associated electric fields in a coordinated pattern that minimizes the interference therebetween while accelerating air towards the outlet 2506. In some embodiments, a neutralizing plasma or field is maintained between electrode stages to reduce interaction effects there between. Such a neutralizing plasma or field may allow for closer arrangement of successive electrode stage pairs. The space between the electrode stage pairs may be very small (e.g., 1 cm, 2 cm, 3 cm, 4 cm, 5 cm, 10 cm, etc.).

Figure 27:
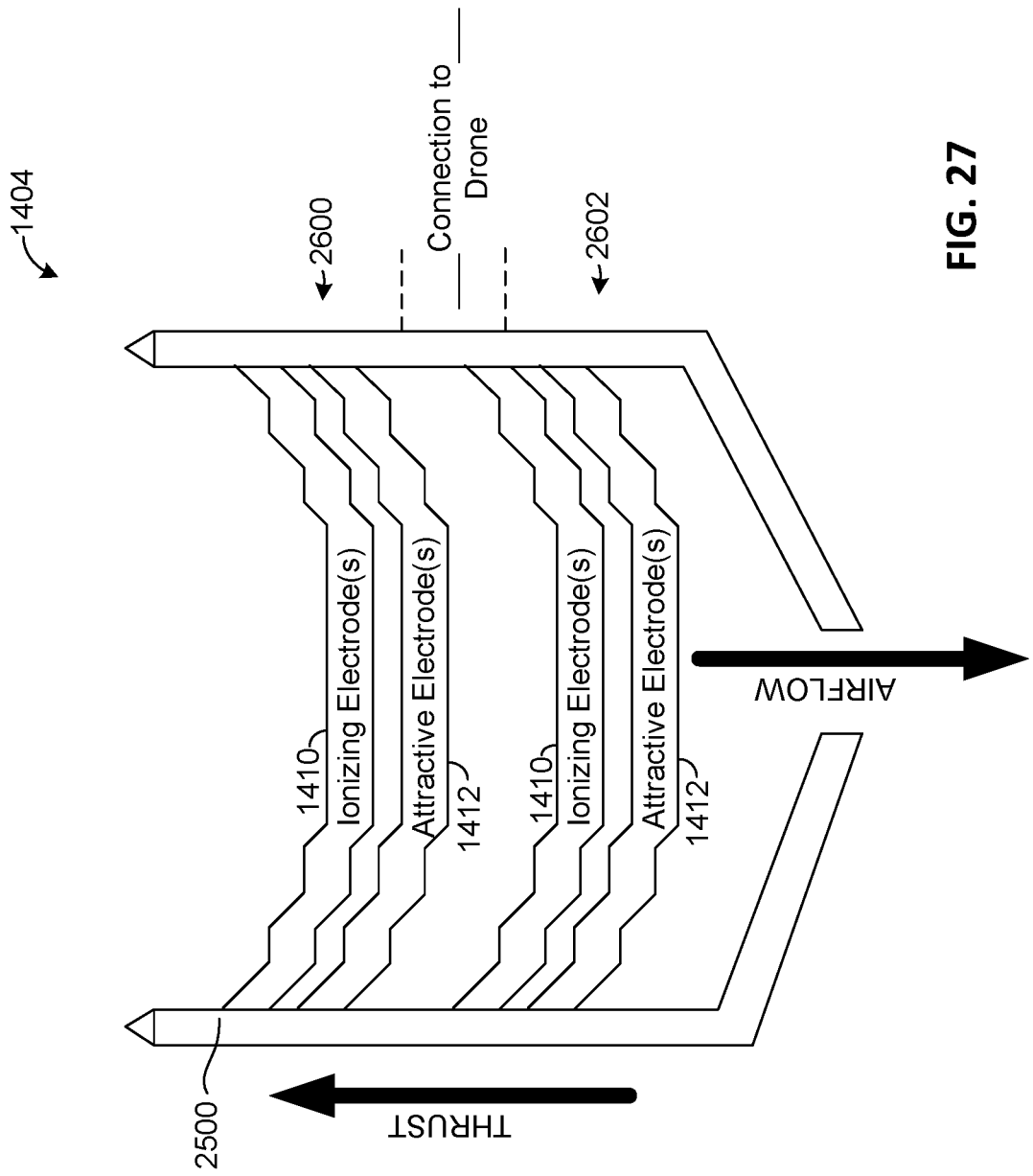
FIG. 27 is a cross-sectional view of the ionic engine of FIG. 25, according to another exemplary embodiment.

Referring now to FIG. 27, a cross-sectional view of the ionic engine 1404 is shown according to another exemplary embodiment. As in FIG. 26, the ionic engine 1404 of FIG. 27 includes a first electrode stage 2600 and a second electrode stage 2602. FIG. 27 illustrates that the sets of ionizing electrode(s) 1410 and/or attractive electrode(s) 1412 of each stage can be non-planar. For example, a non-planar arrangement of ionizing electrodes 1410 may increase interactions between the air and the ionizing electrodes 1410, thereby resulting in increased ionization. A non-planar arrangement of attractive electrodes 1412 may be used to direct airflow in various directions within the housing 2500, for example to focus airflow towards a center of the housing 2500, to cause the air to flow in a vortex or spiral, or to create some other pattern of air movement.

Figure 28:
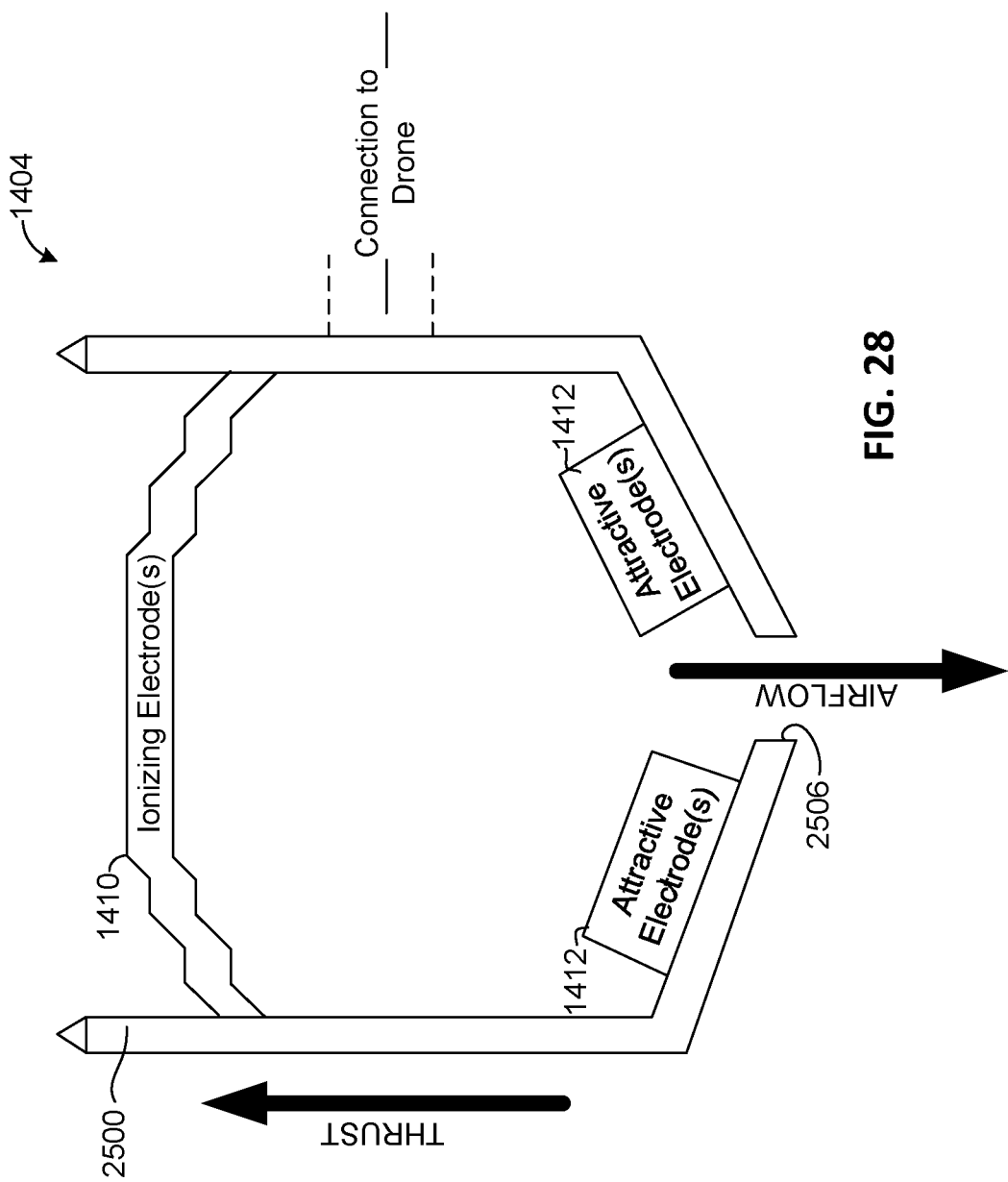
FIG. 28 is a cross-sectional view of the ionic engine of FIG. 25, according to another exemplary embodiment.

Referring now to FIG. 28, a cross-sectional view of the ionic engine 1404 is shown, according to another exemplary embodiment. In the embodiment of FIG. 28, the ionic engine 1404 includes a single electrode stage. One or more ionizing electrode(s) 1410 are positioned proximate the inlet 2504 and one or more attractive electrode(s) 1414 are positioned along an interior wall of the housing proximate the outlet 2506 (e.g., a ring-shaped attractive electrode 1412 surrounding the outlet 2506). In the embodiment shown, ions are created at the inlet 2504 and attracted across the full length of the housing 2500 toward the attractive electrode(s). Air is pulled towards the tapered end of the housing 2500 and forced through the outlet 2506. This structure maximizes the inter-electrode distance and may thereby increase the amount of thrust provided by a single stage. For a ring-shaped attractive electrode 1412 surrounding the outlet 2506, the electric field at a center of the outlet 2506 is approximately zero, which may improve the performance of the ionic engine 1404.

Referring now to FIGS. 29 and 30, another exemplary embodiment of the ionic engine 1404 is shown. FIG. 29 shows a cross-sectional view and FIG. 30 shows an end view (i.e., looking towards the inlet 2504 from outside the housing 2500). In the embodiment of FIGS. 29-30, the housing 2500 is divided into multiple channels 2900. Walls 2902 separate the channels 2900. The walls 2902 are electrically-insulating, such that the walls 2902 at least partially prevent the propagation of electrical fields through the walls 2902. That is, the walls 2902 reduce or illuminate interaction effects of electric fields from neighboring electrodes. The walls 2902 thereby allow for electrode pairs to be positioned close together in parallel while maintaining a high a thrust-to-power ratio.

As shown in FIG. 29, each channel 2900 can include multiple electrode pairs in series. In the example shown, each channel 2900 includes three ionizing electrodes 1410 and three attractive electrodes 1412. Furthermore, in the example of FIG. 29, a given wall 2902 is coupled to either ionizing electrodes 1410 or attractive electrodes 1412 but not both, which may facilitate the distribution of voltage to the electrodes 1410, 1412 by simplifying the wiring required within the walls 2902.

FIGS. 29 and 30 show an ionic engine 1404 that includes four walls 2902 separating five channels 2900. It should be understood that various numbers of walls 2902 and channels 2900 may be included in various embodiments. Additionally, although the walls 2902 shown in FIGS. 29-30 are substantially planar, in other embodiments the walls 2902 may be curved or circular. For example, in some embodiments the walls 2902 form concentric rings. As another example, the walls 2902 may be structured such that the channels 2900 therebetween are spiral-shaped, for example so that the channels 2900 are formed in a helix or other twisted configuration. In such an embodiment, the airflow projected from the outlet 2506 creates a vortex, which may increase the stability of flight achieved using the ionic engine 1404.

Referring now to FIGS. 31-42, end views of the ionic engine 1404 showing a variety of example electrode arrangements are shown, according to various exemplary embodiments. Each of FIGS. 31-42 shows an arrangement of ionizing electrodes 1410 or attractive electrodes 1412 corresponding to one electrode stage. FIGS. 31-42 show a cross-sectional view in embodiments where ionizing electrodes 1410 or attractive electrodes 1412 are provided in a common plane. However, it should be understood that the various arrangements may also include distribution along a third dimension not depicted in the two-dimensional schematics of FIGS. 31-42. In FIGS. 31-42, shaded dots are bars are used to depict electrodes, i.e., surfaces, points, lines, etc. on which an electrostatic charge can be applied to achieve the ionization and attraction effects described above. Other lines depict structure elements of the housing 2500 and the ionic engine 1404. For the sake of simplicity, FIGS. 31-42 are described as showing ionizing electrodes 1410. However, it should be understood that the arrangements shown can also be used with attractive electrodes 1412. Electrodes may be various sizes in various embodiments, for example with diameters on the order of one millimeter, one centimeter, one inch, etc. in various embodiments. Other dimensions of the embodiments described herein are also highly configurable.

Figure 31:
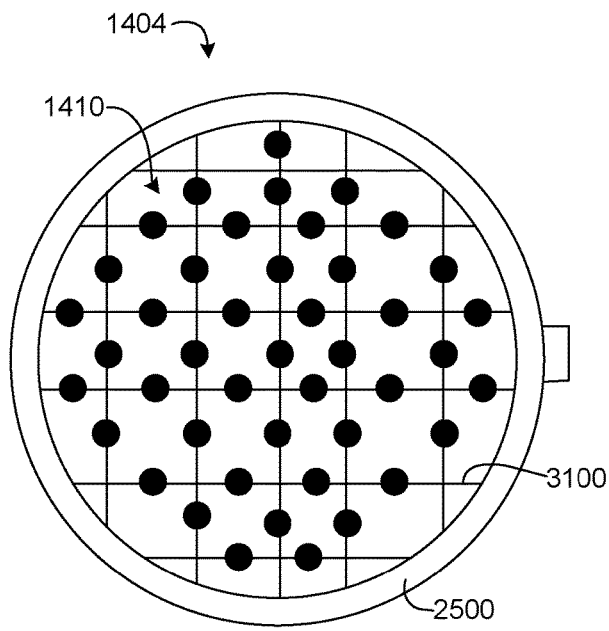
FIG. 31 is a view of the ionic engine of FIG. 25 having a first electrode arrangement, according to an exemplary embodiment.

FIG. 31 shows an ionic engine 1404 with electrodes 1410 (shown as shaded circular dots) arranged in a grid. As shown, the electrodes 1410 are spaced approximately equidistant from one another in a rectangular array. In other embodiments, spacing between the electrodes 1410 may vary across the grid, for example such that the electrodes 1410 are positioned closer together near a center of the grid. The electrodes 1410 are supported by support bars 3100, which provide structural support and allow for the transmission of current and voltage therethrough from the voltage amplifier 1408 to the electrodes 1410. In the embodiment of FIG. 31, the grid includes forty-four electrodes 1410. However, it should be understood that any number of electrodes 1410 may be included in a grid arrangement in various embodiments (e.g., 20, 40, 100, 500, 1000, 5000, etc.). In some embodiments, different electrodes 1410 can be independently controlled to different voltages, pulse durations, phases of alternating current, etc.

Figure 32:
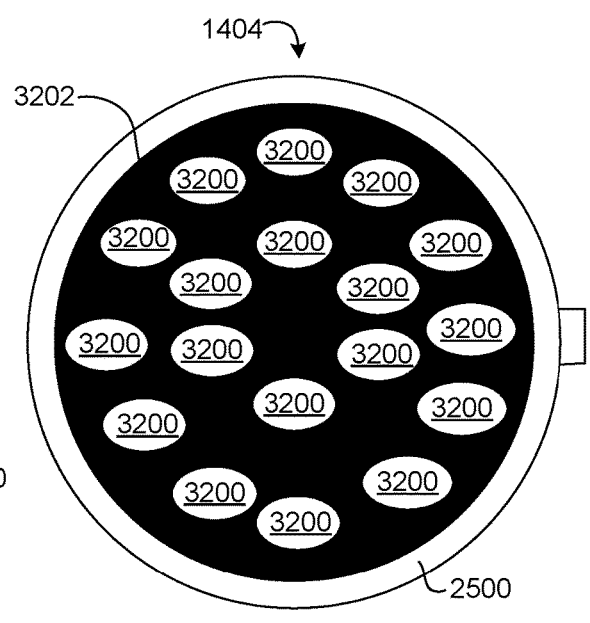
FIG. 32 is a view of the ionic engine of FIG. 25 having a second electrode arrangement, according to an exemplary embodiment.

FIG. 32 shows an ionic engine 1404 with an electrode formed as a plate 3202 with vents 3200 extending therethrough. The plate 3202 includes a conductive material such that the plate 3202 can be provided with a charge and placed at a voltage differential relative to another electrode. The vents 3200 allow air to pass through the plate 3202. In the dimension not shown in FIG. 32, the plate 3202 may be pointed/conical to improve the aerodynamics of the plate 3202.

Figure 33:
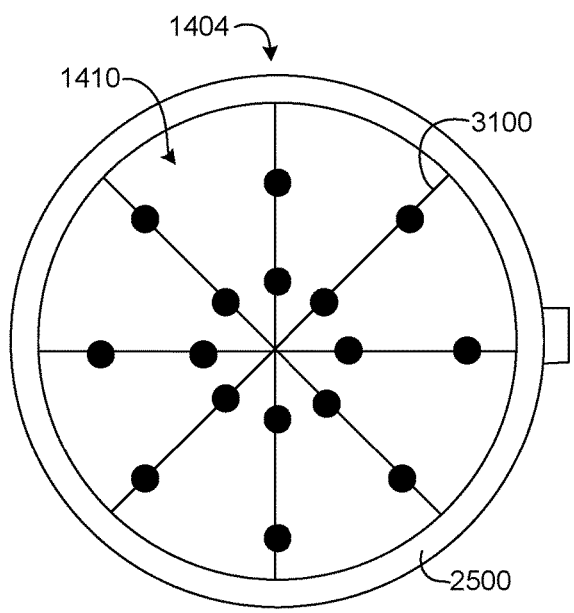
FIG. 33 is a view of the ionic engine of FIG. 25 having a third electrode arrangement, according to an exemplary embodiment.
Figure 34:
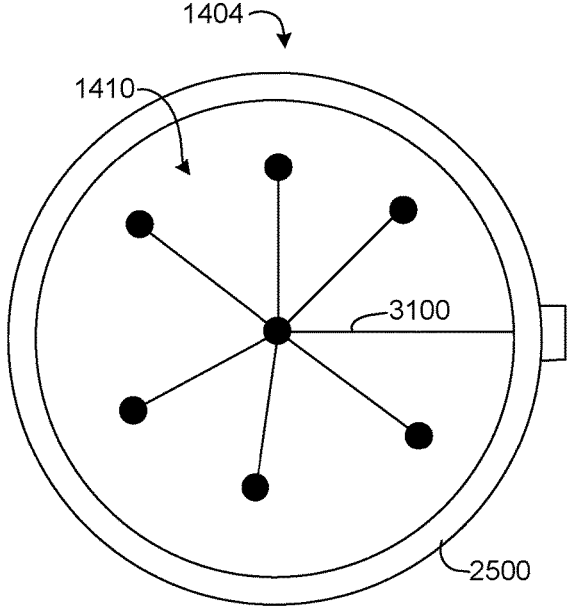
FIG. 34 is a view of the ionic engine of FIG. 25 having a fourth electrode arrangement, according to an exemplary embodiment.

FIGS. 33 and 34 show electrodes 1410 arranged in radial patterns. In FIG. 33, electrodes are positioned on pie-shaped support bars 3100. In FIG. 34, electrodes 1410 are positioned on star-shaped (fan-shaped) support bars 3100. The radial patterns of FIGS. 33 and 34 may maximize lateral separation between electrodes 1410, thereby increasing the thrust-to-power ratio of the ionic engine 1404.

Figure 35:
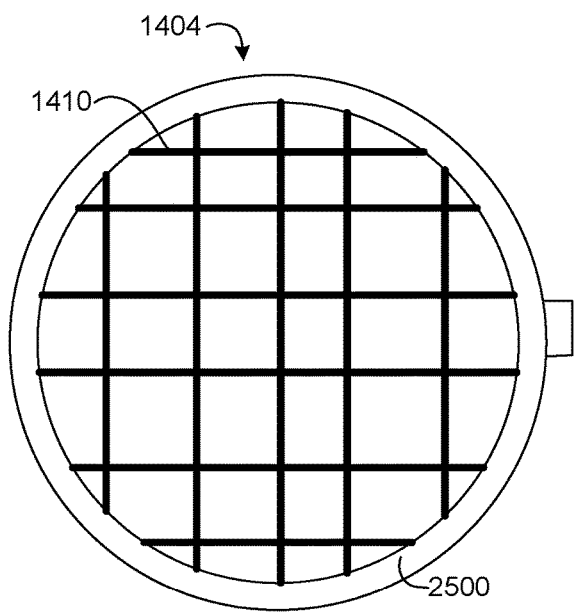
FIG. 35 is a view of the ionic engine of FIG. 25 having a fifth electrode arrangement, according to an exemplary embodiment.
Figure 36:
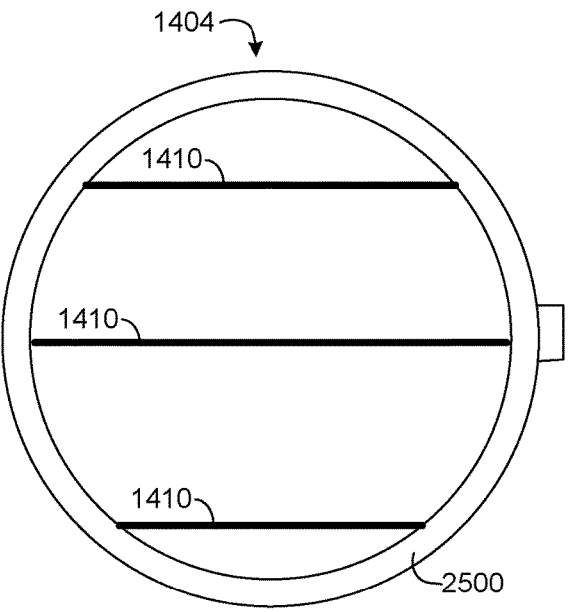
FIG. 36 is a view of the ionic engine of FIG. 25 having a sixth electrode arrangement, according to an exemplary embodiment.
Figure 37:
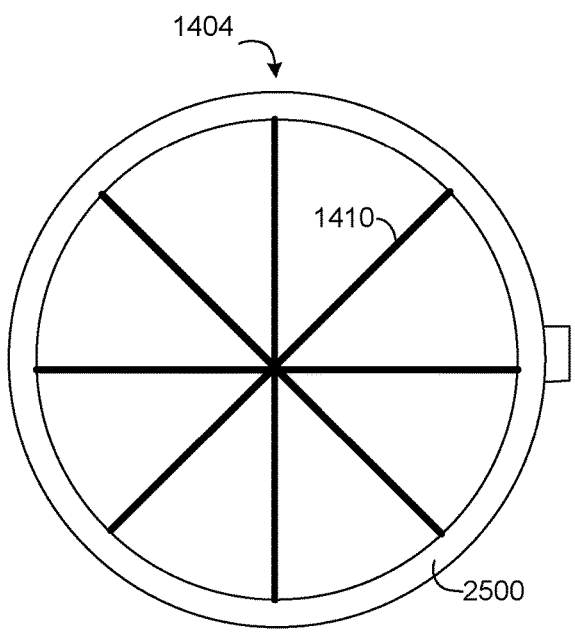
FIG. 37 is a view of the ionic engine of FIG. 25 having a seventh electrode arrangement, according to an exemplary embodiment.
Figure 38:
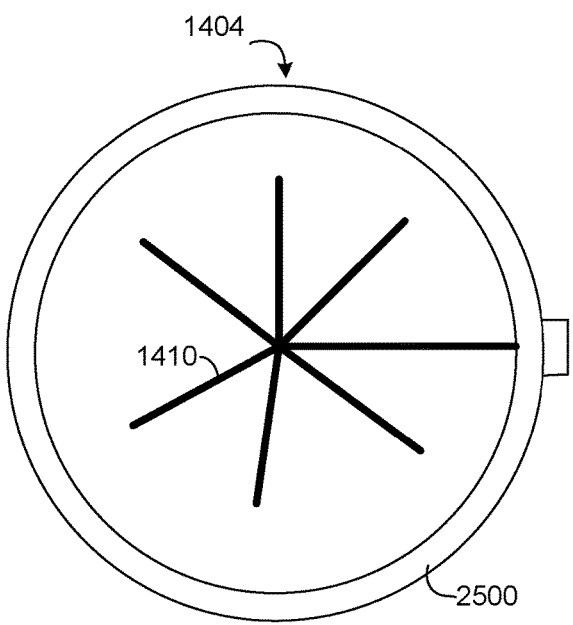
FIG. 38 is a view of the ionic engine of FIG. 25 having an eighth electrode arrangement, according to an exemplary embodiment.
Figure 39:
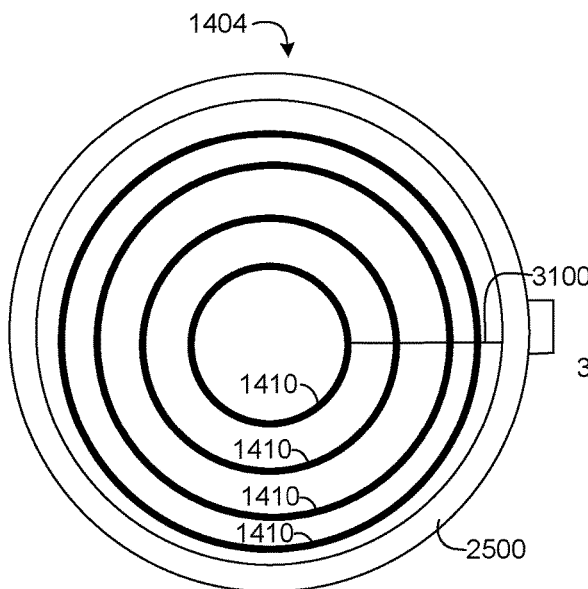
FIG. 39 is a view of the ionic engine of FIG. 25 having a ninth electrode arrangement, according to an exemplary embodiment.
Figure 40:
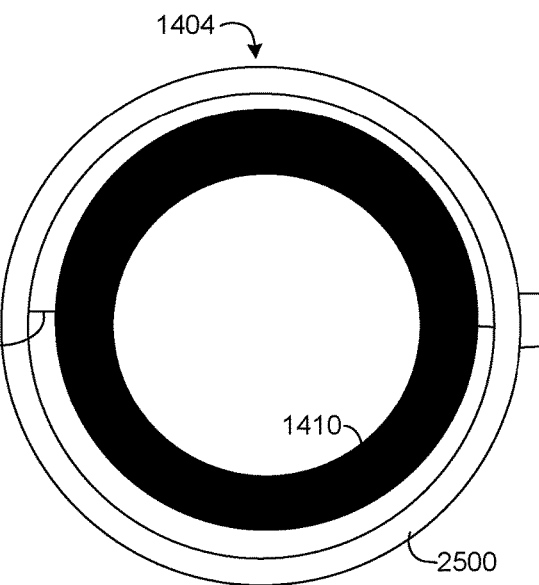
FIG. 40 is a view of the ionic engine of FIG. 25 having a tenth electrode arrangement, according to an exemplary embodiment.

FIGS. 35-40 show various embodiments in which the electrodes 1410 are provided as bars or lines, rather than spheres or points as shown in FIGS. 31-34. FIG. 35 shows a grid-shaped electrode 1410 that provides distribution of an electric field over a large percentage of the cross-sectional area of the housing 2500. FIG. 36 shows three electrodes 1410 provided as three parallel bars. The parallel bar electrodes 1410 provide lateral separation between electrodes which may increase the thrust-to-power ratio of the ionic engine 1404. FIG. 37 shows an ionic engine 1404 with a pie-shaped electrode 1410, while FIG. 38 shows an ionic engine 1404 with a star-shaped electrode 1410, both of which may provide areas of varying electric field strength which may be advantageous. FIGS. 39 and 40 show ionic engines 1404 having ring-shaped electrodes 1410. In FIG. 39, the ionic engine 1404 is shown to include a series of concentric ring-shaped electrodes 1410, which are disposed in a cone-shaped three dimensional form in some embodiments. In some cases, a clear path is left at the center of the housing 2500 to allow free flow of air from the inlet 2504 to the outlet 2506 to reduce drag on the ionic engine 1404. In FIG. 40, the ionic engine 1404 is shown to include a donut-shaped electrode 1410. In three-dimensions, the donut-shaped electrode 1410 may be slanted inwards to facilitate airflow therethrough. It should be understood that many such arrangements are contemplated by the present disclosure.

Figure 41:
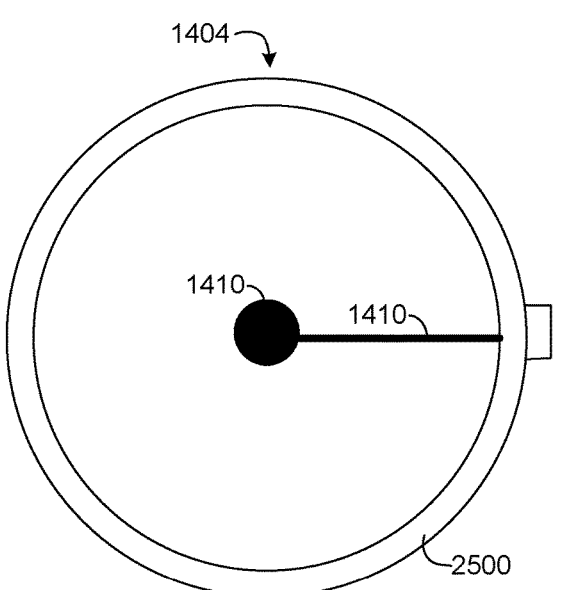
FIG. 41 is a view of the ionic engine of FIG. 25 having an eleventh electrode arrangement, according to an exemplary embodiment.

FIG. 41 shows an ionic engine 1404 having a lollipop-shaped electrode 1410 extending from one side of the housing 2500 and having a circular end located at approximately a center point of the cross-sectional area of the housing 2500. Using a single ionizing electrode 1410 eliminates complications caused by interactions between multiple ionizing electrodes 1410.

Figure 42:
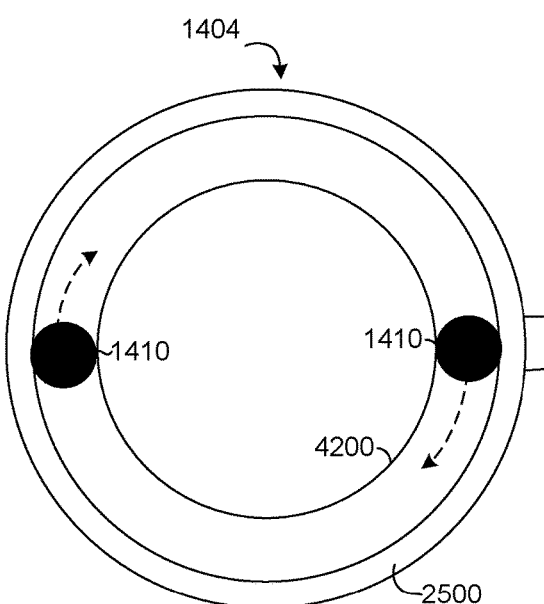
FIG. 42 is a view of the ionic engine of FIG. 25 having a twelfth electrode arrangement, according to an exemplary embodiment.

FIG. 42 shows an ionic engine 1404 in which electrodes 1410 are configured to rotate (spin, cycle, etc.) relative to a center point of the housing 2500. For example, as shown in FIG. 42, the electrodes 1410 may be driven about a track 4200 located along a periphery of the airway 2502 through the housing 2500. Movement of ionizing electrodes 1410 relative to the housing 2500 may increase the ratio of air passing through the housing to ionized air, because the movement may draw an ionizing electrode 1410 into sufficient proximity to a higher percentage of air passing through the housing, while also avoiding the negative effects of including a dense collection of multiple electrodes 1410. Movement of attractive electrodes 1412 relative to the housing 2500 can shape the airflow, for example to cause airflow through the housing 2500 to twist into a vortex. In some embodiments, ionizing electrodes 1410 and attractive electrodes 1412 are both included in a spinning/rotating arrangement as in FIG. 42, and may rotate in opposite directions or with different rotational frequencies.

FIGS. 31-42 thereby illustrate various possible arrangements of electrodes of one type (i.e., ionizing electrodes 1410 or attractive electrodes 1412) in an electrode stage of an ionic engine 1404. Various embodiments of ionic engines 1404 may include electrodes arranged in one or more of the arrangements shown in FIGS. 31-42. In some embodiments, an electrode stage includes ionizing electrodes 1410 and attractive electrodes 1412 aligned in series in the same electrode arrangement (i.e., both as shown in one of FIGS. 31-42). In some embodiments, substantially the same electrode arrangement is used for both ionizing electrodes 1410 and attractive electrodes 1412 with a slight rotational or translational offset (e.g., to increase resistance to airflow between the ionizing electrodes 1410 and attractive electrodes 1412). In preferred embodiments, for any given cross-section, at least 50% of the cross-sectional area of the airway 2502 is left open for airflow, while the remainder may be occupied by electrodes 1410, 1412 or various support structures.

In other embodiments, a different electrode arrangement is used for the ionizing electrodes 1410 as for the attractive electrodes 1412. For example, in one embodiment a lollipop-shaped ionizing electrode 1410 as in FIG. 41 may be paired with a vented plate attractive electrode 1412 as in FIG. 32. Such an arrangement may ionize a large percentage of air flowing into the housing 2500 while also significantly increasing airflow in the inter-electrode space due to limits on airflow through the vents 3200. As another example, a lollipop-shaped ionizing electrode 1410 as in FIG. 41 may be paired with spinning/rotating attractive electrodes 1412 as in FIG. 42 to cause a swirling vortex of air through the housing 2500. As another example, a donut-shaped ionizing electrode 1410 as in FIG. 40 can be paired with a lollipop-shaped attractive electrode 1412 as in FIG. 41.

Additionally, it should be understood that where multiple electrode stages are included (e.g., as shown in FIG. 26), the different electrode stages can use the same or different electrode arrangements. Furthermore, in embodiments where the housing 2500 includes walls 2902 as in FIG. 29, each channel 2900 may include electrodes arranged in various arrangements in accordance with FIGS. 31-42, including such that different channels 2900 include different electrode arrangements.

Although the support bars 3100 and electrodes 1410, 1414 of FIGS. 31-42 are show as being coupled to and extending from the exterior walls of the housing 2500, in some embodiments other support structures are included to support the electrodes 1410, 1414. For example, in some embodiments a central rod extends along a central axis of the airway 2502 and supports multiple electrode stages (e.g., electrode stages 2600-2608). In such embodiments, electrodes 1410, 1414 may extend directly from the central rod or from support bars extending from the central rod.

Figure 43:
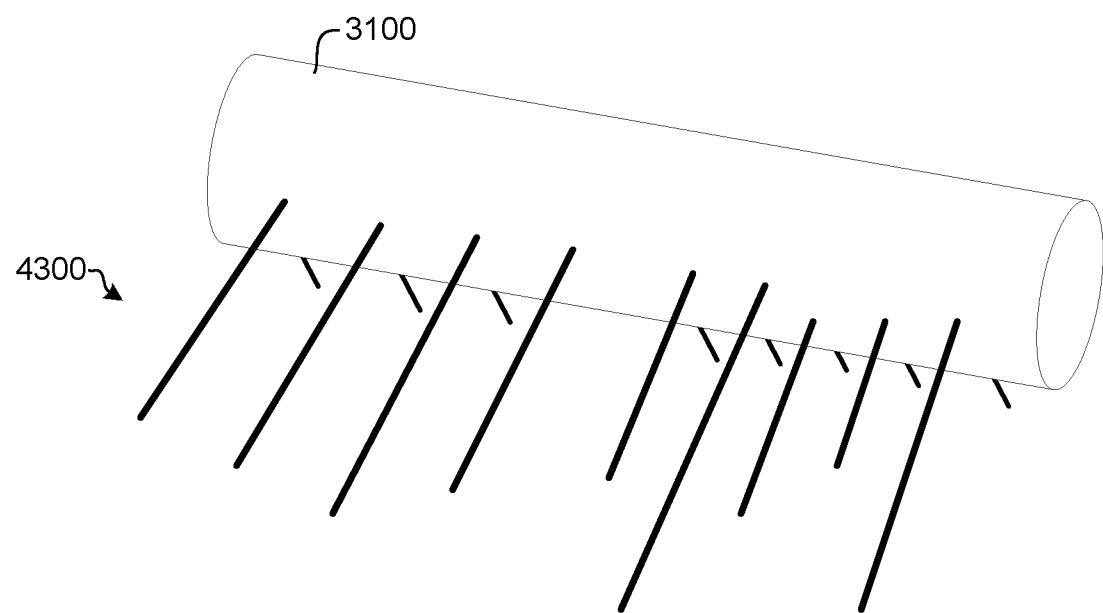
FIG. 43 is a perspective view of needle electrodes in the ionic engine of FIG. 25, according to an exemplary embodiment.
Figure 44:
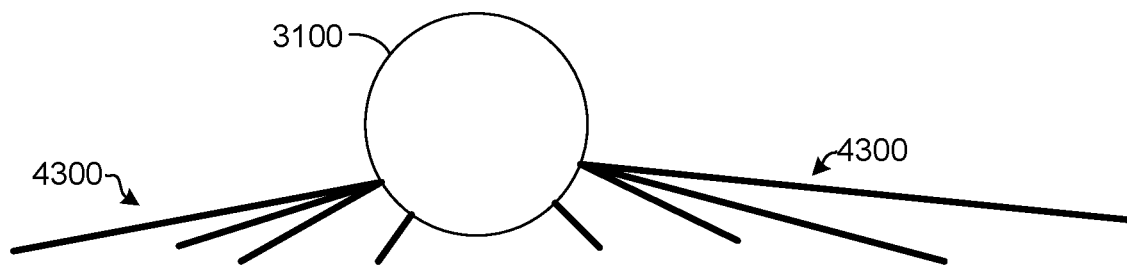
FIG. 44 is an end view of the needle electrodes of FIG. 43, according to an exemplary embodiment.
Figure 45:
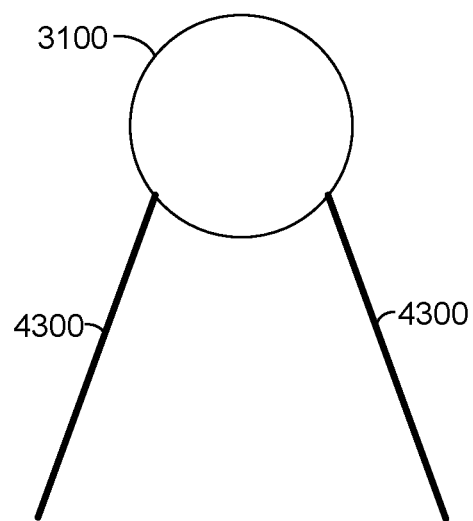
FIG. 45 is an end view of the needle electrodes of FIG. 43, according to an exemplary embodiment.
Figure 47:
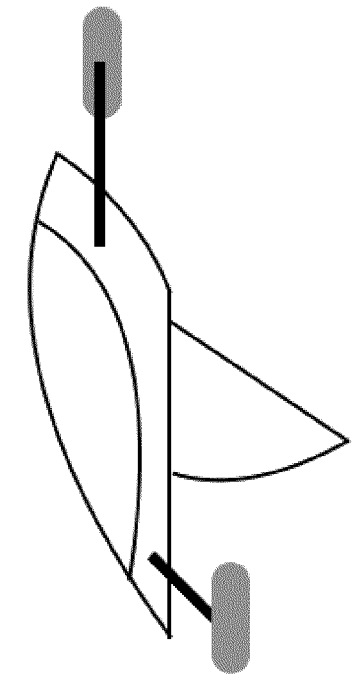
FIGS. 46-52 are various views of the drone system of FIG. 14, according to another exemplary embodiment.
Figure 49:
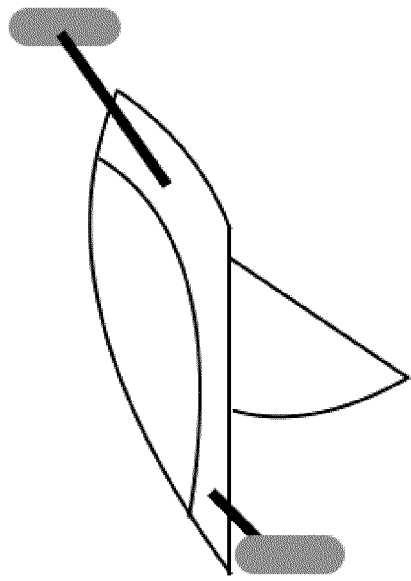
Figure 46:
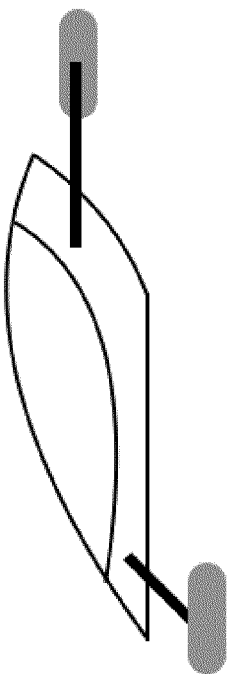
Figure 48:
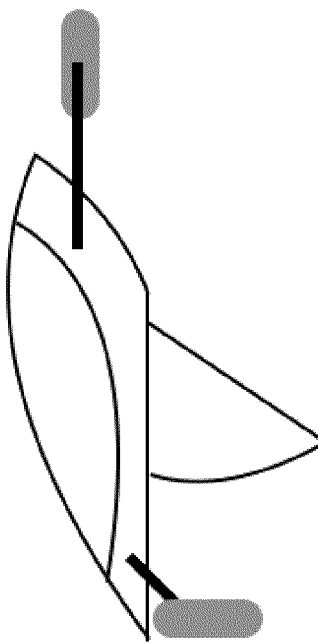
Figure 50:
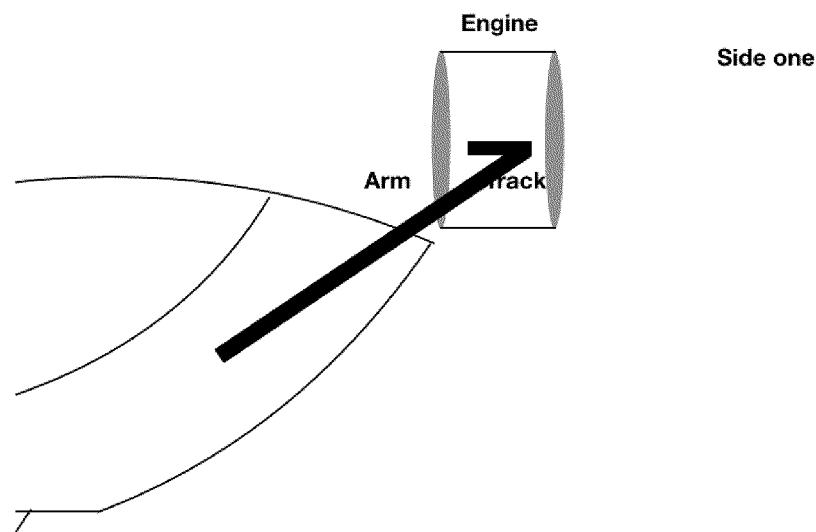
Figure 51:
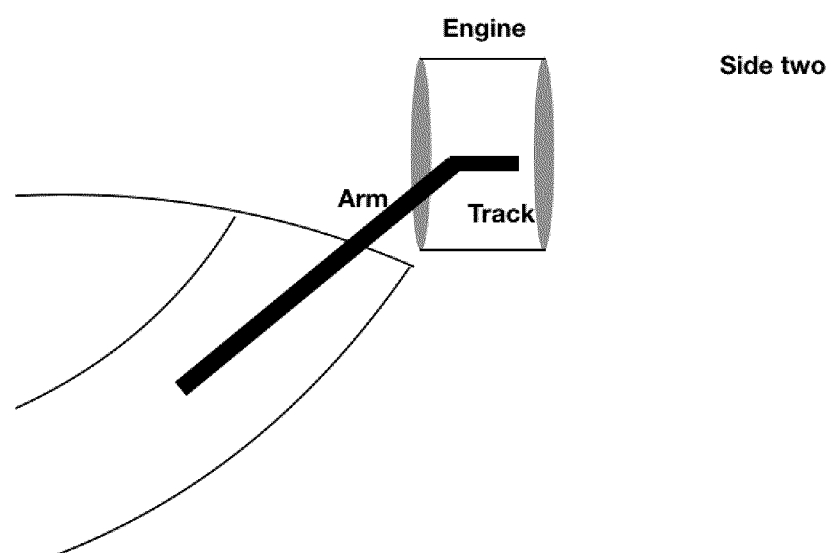
Figure 52:
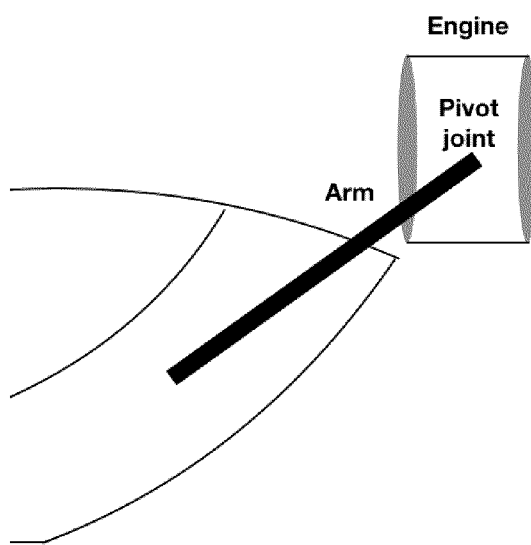

Referring now to FIGS. 43-45, example embodiments of a series of ionizing electrodes 1410 or attractive electrodes 1412 are shown. FIG. 43 shows a perspective view of electrodes 1410 extending from a support bar 3100 and FIGS. 44-45 shows end views of electrodes 1410 extending from a support bar 3100. The various needle structures shown in FIGS. 43-45 and described herein may be arranged to the form of many grids shown in FIGS. 31-42. As shown in FIGS. 43-45, the electrodes 1410 or 1412 may be configured as needles or pins 4300, for example with a narrow body and a sharp point. As shown in FIGS. 43-45, the needles 4300 extend downward and outward from a support bar 3100, and have various lengths. Such electrode needles 4300 may be poisoned in close succession to one another (e.g., extending from the bottom side of the support bars 3100 in the arrangement of FIG. 21). In some embodiments, the needles 4300 are randomly oriented in a dense arrangement (e.g., 1, 2, 3, 5, 10, etc. needles per square inch).

In some embodiments, for example as shown in FIG. 44, needles 4300 may be in rows that are substantially equidistantly-spaced on the grid, and can extend from the support bar 3100 at various angles. In other embodiments, for example as shown in FIG. 45, the needles 4300 each extend from the support bar 3100 at the same angle, for example twenty degrees or less to facilitate the needles 4300 in withstanding forces exerted by air flowing past the needles 4300. In some embodiments, may be many needles 4300 in a row (e.g., 2, 3, 5, 7, 10, 20, etc.) or otherwise in close proximity to one another. The needles 4300 may be embedded into the support bar 3100 at a depth (e.g., 1, 2, 3, 4, 5 cm embedded) into the support bar 3100 that provides structural support for the needles 4300, e.g., to resist air forces and increase the lifespan of the ionic engine 1404. In some embodiments, needles 4300 also extend from the housing 2500 into the airway 2502. By distributing needles 4300 in the housing 2500 to serve as ionizing electrodes 1410, the needles 4300 may increase the ratio of ionizing area to total cross-sectional area of the airway 2502, i.e., such that a greater percentage of the air flowing into the housing 2500 is ionized when passing by the ionizing electrodes 1410. In some embodiments, needles 4300 are also be used as attractive electrodes 1412 with similar advantages.

Referring again to FIG. 23, the controller 1402 is configured to control an ionic engine 1404 by controlling the discharge of the battery 1406 and the operation of the voltage amplifier 1408 to control the electric field at the housing 2500 of the ionic engine 1404. Several control approaches are possible, as described in the following.

In some embodiments, the controller 1402 is configured to control the ionic engine 1404 to provide a substantially static voltage across all ionizing electrodes 1410 and attractive electrodes 1412 in the ionic engine 1404. In some such embodiments, various parameters of the ionic engines 1404 are tailored for sustained flight at approximately constant speed, while other propulsion devices or engines are used for take-off, acceleration, deceleration, landing etc. of an aircraft coupled to an ionic engine 1404.

In some embodiments, the controller 1402 is configured to selectively turn on or off the voltage differential (i.e., in a binary way) across each of the various electrode stages in one or more ionic engines 1404 individually to vary the amount of thrust provided by the one or more ionic engines 1404. In other embodiments, the controller 1402 is configured to vary the voltage differential of electrode stages, for example decreasing the voltage differential to reduce the ionization rate and thus the thrust of an electrode stage. In some embodiments, the controller 1402 is configured to independently control the voltage differential across individual electrode pairs within electrode stages. In such embodiments, the ionic engine(s) 1404 can be used to provide variable amounts of thrust.

In some embodiments, the controller 1402 is configured to control the firing speed/pulsation of various electrodes in the ionic engine 1404. In some cases, voltage pulses for various electrodes are synchronized to fire at the same time or at deliberately different times. For example, in an embodiment where multiple electrode stages are provided in series through the housing 2500, the electrode stages may be activated/deactivated sequentially at a rate synchronized with the rate of airflow through the housing 2500. In such an embodiment, the pulse rate and synchronization may vary as a function of airspeed. A sensor may be included to measure the airspeed to facilitate such synchronization.

FIGS. 23-45 thereby illustrate various embodiments of an ionic engine 1404 suitable for use with aircraft, drones, etc., for example the drone shipping system 100, the drone system 700, and/or the drone system 800 as shown in FIGS. 1-22 and described in detail above. Advantageously, in some embodiments the ionic engine 1404 includes no moving parts, which may reduce the noise and risk of failure of the ionic engine 1404. In fact, the ionic engine 1404 is operable while emitting approximately no noise other than that associated with the airflow therethrough. Silent operation is advantageous to reduce noise pollution and to facilitate stealth operations. Additionally, the ionic engine 1404 operates on electrical battery power and does not inherently consume fossil fuels such as jet fuel. Relative to traditional aircraft engines, the ionic engine 1404 may thereby reduce or eliminate carbon emissions.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the drone shipping system 100, the drone system 700, and the drone system 800 as shown in the various exemplary embodiments is illustrative only. Additionally, any element disclosed in one embodiment may be incorporated or utilized with any other embodiment disclosed herein. For example, the features of the exemplary embodiment described in relation to drone shipping system 100 may be incorporated into the drone system 700 and/or the drone system 800, and vice versa. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:

1. An aircraft comprising:
a body defining an interior compartment configured to hold at least one of a passenger and a payload;
a battery system;
a plurality of arms coupled to and extending from the body; and
a plurality of propulsion devices configured to provide thrust to fly the aircraft, each of the plurality of propulsion devices is coupled to a respective one of the plurality of arms;
wherein the plurality of propulsion devices are powered by the battery system;
wherein each of the plurality of propulsion devices is selectively pivotable about at least one axis; and
wherein the plurality of propulsion devices include at least one of (i) counter rotating ducted fans and (ii) ionizing electrode engines.

2. The aircraft of claim 1, wherein the battery system includes a charging receiver configured to charge the battery system based on a remote signal received from a remote, wireless beaming system.

3. The aircraft of claim 1, wherein the battery system includes a solar panel configured to charge the battery system.

4. The aircraft of claim 1, wherein each of the plurality of propulsion devices is pivotable relative to the respective one of the plurality of arms about two axes.

5. The aircraft of claim 1, wherein the plurality of arms are at least one of (i) retractable such that the plurality of propulsion devices are selectively storable within or under the body and (ii) slidable along the body to facilitate selectively repositioning the propulsion devices.

6. The aircraft of claim 1, further comprising a pair of wings, one of the pair of wings extending from each lateral side of the body.

7. The aircraft of claim 6, wherein the pair of wings are retractable such that the pair of wings are selectively storable within, along, or under the body.

8. The aircraft of claim 6, wherein the pair of wings are selectively pivotable such that an angle at which the pair of wings are oriented is controllable and independent of an angle of attack of the body.

9. The aircraft of claim 1, further comprising a rear engine coupled to a rear end of the body.

10. The aircraft of claim 9, wherein the rear engine is selectively repositionable relative to a nominal, rearward facing position.

11. The aircraft of claim 1, further comprising wheel assemblies including wheels and wheel actuators, wherein the wheel actuators are configured to selectively extend the wheels from the body.

12. The aircraft of claim 11, wherein the wheel assemblies include motors configured to drive the wheels.

13. The aircraft of claim 1, wherein the internal compartment includes a payload bay configured to receive the payload.

14. The aircraft of claim 1, wherein the internal compartment includes a passenger cabin, the passenger cabin including a transparent cabin panel that is selectively repositionable to facilitate entering the passenger cabin.

* * * * *